United States Patent
Shibahara et al.

(10) Patent No.: US 8,120,746 B2
(45) Date of Patent: Feb. 21, 2012

(54) DISPLAY PANEL AND DISPLAY DEVICE HAVING MEDIUM WHOSE OPTICAL ANISOTROPY MAGNITUDE CHANGES ACCORDING TO ELECTRIC FIELD

(75) Inventors: Seiji Shibahara, Tenri (JP); Shoichi Ishihara, Katano (JP); Koichi Miyachi, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 1024 days.

(21) Appl. No.: 11/523,744

(22) Filed: Sep. 20, 2006

(65) Prior Publication Data

US 2007/0070282 A1 Mar. 29, 2007

(30) Foreign Application Priority Data

Sep. 20, 2005 (JP) ................. 2005-272615

(51) Int. Cl.
C09K 19/02 (2006.01)
G02F 1/07 (2006.01)
(52) U.S. Cl. ...................... 349/169; 359/258
(58) Field of Classification Search .......... 349/167, 349/169; 359/258
See application file for complete search history.

(56) References Cited

U.S. PATENT DOCUMENTS

| | | |
|---|---|---|
| 5,870,160 A | 2/1999 | Yanagawa et al. |
| 5,907,379 A | 5/1999 | Kim et al. |
| 6,108,066 A | 8/2000 | Yanagawa et al. |
| 6,111,627 A | 8/2000 | Kim et al. |
| 6,147,738 A | 11/2000 | Okamoto |
| 6,166,795 A | 12/2000 | Fujii et al. |
| 6,191,837 B1 | 2/2001 | Fujimaki et al. |
| 6,215,542 B1 | 4/2001 | Lee et al. |
| 6,233,034 B1 | 5/2001 | Lee et al. |
| 6,266,109 B1 | 7/2001 | Yamaguchi et al. |
| 6,266,117 B1 | 7/2001 | Yanagawa et al. |
| 6,327,013 B1 | 12/2001 | Tombling et al. |
| 6,346,932 B1 | 2/2002 | Maeda |
| 6,469,765 B1 | 10/2002 | Matsuyama et al. |

(Continued)

FOREIGN PATENT DOCUMENTS

CN 2534609 Y 2/2003

(Continued)

OTHER PUBLICATIONS

International Search Report for PCT/JP2005/000944 dated May 17, 2005.

(Continued)

*Primary Examiner* — Mark Robinson
*Assistant Examiner* — Michael Inadomi
(74) *Attorney, Agent, or Firm* — Nixon & Vanderhye P.C.

(57) ABSTRACT

A display panel includes (i) a first substrate and a second substrate, which face each other, (ii) a medium layer being sandwiched between the first and second substrate, and (iii) first electrodes and second electrodes being provided on that side of the first substrate which faces the second substrate, the display panel performing display operation by generating an electric field between the first and second electrodes. The display panel is configured such that the medium layer comprises a medium that is optically isotropic when no electric field is applied thereon, and whose optical anisotropy magnitude is changeable by and according to the electric field applied thereon; and the first and second electrodes are transparent electrodes, and a distance between the first and the second electrodes is shorter than a distance between the first substrate and second substrate. This configuration attains gives the display panel high response speed and high transmissivity.

26 Claims, 24 Drawing Sheets

U.S. PATENT DOCUMENTS

| | | |
|---|---|---|
| 6,525,786 B1 | 2/2003 | Ono |
| 6,556,263 B2 | 4/2003 | Gu |
| 6,577,368 B1 | 6/2003 | Yuh et al. |
| 7,724,335 B2 | 5/2010 | Miyachi et al. |
| 2001/0024184 A1 | 9/2001 | Maeda |
| 2001/0028424 A1 | 10/2001 | Maeda |
| 2001/0038432 A1 | 11/2001 | Yanagawa et al. |
| 2001/0048501 A1 | 12/2001 | Kim et al. |
| 2002/0054267 A1 | 5/2002 | Matsumoto et al. |
| 2002/0140649 A1 | 10/2002 | Aoyama et al. |
| 2002/0154262 A1 | 10/2002 | Yamakita et al. |
| 2003/0151711 A1 | 8/2003 | Yuh et al. |
| 2004/0125255 A1 | 7/2004 | Yanagawa et al. |
| 2005/0041196 A1 | 2/2005 | Ishihara et al. |
| 2005/0105009 A1 | 5/2005 | Dunn et al. |
| 2005/0140620 A1 | 6/2005 | Aoyama et al. |
| 2005/0151911 A1* | 7/2005 | Kim et al. .................. 349/139 |
| 2005/0151912 A1 | 7/2005 | Miyachi et al. |
| 2005/0162607 A1 | 7/2005 | Miyachi et al. |
| 2005/0168663 A1 | 8/2005 | Miyachi et al. |
| 2005/0179632 A1 | 8/2005 | Miyachi et al. |
| 2005/0179847 A1 | 8/2005 | Miyachi et al. |
| 2005/0185105 A1 | 8/2005 | Miyachi et al. |
| 2005/0185125 A1 | 8/2005 | Miyachi et al. |
| 2005/0185131 A1 | 8/2005 | Miyachi et al. |
| 2005/0200793 A1* | 9/2005 | Moon et al. .................. 349/141 |
| 2005/0225692 A1 | 10/2005 | Yanagawa et al. |
| 2005/0237472 A1 | 10/2005 | Shibahara et al. |
| 2006/0066798 A1* | 3/2006 | Hwang et al. ............... 349/141 |
| 2006/0290862 A1 | 12/2006 | Yanagawa et al. |
| 2007/0070282 A1 | 3/2007 | Shibahara et al. |
| 2007/0080370 A1* | 4/2007 | Miyachi et al. ............. 257/107 |
| 2007/0146602 A1 | 6/2007 | Yuh et al. |
| 2008/0024711 A1 | 1/2008 | Yanagawa et al. |
| 2008/0129929 A1 | 6/2008 | Miyachi et al. |

FOREIGN PATENT DOCUMENTS

| | | |
|---|---|---|
| JP | 7-56545 | 3/1995 |
| JP | 08-184854 | 7/1996 |
| JP | 9-105918 | 4/1997 |
| JP | 9-243984 | 9/1997 |
| JP | 9-258203 | 10/1997 |
| JP | 09-269504 | 10/1997 |
| JP | 09-269507 | 10/1997 |
| JP | 10-96953 | 4/1998 |
| JP | 10-133205 | 5/1998 |
| JP | 10-319434 | 12/1998 |
| JP | 11-52403 | 2/1999 |
| JP | 11-125832 | 5/1999 |
| JP | 11-183937 | 7/1999 |
| JP | 11-223827 | 8/1999 |
| JP | 11-316383 A | 11/1999 |
| JP | 11-352504 | 12/1999 |
| JP | 2001-147441 | 5/2001 |
| JP | 2001-249363 A | 9/2001 |
| JP | 2002-31812 | 1/2002 |
| JP | 2002-148634 | 5/2002 |
| JP | 2003-075819 | 3/2003 |
| JP | 2005-215339 A | 8/2005 |
| KR | 1999-004367 | 1/1999 |
| KR | 1999-0051849 | 7/1999 |
| KR | 10-2001-0039664 | 5/2001 |
| WO | WO 97/10530 | 3/1997 |
| WO | WO 97/34188 | 9/1997 |
| WO | 2005/059637 A1 | 6/2005 |

OTHER PUBLICATIONS

WO 2005/069064 filed as U.S. Appl. 10/585,865, filed Jul. 11, 2006, entitled Display Apparatus and Display Element.

Yamamoto, "Liquid Crystal Micro Emulsion", Ekisho, 2000, vol. 4, No. 3, pp. 248-254 with partial English translation.

Shiraishi et al, "Palladium Nanoparticles Covered with Liquid-Crystalline Molecules-Preparation and Electro-Optic Properties of Liquid-Crystal Displays Doped with Palladium Nanoparticles", Kobunshi Ronbunshu, vol. 59, No. 12, Dec. 2002, pp. 753-759 with partial English translation.

Diele et al, "Chapter XIII Thermotropic Cubic Phases", Handbook of Liquid Crystals Low Molecular Weight Liquid Crystal, edited by Demus et al, Wiley-VCH, vol. 2B, 1998, pp. 887-900.

Yamamoto, "First Lecture of Liquid Crystal Science Experiment: Identification of Liquid Crystal Phase" Lyotropic Liquid Crystal, Ekisho vol. 6, No. 1, 2002, pp. 72-83 with partial English translation.

Grelet et al, "Structural Investigation on Smectic Blue Phases", Physical Review Letters, The American Physical Society, vol. 86, No. 17, Apr. 2001, pp. 3791-3794.

Yoneya, "Examining Nano-Structured Liquid Crystal Phase by Molecule Simulator", Ekisyo, vol. 7, No. 3, 2003, pp. 238-245 with partial English Translation with partial English translation.

Mizoshita et al, "Fast and High-Contract Electro-Optical Switching of Liquid-Crystalline Physical Gels: Formation of Oriented Microphase-Separated Structures", Advanced Functional Materials, vol. 13, No. 4, Apr. 2003, pp. 313-317.

Kikuchi et al, "Polymer-Stabilized Liquid Crystal Blue Phases", Nature Materials, vol. 1, Sep. 2002, pp. 64-68.

U.S. Office Action mailed Feb. 19, 2008 in corresponding U.S. Appl. No. 11/037,546.

Matsumoto et al, Fine Droplets of Liquid Crystals in a Transparent Polymer and Their Response, Appl. Phys. Lett., 69, 1996, pp. 1044-1046.

Saito et al, "Thermodynamics of a Unique Thermo-Tropic Liquid Crystal Having Optical Isotropy", Ekisho, Vo. 5, No. 1, 2001, pp. 20-27 w/partial English Translation.

Kikuchi et al, "Polymer-Stabilized Liquid Crystal Blue Phases", Nature Materials, vol. 1, Sep. 2002 pp. 64-68.

Demus et al, "Handbook of Liquid Crystals Low Molecular Weight Liquid Crystal", Wiley-VCH, vol. 2B, 1998, pp. 887-900.

Demus et al, Handbook of Liquid Crystals, vol. 1: Fundamentals, 1998, pp. 484-485 & 530.

Yamamoto et al, "Organic Electrooptic Materials", National Technical Report, vol. 22, No. 6, Dec. 1976, pp. 826-834 (partial English Translation).

Office Action dated May 10, 2011 from U.S. Appl. No. 12/693,861; Miyachi et al.

Office Action dated Jul. 26, 2010 from related U.S. Appl. No. 12/693,861, filed Jan. 26, 2010; Miyachi et al.

Office Action dated Jan. 31, 2011 from related U.S. Appl. No. 12/693,861, filed Jan. 26, 2010; Miyachi et al.

* cited by examiner

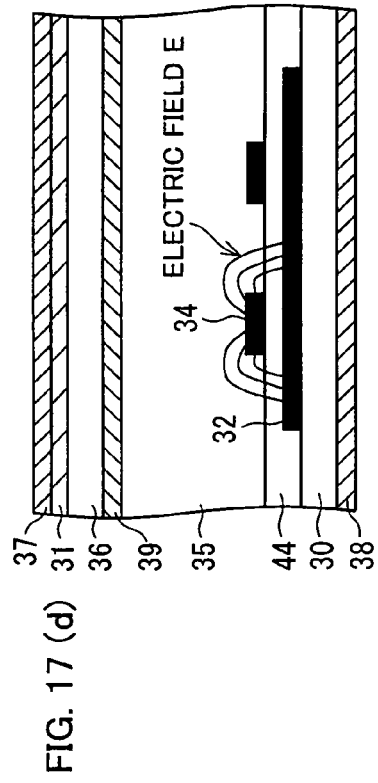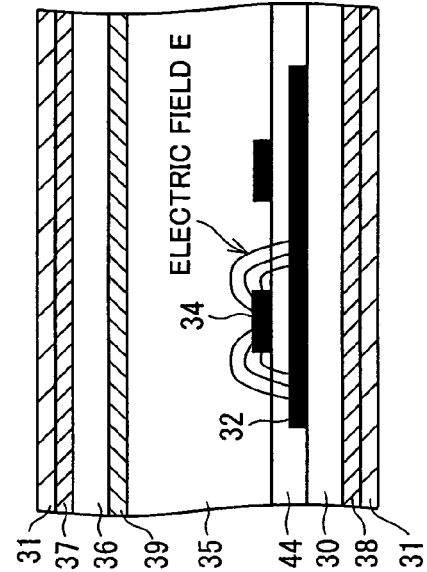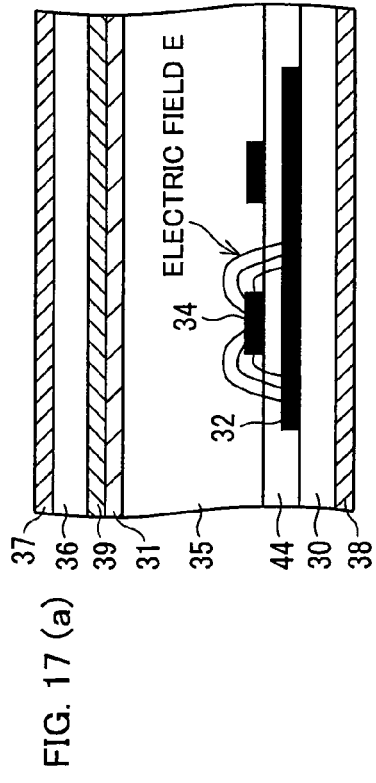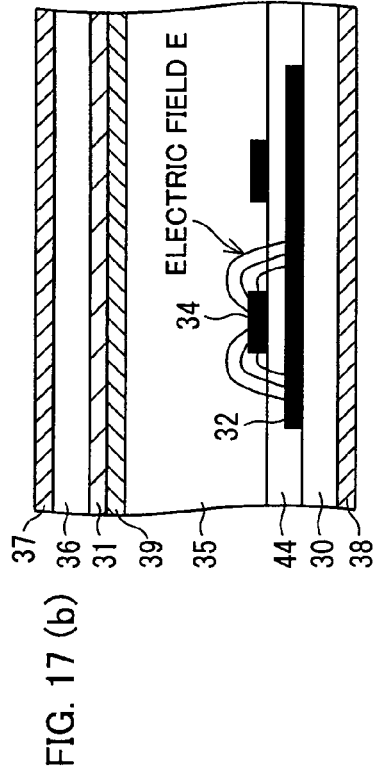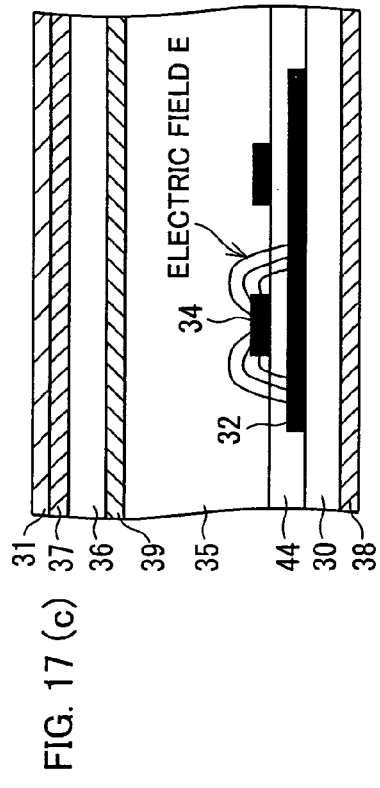

DISPLAY PANEL AND DISPLAY DEVICE HAVING MEDIUM WHOSE OPTICAL ANISOTROPY MAGNITUDE CHANGES ACCORDING TO ELECTRIC FIELD

This Nonprovisional application claims priority under 35 U.S.C. §119(a) on Patent Application No. 272615/2005 filed in Japan on Sep. 20, 2005, the entire contents of which are hereby incorporated by reference.

FIELD OF THE INVENTION

The present invention relates to a display panel and a display device, which are highly transmissive, can respond at a high speed and has a wide viewing angle.

BACKGROUND OF THE INVENTION

Liquid crystal display elements are display element having a thin thickness, light weight, and low power consumption among various display elements. This leads to wide application of liquid crystal display elements such as image display apparatus such as television, various monitors, and OA (Office Automation) apparatuses such as personal computers.

Conventionally known liquid crystal display methods of the liquid crystal display elements include, for example, a TN (Twisted Nematic) mode in which a nematic liquid crystal is used, display modes in which FLC (Ferroelectric Liquid crystal) or AFLC (Antiferroelectric Liquid crystal) is used, IPS (In-plane switching) mode, FFS (Fringe Field switching) mode (see later-described Patent Literature 1), etc.

Among the liquid crystal display methods, for example, the TN (Twisted Nematic) mode in which the nematic liquid crystal is used is conventionally adopted in the liquid crystal display elements in practical use. The liquid crystal display elements using the TN mode have disadvantages of slow response, narrow viewing angle, and other drawbacks.

Moreover, the display modes in which the FLC or AFLC is used, are advantageous in their fast response and wide viewing angles, but significantly poor in anti-shock property and temperature characteristics. Therefore, the display modes in which the FLC or AFLC is used have not been widely used.

Moreover, the IPS mode and FFS mode performs displaying by switching liquid crystal molecules in plane and advantageously have wide viewing angle. Like the TN mode, however, the IPS mode and FFS mode are disadvantageous in slow response. Those disadvantages are large hindrances for the IPS mode and FFS mode to take over CRT (Cathode Ray Tube).

In all the foregoing liquid crystal display methods, liquid crystal molecules are oriented in a certain direction and thus a displayed image looks differently depending on an angle between a line of vision and the liquid crystal molecules. On this account, all these display methods have viewing angle limits. Moreover, all the display methods utilize rotation of the liquid crystal molecules, the rotation caused by application of an electric field on the liquid crystal molecules. Because the liquid crystal molecules are rotated in alignment all together, responses take time in all the display method. Liquid crystal display elements using the display mode in which the FLC or the AFLC is used are advantageous in terms of response speed and viewing angle, but have a problem in that their alignment can be irreversibly destroyed by an external force.

In contrast to those liquid crystal display elements in which rotation of molecules by the application of the electric field is utilized, a liquid crystal display element in which a material having an optical anisotropy by and according to electric field application is used is proposed. Especially, a liquid crystal display element in which a material showing an orientation polarization due to electro-optical effects is utilized, and a liquid crystal display element in which a material showing electronic polarization is used.

The electro-optical effect is a phenomenon in which a refractive index of a material is changed by an external electric field. There are two types of electro-optical effect: one is an effect proportional to the electric field and the other is proportional to the square of the electric field. The former is called the Pockels effect: the latter is called the Kerr effect. The Kerr effect was adopted early on in high-speed optical shutters, and has been practically used in special measurement instruments. The Kerr effect was discovered by J. Kerr in 1875. So far, organic liquid such as nitrobenzene, carbon disulfide, and the like, are known as material showing the Kerr effect. These materials are used, for example, in the aforementioned optical shutters, and the similar devices. Further, these materials are used, e.g. for measuring strength of high electric fields for power cables and the like, and similar usage.

Later on, it was found that liquid crystal materials have large Kerr constants. Researches have been conducted to utilize the large Kerr constant of the liquid crystal materials for use in light modulation devices, light deflection devices, and further optical integrated circuit. It has been reported that some liquid crystal compound has a Kerr constant more than 200 times higher than that of nitrobenzene.

Under these circumstances, studies for using the Kerr effect in display apparatuses have begun. The refractive index of the materials showing the Kerr effect is proportional to square of the electric field applied on the material. Because of this, a relatively lower voltage driving is expected in the utilization of orientation polarization with a material showing the Kerr effect than in the utilization of orientation polarization with a material showing the Pockels effect. Further, it is expected that the utilization of a material showing the Kerr effect attains a high-speed response display apparatus because, e.g., the Kerr effect shows a response property of several p seconds to several m seconds, as its basic nature.

Under there circumstances, for instance, Patent Literatures 2 and 3 suggest display elements in which a medium made from a liquid crystalline material is sealed between a pair of substrates and the Kerr effect is induced by application of an electric field parallel to the substrates.

In the display elements disclosed in Patent Literatures 2 and 3, the electric field cannot affect the medium in regions on electrodes (i.e., regions superimposing the electrodes in the normal direction of the plane of the substrates). Thus, the display elements disclosed in Patent Literatures 2 and 3 have a problem of a being less transmissive due to these regions, which cannot be utilized as display regions.

In the technologies of Patent Literatures 2 and 3, an electric field substantially parallel to the plane of the substrates is formed by using pairs of electrodes formed in the plane of the substrates. In this arrangement, the medium is not affected in the regions on the electrodes by the electric field, whereby the medium on the regions on the electrodes maintains initial orientation (orientation attained when no electric field is applied). This makes it impossible to utilize the region on the electrodes as the display region. Thus, a display panel becomes less transmissive due to this. As a result, it is necessary to use a backlight of a high brightness in order to attain appropriate brightness, thereby resulting in higher power consumption.

Patent Literature 1 discloses a liquid crystal display device in which all liquid crystal molecules existing in regions on electrodes are movable with such a configuration that (i) counter electrodes and pixel electrodes are made of a transparent material, (ii) the counter electrodes and the pixel electrodes are arranged with an electrode-to-electrode distance smaller than a cell gap so that a large number of fringe electric fields occur, and (iii) driving electrodes have a width narrow enough to move all the liquid crystal molecules by the fringe electric fields occurred on both sides of the respective driving electrodes. However, the liquid crystal display device of Patent Literature 1 uses a conventional generally-used liquid crystal material, that is, a liquid crystal material whose liquid crystal molecules, which are aligned in a rubbing direction of an alignment film when no electric field is applied, are rotated together in alignment by electric field application. Thus, the problem of slow response speed is left unsolved in the liquid crystal display device of Patent Literature 1.

Moreover, the alignment film that has been subjected to rubbing process is necessary in the technology of Patent Literature 1. In the rubbing process, the alignment film made of a polymer such as polyimide is rubbed with a cloth or the like. Thus, the rubbing process is associated with fine dust and fine electric discharge (local discharge) which occurs due to high voltage static electricity. The dusts are a big problem in highly fine pixel electrodes and TFT forming process in which film deposition, exposure, and etching are repeated. The local electric discharge would damage the alignment film, or cause disconnection or electrostatic discharge damage in TFT and transparent electrode such as ITO. On this account, it is desirable to omit the rubbing process that would cause such problems.

Moreover, the liquid crystal display device disclosed in Patent Literature 1 has such a problem that the orientation would be disturbed by an electric field that occurs locally in the vicinity of an electrode edge. Because orientation changes have a long correlation distance in conventional generally-used liquid crystal materials, such orientation disturbance would be spread out widely from the vicinity of the electrode edge to remote regions. This would cause deterioration in display performance.

Patent Literature 1

Publication of Japanese Patent Application, publication No. 11-202356 (Tokukaihei 11-202356 (Jul. 30, 1999)(Publication of Japanese Patent Application, publication No. 2001-249363 (Tokukai 2001-249363; published on Sep. 14, 2001))

Patent Literature 2

Publication of Japanese Patent Application, publication No. 11-183937 (Tokukaihei 11-183937; published on Jul. 9, 1999) corresponding to U.S. Pat. No. 6,266,109)

Non-Patent Literature 1

"Jun Yamamoto, "Liquid Crystal Microemulsion", EKISHO, 2000, Vol. 4, No. 3, p. 248-254"

Non-Patent Literature 2

"Yukihide Shiraishi and four others, "Palladium Nanoparticles Protected By Liquid Crystal Molecules—Preparation and Application to Guest-Host Mode Liquid Crystal Display Element", KOBUNSHI RONBUNSHU (Japanese Journal of Polymer Science and Technology), December 2002, Vol. 59, No. 12, p. 753-759"

Non-Patent Literature 3

"D. Demus and three others, "Handbook of Liquid Crystals Low Molecular Weight Liquid Crystal", Wiley-VCH, 1998, Vol. 1, p. 484-485"

Non-Patent Literature 4

"Jun Yamamoto, "Liquid Crystal Scientific Experiment Course 1: Identification of Liquid Crystal Phase: (4) Lyotropic Liquid Crystal", EKISHO, 2002, Vol. 6, No. 1, p. 72-83"

Non-Patent Literature 5

"Eric Grelet and three others, "Structural Investigations on Smectic Blue Phases", PHYSICAL REVIEW LETTERS, The American Physical Society, Apr. 23, 2001, Vol. 86, No. 17, p. 3791-3794"

Non-Patent Literature 6

"Makoto Yoneya, "Nanostructure Liquid Crystal Phase Examined By Molecular Simulation", EKISHO, 2003, Vol. 7, No. 3, p. 238-245"

Non-Patent Literature 7

"Norihiro Mizoshita and two others, "Fast and High-Contrast Electro-optical Switching of Liquid-Crystalline Physical Gels: Formation of Oriented Microphase-Separated Structures", Adv. Funct. Mater., April 2003, Vol. 13. No. 4, p. 313-317"

Non-Patent Literature 8

"Hirotsugu Kikuchi and four others, "Polymer-stabilized liquid crystal blue phases", p. 64-68, [online], Sep. 2, 2002, Nature Materials, Vol. 1, [searched on Jul. 10, 2003], Internet <URL: http://www.nature.com/naturematerials>"

SUMMARY OF THE INVENTION

The present inventions was accomplished in view of the aforementioned problems. An object of the present invention is to provide a display panel and a display device having a high display quality with improved response speed and higher transmissivity. Moreover, another object of the present invention is to provide a display panel, which is produced without a rubbing step thereby to prevent defects that would be caused by dusts or high voltage static electricity caused by rubbing process, and to reduce production cost.

A display panel according to the present invention is a display panel that includes (i) a first substrate and a second substrate, which face each other, (ii) a medium layer being sandwiched between the first and second substrate, and (iii) first electrodes and second electrodes being provided on that side of the first substrate which faces the second substrate, the display panel performing display operation by generating an electric field between the first and second electrodes. In order to attain the object, the display panel according to the present invention is configured such that the medium layer comprises a medium that is optically isotropic when no electric field is applied thereon, and whose optical anisotropy magnitude is changeable by and according to the electric field applied thereon; and the first and the second electrodes are transparent electrodes, and a distance between the first and second electrodes is shorter than a distance between the first substrate and second substrate.

In the present invention, the wording "changeable in an optical anisotropy magnitude by and according to electric field application" indicates that the magnitude of the optical anisotropy is changeable by and according to the electric field applied. More specifically, a shape of a refractive index ellipsoid is changeable by and according to the electric field applied. That is, in the display panel according to the present invention, it is possible to realize different display states by utilizing change in the shape of the refractive index ellipsoid depending whether the electric field is applied or not. The refractive index in materials is not isotropic in general and differs depending on directions. This anisotropy in the refractive index, that is, optical anisotropy of the material is generally due to the refractive index ellipsoid. In general, it is considered that a plane passing the original point and perpendicular to the traveling direction of the light wave is the cross section of the refractive index ellipsoid with respect to the light traveling in a certain direction. The major axial direction of the ellipsoid is the polarization component direction of the polarized light of the light wave. The half length of the major axis corresponds to the refractive index of that polarization component direction. When the optical anisotropy is discussed in terms of the refractive index ellipsoid, the different display states are realized in a conventional liquid crystal device by changing (rotating) a direction of a major axial direction of the refractive index ellipsoid of a liquid crystal molecule by application of electric field. Here, the shape (shape of cross section of the refractive index ellipsoid) of the refractive index ellipsoid is not changed (constantly ellipsoidal). On the other hand, in the present invention, the different display states are realized by changing the shape (shape of cross section of the refractive index ellipsoid) of the refractive index ellipsoid formed from molecules constituting the medium.

As described above, in the conventional liquid crystal display element, the display operation is carried out by utilizing only the change in the orientation direction of the liquid crystal molecules due to rotation thereof caused by the electric field application. The liquid crystal molecules in alignment are rotated together in one direction. Thus, inherent viscosity of the liquid crystal largely affects responding speed. On the other hand, the present invention, in which the display is carried out by utilizing the change in the modulation of the optical anisotropy in the medium, is free from the problem that the inherent viscosity of the liquid crystal largely affects responding speed, unlike the conventional liquid crystal display element. Thus, it is possible to realize high-speed responding. Moreover, the high-speed responding allows the display element to be used, for example, in a display device of the field sequential color mode.

Moreover, in the display panel of the present invention, the medium is optically isotropic when no electric field is applied, and becomes optically anisotropic when an electric field applied thereon. In this specific case, the shape of the refractive index ellipsoid is spherical when no electric field is applied thereon, and is changed to elliptical shape when an electric field is applied thereon. This allows performing display by changing the magnitude (orientational order, refractive index) of the optical anisotropy, thereby attaining wider viewing angle property and higher speed response property than the conventional liquid crystal display element in which the display is performed by changing the orientation direction of the liquid crystal molecules.

Moreover, the display panel of the present invention is configured such that and the first and the second electrodes are transparent electrodes, and a distance between the first and second electrodes is shorter than a distance between the first substrate and second substrate. This configuration allows a fringe electric field to occur between the first and second electrodes, thereby making it possible to change the magnitude of the optical anisotropy of the medium in the regions above the electrodes (i.e., regions that overlap the first and second electrodes when viewed in the normal direction of the substrate plane). This allows the regions above the electrodes to be utilized as display regions and to contribute to transmissivity. Thus, this improves transmissivity.

Unlike the conventional liquid crystal display elements using IPS mode or FFS mode, the medium used in the liquid crystal panel of the present invention is optically isotropic when no electric field is applied thereon, and becomes optically anisotropic when an electric field is applied thereon. Therefore, there is no need of aligning by using an alignment film, the liquid crystal molecules so as to specify the alignment that the liquid crystal molecules have when no electric field is applied, unlike the conventional liquid crystal display elements. Thus, the alignment film is not essential in the display panel of the present invention. On this account, alignment process such as rubbing alignment process etc. is not necessary in the present invention. In the rubbing step, the alignment film made of a polymer such as polyimide is rubbed with a cloth or the like. Thus, the rubbing step is associated with fine dust and fine electric discharge (local discharge) which occurs due to high voltage static electricity. The dusts are a big problem in highly fine pixel electrodes and TFT forming process in which film deposition, exposure, and etching are repeated. The local electric discharge would damage the alignment film, or cause disconnection or electrostatic discharge damage in TFT and transparent electrode such as ITO. In the display panel of the present invention, the rubbing alignment process, which is carried out in the conventional liquid crystal display elements, can be omitted. Thus, it is possible to prevent the problems of dust and local discharge, which are caused by the rubbing alignment process. Further, the omission of the alignment process step such as rubbing reduces production cost.

Compared with the conventional liquid crystal materials, a correlation distance in orientation change is short in the medium that is optically isotropic when no electric field is applied and whose magnitude of optical anisotropy is changeable by and according to the electric field applied thereon. Because of this, even if a large electric field is generated locally in the vicinity of an edge of the electrodes, orientation disturbance due to the large electric field will not be transmitted in a long distance. Therefore, the display panel of the present invention has a better prevention for deterioration in the display performance, which is caused by orientation disturbance, compared with the conventional liquid crystal display devices.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 11(a) illustrates the pixels when no electric field is applied.

FIG. 11(b) illustrates the pixels when an electric field is applied.

FIGS. 17(a) to 17(e) are cross-sectional views illustrating modifications of a pixel of the display panel in accordance with the embodiment of the present invention.

FIG. 19(a) illustrates the display panel when no electric field is applied.

FIG. 19(b) illustrates the display panel when an electric field is applied.

FIG. 21 illustrates the refractive index ellipsoid when an electric field is applied.

DESCRIPTION OF THE EMBODIMENTS

One embodiment of the present invention is explained below.

1. Configuration of Display Panel 70

Figure 2:
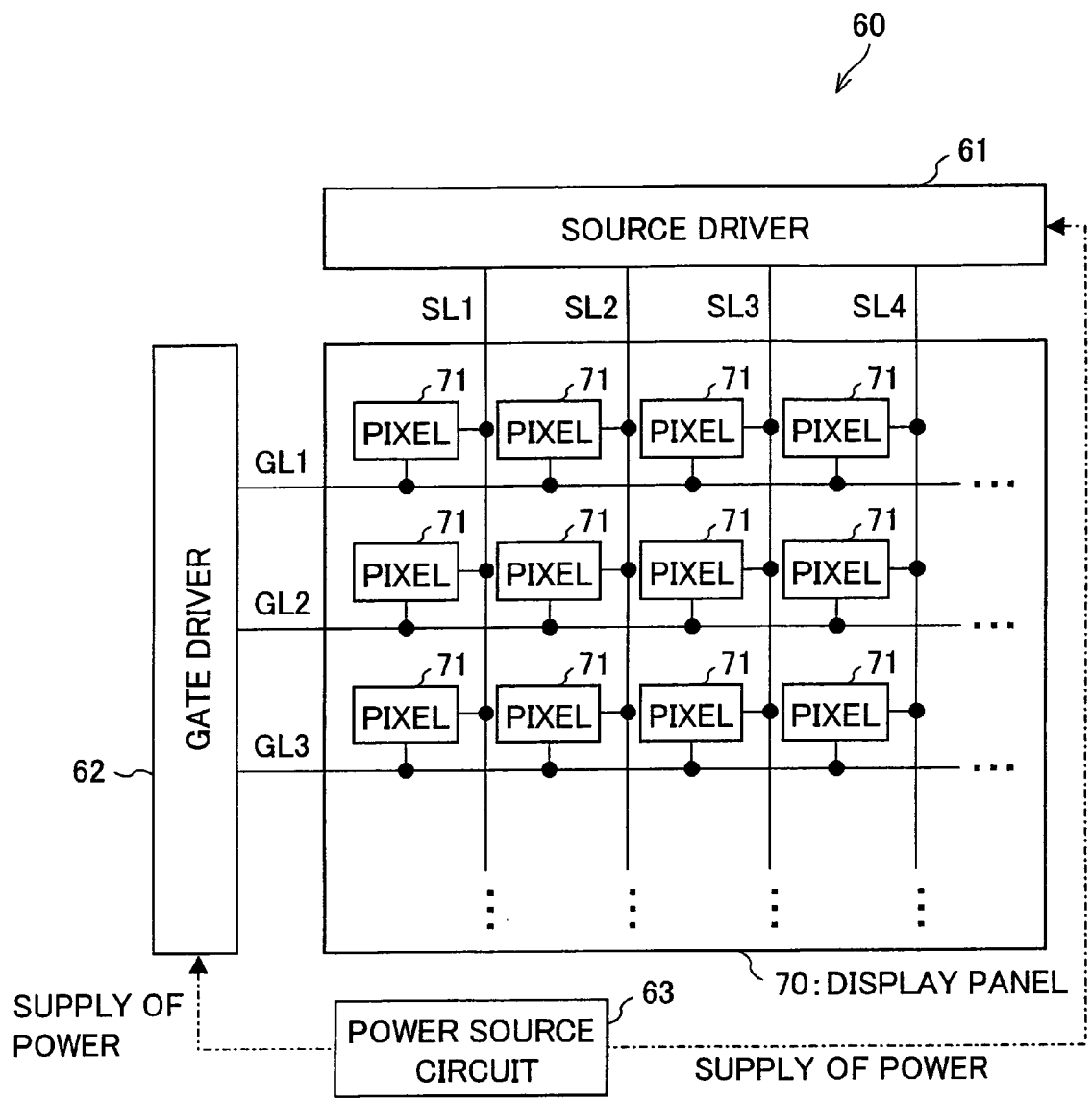
FIG. 2 is a block diagram illustrating a schematic configuration of various parts of a display device in accordance with one embodiment of the present invention.
Figure 3:
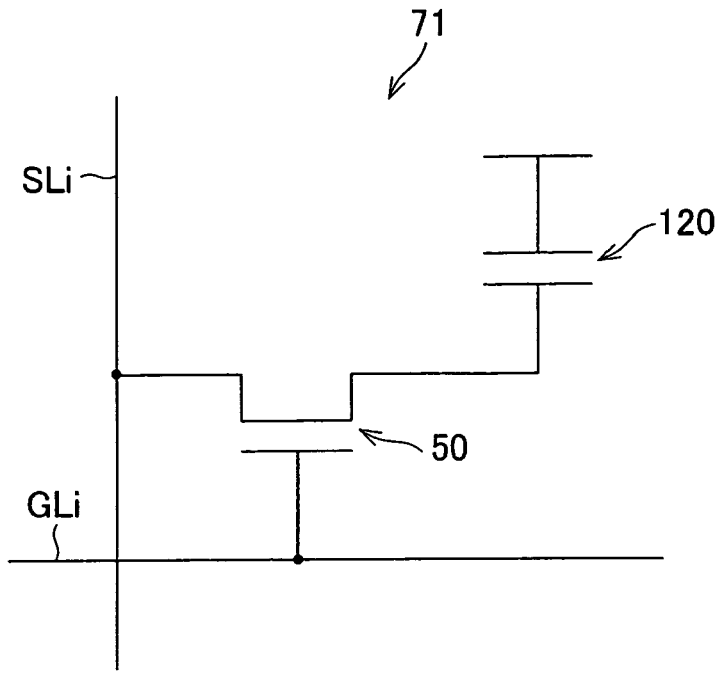
FIG. 3 is a schematic diagram illustrating a configuration of a pixel of the display panel in accordance with the embodiment of the present invention.

FIG. 2 is a block diagram illustrating a schematic configuration of various parts of a display device 60 according to the exemplary embodiment. FIG. 3 is a schematic diagram schematically illustrating a configuration of a pixel 71 in a display panel 70 in accordance with the embodiment of the present invention. The display device 60 comprises the display panel (display element) 70 as well as a driving circuit, data signal lines, scanning lines, switching element, and the like.

As illustrated in FIG. 2, the display device 60 according to the exemplary embodiment is provided with a display panel 70, a source driver 61, a gate driver 62, and a power source circuit 63, and the like. Each display panel 70 is, as illustrated in FIG. 3, a pixel capacitor 120 and a switching element 50.

Moreover, the display panel 70 is provided with a plurality of data signal lines SL1 to SLn (n is an arbitral integer not less than 2), and a plurality of scanning signal lines GL1 to GLm (m is an arbitral integer not less than 2), which cross with the data signal lines SL1 to SLn at any angle that may or may not be orthogonal. The pixels 71 are provided corresponding to respective intersections of the data signal lines SL1 to SLn and scanning signal lines GL1 to GLm.

The power source circuit 63 supplies a voltage to the source driver 61 and the gate driver 62 in order to cause the display panel 70 to perform display operation. By using the voltage, the source driver 61 drives (addresses) the data signal lines SL1 to SLn in the display panel 70. Meanwhile, by using the voltage, the gate driver 62 drives (addresses) the scanning signal lines GL1 to GLm in the display panel 70. The switching element may be, for example, an FET (Field Effect Transistor), a TFT (Thin Film Transistor) or the like. The switching element is connected to the scanning signal line GLi via its gate electrode 52, and to the data signal line SLi via its drain electrode 53. Further, the switching element is connected with the pixel capacitor 120 via its source electrode 54. Another node of the pixel capacitor 120 is connected to a common signal line (common electrode line: not illustrated), which are commonly connected with all the pixels 71. With this arrangement, the pixels 71 work as follows: the switching element is turned ON in a pixel 71 when a scanning signal line GLi (i is an arbitral integer not less than 1) is selected. Then, a signal voltage determined in accordance with the a display data signal inputted from a controller (not illustrated) is applied on the pixel capacitor 120 via the data signal line SLi (i is an arbitral integer not less than 1) from the source driver 61. While the switching element is OFF after the period in which the scanning signal line GLi is selected is ended, the pixel capacitor 120 ideally keeps holding the voltage that it has when the switching element 50 is turned OFF.

Figure 4:
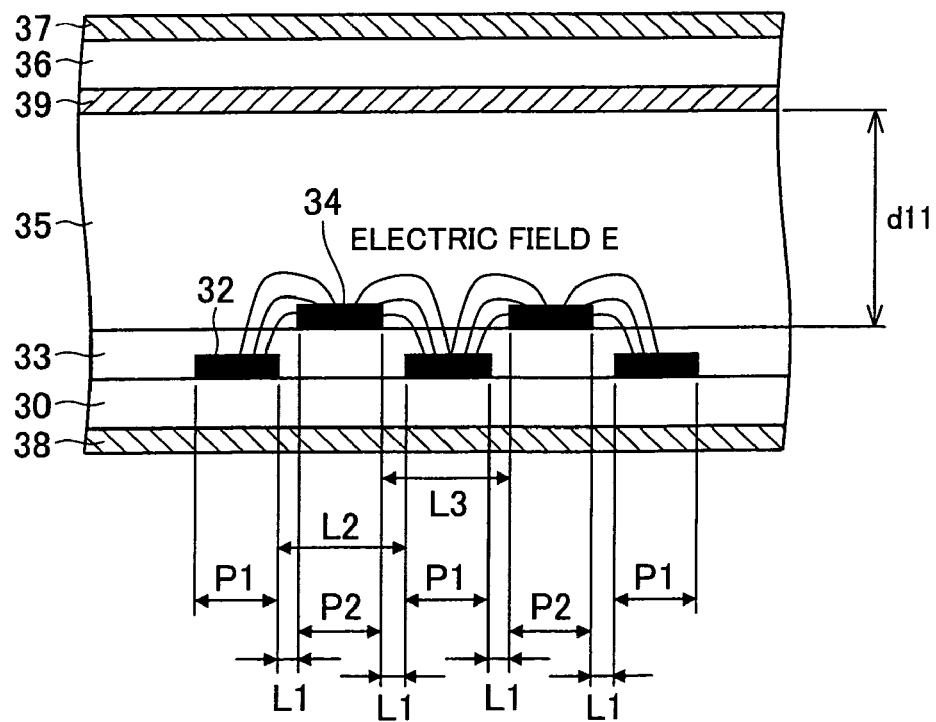
FIG. 4 is a cross-sectional view illustrating a configuration of a pixel of the display panel in accordance with the embodiment of the present invention.

FIG. 4 is a cross-sectional view schematically illustrating configuration of various parts of the display panel 70. As illustrated in FIG. 4, the display panel 70 has such a structure that a medium layer 35 is sandwiched between two substrates (lower substrate 30 and upper substrate 36) facing each other. The medium layer 35 is an optical modulation layer that can be optically modulated (changeable).

The lower substrate 30 and the upper substrate 36 are transparent substrate such as glass substrates or the like. The transparent substrates may be provided with, for example, a protecting film (not illustrated) thereon in order to prevent permeation of alkali ion. Moreover, the medium layer 35 is formed by bonding the lower substrate (pixel substrate) 30 and the upper substrate (counter substrate) 36 together with a spacer (not illustrated: e.g., a plastic beads, glass fiber spacer, or the like) therebetween by using a sealing agent (not illustrated) in such a manner that the sealing agent surrounds a pixel region, and then sealing a medium A in a gap thus formed between the substrates 30 and 36.

The medium A may be a medium that shows optical isotropy when no electric field is applied thereon, and a magnitude of whose optical anisotropy is changeable by and according to the electric field applied thereon. In the exemplary embodiment, the medium A is a mixture containing the following compounds at the ratio as described below.

JC-1041xx (50.0 wt %)
5CB (38.5 wt %)
ZLI-4572 (11.1 wt %)

JC-1041xx (made by Chisso Corporation) is a nematic liquid crystal mixture. 5CB (4-ciano-4'-pentylbiphenyl) (made by Aldrich is a nematic liquid crystal. ZLI-4572 (made by Merck Ltd.) is a chiral agent. Samples of the above composition showed phase transition from an isotropic phase to optically anisotropic phase at a temperature of approximately 53° C. The following is the chemical structural formula of 5CB:

(1)

The lower substrate 30 and the upper substrate 36 have a cell gap of d11. On that surface of the lower substrate 30 which faces the upper substrate 36, counter electrodes (first electrodes) 32 and pixel electrodes (second electrodes) 34, which are insulated from each other via an insulating film 33, are provided On that side (facing side) of the lower substrate 30 which faces the upper substrate 36, the data signal lines and scanning signal lines (not illustrated) are also provided. Moreover, on that side (facing side) of the upper substrate 36 which faces the lower substrate 30, a color filter 39 and a black matrix (not illustrated) 40 are formed. The black matrix has the same width as the scanning signal lines so that the black matrix can overlap the scanning signal line when viewed in the normal direction of the substrate plane. Further, on external sides of the lower substrate 30 and the upper substrate 36 which are reverse sides of the facing sides, polarizers 37 and 38 are provided.

Figure 1:
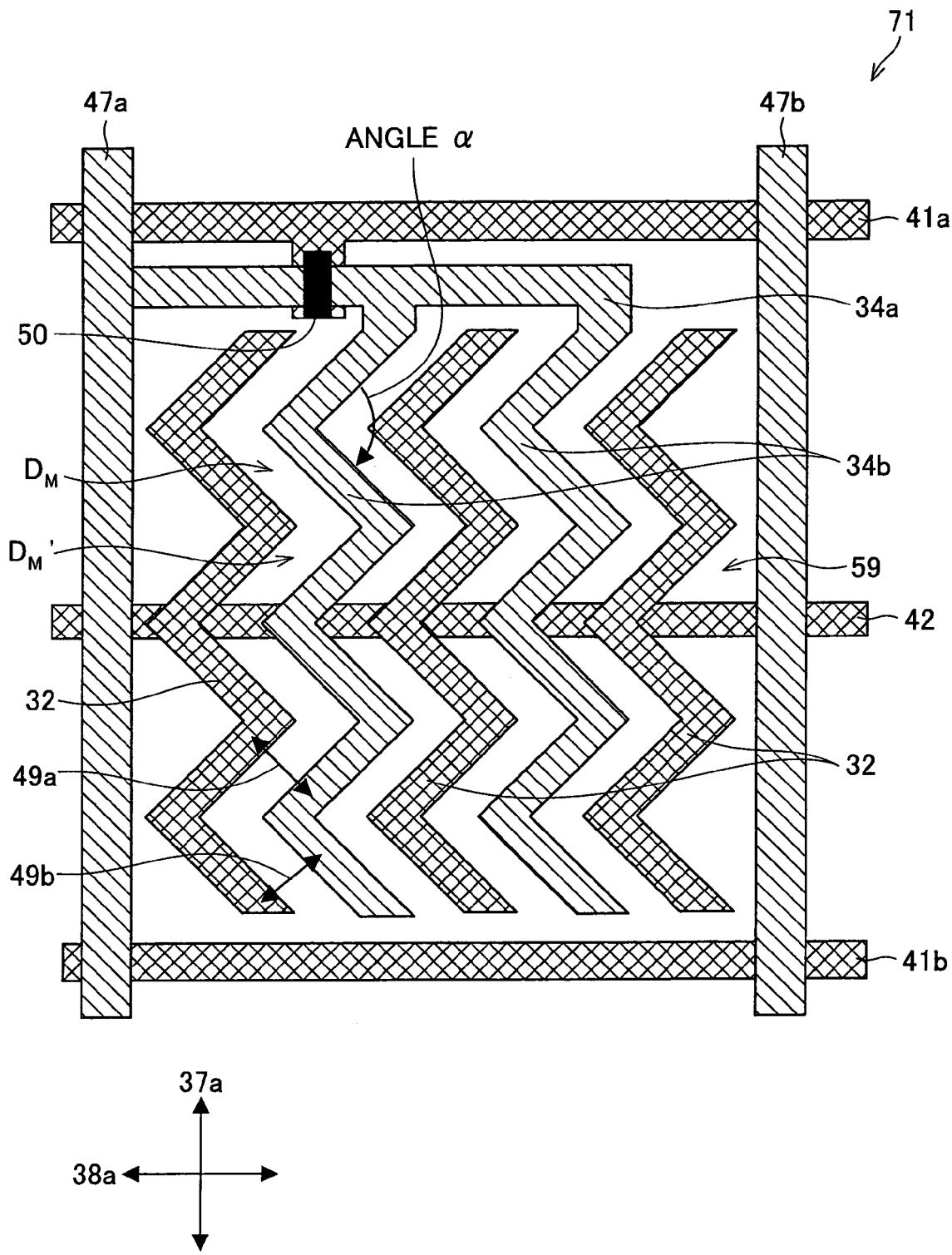
FIG. 1 is a plan view illustrating a schematic configuration of various parts of a display panel in accordance with one embodiment of the present invention.

FIG. 1 is a plan view illustrating a configuration of one pixel when viewing the lower substrate 30 from the upper substrate 36. As illustrated in FIG. 1, a large number of the scanning signal lines 41 (41*a*, 41*b*, . . . ) are arranged in substantially parallel to each other with constant distance (intervals) therebetween on the lower substrate 30. Moreover, a large number of the data signal lines 47 (47*a*, 47*b*, . . . ) arranged orthogonal to the scanning signal lines 41 with constant distance (intervals) therebetween on the lower substrate 30. Moreover, unit pixels are provided per region segmented by a pair of scanning signal lines 41 and a pair of data signal lines 47. Moreover, the scanning signals 41 and the data signals lines 47 are insulated from each other by the insulating film (see FIG. 4) provided between the scanning signals 41 and the data signals lines 47.

Moreover, as illustrated in FIG. 1, the TFT 50, which acts as a switching element, is provided in the vicinity of an intersection of a scanning signal line 41 and a data signal line 47. Storage capacitance (pixel capacitance) of each pixels is generated between the respective counter electrodes 32 and pixel electrodes 34. The storage capacitance acts for holding data signal in one frame.

The common signal lines 42 are positioned respectively between each scanning signal line 41 substantially in parallel to the scanning signals line 41. The scanning signal lines 41, the common signal lines 42 and the data signal lines 47 are made of any one of highly conductive metals: Al, Mo, Ti, W, Ta, Cr, Nd, and Cu, or an alloy of two or more of these metals. In the exemplary embodiment MoW alloy is used.

The scanning signal lines 41 have a width smaller than a distance between the scanning signals lines 41 and the common signal lines 42.

The pixel electrodes 34 and the counter electrodes 32 are formed in respective unit pixel region on the lower substrate 30. The pixel electrodes 34 and the counter electrodes 32 are made of a transparent and conductive material (e.g., ITO, IZO, ZnO or the like) and are interleave electrodes (comb-like shaped electrodes) having tooth portions that have a zigzag shape with a bending angle of angle α (α=90 degrees in the exemplary embodiment. The present invent is not limited to this.). The counter electrodes 32 are electrically connected with the common signal lines 42. The "comb-like shaped electrodes" are electrodes having such a structure that a plurality of electrodes (e.g., tooth portions 34*b*) are extended from one electrode (comb-base portion 34*a*) in a certain direction with respect to the longitudinal of the one electrode (comb-base portion 34*a*) (i.e., a direction different from the longitudinal direction).

The counter electrodes 32 is formed in each unit pixel region of the lower substrate 30. In this embodiment, the counter electrode 32 is formed on the same plane as the scanning signal lines 41, that is, on the lower substrate 30 and is electrically connected with the common signal line 42. The counter electrode 32 is made of a transparent and electrically conductive material, like the pixel electrode 32, and is zigzag-shaped with a bending angle of α. The pixel electrodes 34 and the counter electrodes 32, which are insulated from each other by the insulating film 33, are interleaved with each other as illustrated in FIG. 1 in such a manner that their tooth portions are arranged in parallel. With this configuration, electric fields are applied on the medium layer 35 in two directions (first direction 49*a* and second direction 49*b*) with respect to the normal direction of the substrate plane as illustrated in FIG. 1. Thereby, domains (medium domains) DM and DM' in which the medium A shows optical anisotropy in different directions are formed.

As illustrated in FIG. 4, the counter electrodes 32 have a width of P1 in the in-plane direction and the pixel electrodes 34 have a width of P2 in the in-plane direction. The width P2 of the tooth portions 34*b* of the pixel electrodes 34 and the width P1 of the tooth portions 32*b* of the counter electrodes 32 are narrower than widths of electrodes in conventional IPS-mode liquid crystal display elements. Specifically, the widths of counter electrodes and pixel electrodes in the conventional IPS-mode liquid crystal display elements are in the order of 10 μm to 20 μm. On the contrary, the widths P1 and P2 are in a range of 1 μm to 8 μm (more preferably in a range of 1 μm to 5 μm) in the display panel 70.

Moreover, the exemplary embodiment is so arranged that the width P2 of the tooth portions 34b of the pixel electrodes 34 is narrower than the width P1 of the tooth portions 32b of the counter electrodes 32, and that the tooth portions 34b of the pixel electrodes 34 are distanced from their adjacent tooth portions 32b of the counter electrodes 32 by distance L1. That is, a shortest distance between the tooth portions 34b and 32b is L1. Further, the exemplary embodiment is so arranged that the distance L1 is shorter than the cell gap d11.

Moreover, the exemplary embodiment is arranged such that, as illustrated in FIG. 1, absorption axial directions of the polarizers 37 and 38, which are respectively provided to the lower substrates 30 and upper substrate 36, are orthogonal to each other, and orthogonal or parallel with the direction in which the data signal lines 47 (47a and 47b) are extended, the direction in which the scanning signal lines 41 (41a and 41b) are extended, and the direction the common signal lines 42 are extended.

Moreover, on that surface of the upper substrate 36 which faces the lower substrate 30, the color filter 39 and black matrix 40 are formed. The black matrix 40 are so formed that the black matrix 40 overlap the scanning signal lines 41, common signal line 42, and data signal lines 47 when viewed from the normal direction of the substrate plane. The black matrix 40 has the same width as the scanning signal lines 41, common signal line 42, and data signal lines 47. It should be noted that present invention is not limited to this configuration and the width of the black matrix 40 may be narrower in width than the scanning signal lines 41, common signal line 42, and data signal lines 47. The widths of the scanning signal lines 41, common signal line 42, and data signal lines 47 are preferably not more than 100 μm. More specifically, the widths of the scanning signal lines 41, common signal line 42, and data signal lines 47 are selected as appropriate in consideration of how large the display panel 70 is, and how many pixels 71 the display 70 has. For example, in case the display panel 70 has such a size that its diagonal lines is less than 10 inches (25.4 cm) long, the width of the scanning signal line 41 is preferably 15 μm or less, and the width of the data signal lines 47 is preferably 8 μm or less. Moreover, in case the display panel 70 has such a size that its diagonal lines is 10 inches (25.4 cm) or longer but less than 30 inches (76.2 cm), the width of the scanning signal line 41 is preferably 30 μm or less, and the width of the data signal lines 47 is preferably 10 μm or less. In case the display panel 70 has such a size that its diagonal lines is 30 inches (76.2 cm) or longer but less than 50 inches (127 cm), the width of the scanning signal line 41 is preferably 65 μm or less, and the width of the data signal lines 47 is preferably 20 μm or less.

2. Production Method of Display Panel 70

Next, an example of a production method of the display panel 70 is described below. Firstly, on the lower substrate 30, an ITO layer is vapor-deposited in a thickness in a range of from 400 Å to 1000 Å. Then, on the ITO layer, a metal layer (e.g., MoW layer) is formed in a thickness in range of from 2500 Å to 3500 Å. After that, photolithography is performed on the metal layer to pattern the metal layer in a prescribed pattern, thereby forming the scanning signal lines 41 and the common signal lines 42. Then, the ITO layer is patterned in a prescribed pattern, for example, in a comb-like shape, thereby forming the counter electrodes 32. The tooth portions 32b of the counter electrodes 32 are formed with the constant width P1 and the constant distance L1. Moreover, the counter electrodes 32 are so formed as to be electrically connected respectively with the common signal lines 42. It should be noted that the present invention is not limited to the exemplary embodiment in which the counter electrodes 32, common signal line 42, and scanning signal lines 41 are formed in the order described above. The counter electrodes 32, common signal line 42, and scanning signal lines 41 may be formed in other orders as appropriate. For example, the ITO layer may be formed after the formation of the metal layer.

Then, the insulating film (gate insulating film) 33 is formed above the counter electrodes 32, common signal line 42, and scanning signal lines 41. The gate insulating film 33 may be, for example, (i) a silicon oxide film, (ii) a silicon nitride film, (iii) a lamination film in which a silicon oxide film and a silicon nitride film are layered, (iv) a metal oxide film, or (v) the like film. The exemplary embodiment is so arranged that the gate insulating film 33 is in a thickness in a range of 1000 Å to 7500 Å (this thickness of the gate insulating film 33 is a thickness where no counter electrode 32 is formed). It should be noted that present invention is not limited to the exemplary embodiment in which the gate insulating film for insulating the scanning signal lines 41 from the data signal lines 47 is a common insulating film.

After that, a silicon film (whose crystal morphology is amorphous, polysilicon, or monocrystal) is vapor-deposited. Then, the silicon film is patterned in a prescribed pattern, thereby forming a channel layer of the TFTs 50.

Then, an ITO layer is vapor-deposited in a thickness in a range of from 400 Å to 1200 Å. This ITO layer is then patterned thereby to form the pixel electrodes 34. The exemplary embodiment is arranged such that the gate insulating film 33 has a thickness (at the part where no counter electrode 32 is formed) in a range of from 1000 Å to 7500 Å, while the counter electrodes 32 have a thickness in a range of from 400 Å to 1000 Å. Thus, the gap between the counter electrodes 32 and the pixel electrodes 34 are in a range of from 0 Å to 7100 Å.

After that, a non-transparent metal film having a high electric conductivity is formed. For example, the non-transparent metal film is made of an alloy that contains one of, or two or more of Al, Mo, Ti, W, Ta, Cr, Nd, and Cu. In the exemplary embodiment, the non-transparent metal film is made of MoW alloy and has a thickness in a range of from 3500 Å to 5500 Å.

Then, the non-transparent metal film is patterned thereby to form the data signal lines 47, and the drain and source electrodes of the TFTs 50.

After that, the upper substrate 36 and the lower substrate 30 are bonded together with a certain cell gap d11 therebetween. Then, the medium A is sealed inbetween the upper substrate 36 and the lower substrate 30. In case where the medium A has a high viscosity, it is possible to bond the upper substrate 36 and the lower substrate 30 together with a certain cell gap d11 therebetween after providing (e.g. by dropping or the like) the medium A onto one of the upper substrate 36 and the lower substrate 30.

After the bonding, the polarizers 37 and 38 are bonded respectively to the external surfaces of the upper substrate 36 and the lower substrate 30 which are reverse side to the facing surfaces thereof. In this way, the display panel 70 is accomplished.

3. Effect of Display Panel 70

As described above, the display panel 70 according to the exemplary embodiment is configured such that the pixel electrodes 34 having the width of P1 and the counter electrodes 32 having the width of P2 are positioned with the insulating film 33 insulating therebetween and with the distance L1 therebetween on that side of the lower substrate 30 which faces the upper substrate 36. Moreover, the pixel electrodes 34 and the counter electrodes 32 are transparent electrodes.

In the conventional liquid crystal display element of IPS mode, it is necessary that distance between counter electrodes and pixel electrodes be relatively larger than a cell gap in order to form an in-plane electric field. Specifically, if the cell gap was 4.5 μm, the distance between the counter electrodes and the pixel electrodes should be in the order of 20 μm (i.e., about 4 times larger than the cell gap). On the contrary, the display panel 70 is configured such that the distance L1 between the tooth portions 32b of the counter electrodes 32 and the tooth portions 34b of the pixel electrodes 34 is shorter than the cell gap d11. For example in case where the unit pixel is in a size of 300 μm×110 μm, it is preferable that the distance L1 be not less than 0.1 μm and not more than 5 μm. Moreover, the cell gap d11 is preferably not less than 2 μm but not more than 20 μm, and more preferably not less than 2.5 μm but not more than 12 μm. If the cell gap d11 was too narrow, production would become difficult with poor yield rate thereby resulting in a higher production cost. Further, if the cell gap d11 was too thick, an amount of the medium A would be increased thereby resulting in a higher production cost.

With the electrode configuration, the distance L1 between the electrodes can be short. Further, formed is a parabolic fringe electric field having a larger curvature and radius than in the conventional configuration. Thus, this electrode configuration allows induction of a change in a magnitude of the optical anisotropy of the medium even in the regions above each electrode (i.e., the regions which overlap the counter electrodes and the pixel electrodes when viewed from the normal direction of the substrate plane). That is, when an electric field is applied, equipotential lines are also formed on the region above the counter electrodes and the pixel electrodes 34, in addition to the regions between the counter electrodes 32 and the pixel electrodes 34. Therefore, the electric field application can induce a change in the magnitude of the optical anisotropy of the medium even in the regions above each electrode. This gives the display panel 70 a better aperture ratio.

The width P1 of the tooth portions 32b of the counter electrodes 32 and the width P2 of the tooth portions 34b of the pixel electrodes 34 are so appropriately designed that it is possible to change the magnitude of the optical anisotropy of the medium A on the regions above the tooth portions 32b of the counter electrodes 32 and the tooth portions 34b of the pixel electrodes 34. It is preferable that the widths P1 and P2 are designed to be narrower than typical electrodes widths in the conventional liquid crystal display devices.

Specifically, in the conventional liquid crystal display elements of the IPS mode, the counter electrodes and the pixel electrodes should be in the order of 10 μm to 20 μm in case where the unit pixel has a size of 330 μm×110 μm. On the contrary, the display panel 70 is so configured that the width P1 of the tooth portions 32b of the counter electrodes 32 and the width P2 of the tooth portions 34b of the pixel electrodes 34 are in a range of 1 μm to 8 μm (more preferably 1 μm to 5 μm).

The configuration in which both the electrodes have such widths makes it possible to induce a change in the magnitude of the optical anisotropy of the medium A in all the regions above the tooth portions 32b of the counter electrodes 32 and the tooth portions 34b of the pixel electrodes 34 (i.e., the regions that overlap the tooth portions 32b of the counter electrodes 32 and the regions that overlap the tooth portions 34b of the pixel electrodes 34 when viewing these electrodes in the normal direction of the substrate plane) by parabolic electric field formed between the counter electrodes 32 and the pixel electrodes 34. In other words, if the tooth portions 32b and 34b were too narrow or too wide, the electric field applied on the regions above these electrodes would become so week in intensity that a change in the magnitude of the optical anisotropy of the medium A cannot be induced in all the regions above these electrodes (the regions when viewing these electrodes in the normal direction of the substrate plane).

Figure 19:
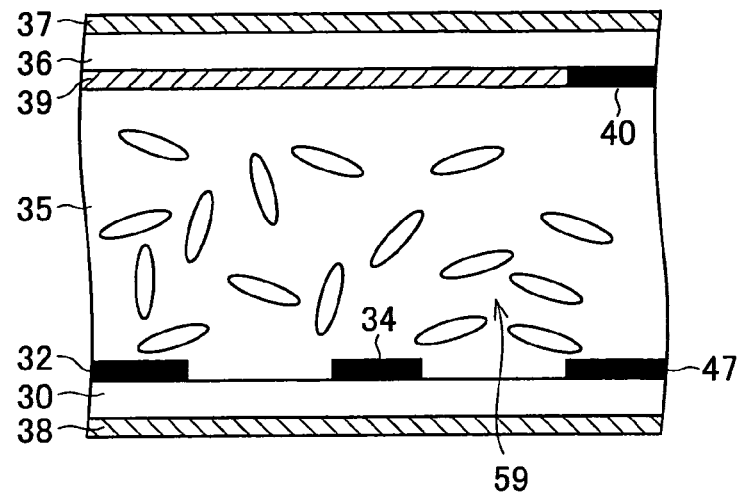
FIG. 19(a) is a cross-sectional view schematically illustrating a state of the display panel according to the embodiment of the present invention.
FIG. 19(b) is a cross-sectional view schematically illustrating a state of the display panel according to the embodiment of the present invention.
FIG. 19(c) is a graph in which applied voltage is plotted against transmissivity in the display panel according to the embodiment of the present invention.
Figure 19:
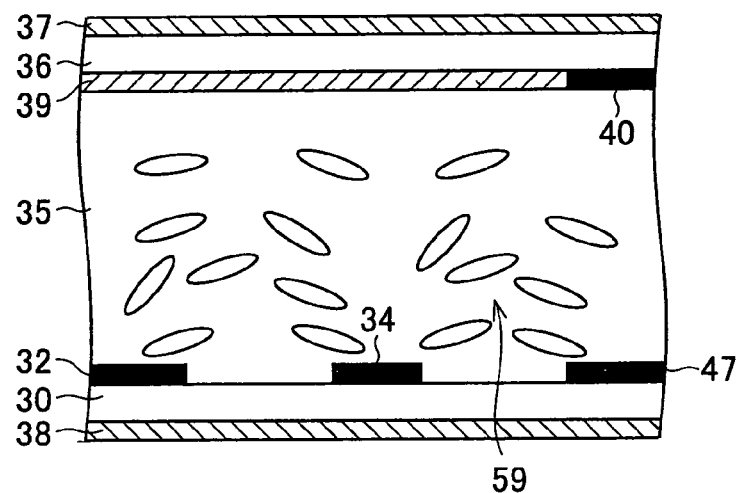
Figure 19:
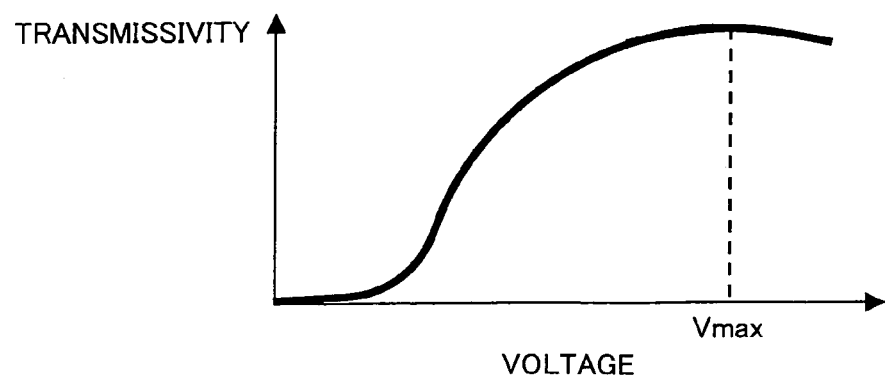

What is meant by the expression "it is possible to induce a change in the magnitude of the optical anisotropy of all the medium A existing above these electrodes" is that when a voltage Vmax at which maximum transmittance is attained on a voltage-transmissivity curve as shown in FIG. 19(c) is applied, the magnitude of the optical anisotropy of the medium A in all the regions above these electrodes is different from the magnitude attained when no voltage is applied (i.e., it is not required that the magnitude of the optical anisotropy in the whole area of the medium layer 35 in the normal direction of the substrate plane be different from the magnitude attained when no voltage is applied).

Moreover, the present invention is not limited to the exemplary embodiment where the width P2 of the tooth portions 34b of the pixel electrodes 34 are narrower than the width P1 of the tooth portions 32b of the counter electrodes 32. The widths P1 and P2 of the tooth portions 32b and 34b of these electrodes 32 and 34 may be identical with or different from each other. However, it is preferable that the width P2 of the tooth portions 34b of the pixel electrodes 34 be 0.2 to 4 times greater than the width P1 of the tooth portions 34b of the pixel electrodes 34. This ratio between the widths P1 and P2 makes it possible to change the magnitude of the optical anisotropy of the medium A appropriately in the regions above the tooth portions 32b of the counter electrodes 32 and the regions above the tooth portions 34b of the pixel electrodes 34 by the electric field application.

Moreover, the display panel 70 is configured such that the scanning signal lines 41 and the data signal lines 47 cross each other orthogonally and the common signal lines 42 are parallel to the scanning signal lines 41. Further, the display panel 70 is configured such that the polarizer 37 provided to the upper substrate 36 and the polarizer 38 of the lower substrate 37 have absorption axial directions crossing each other orthogonally and the absorption axes of the polarizers 37 and 38 are orthogonal to or parallel to the directions in which the data signal lines 47, scanning signal lines 41, and common signal lines 42 are extended.

Because of this, a change in the optical anisotropy of the medium A is induced by the electric fields formed between the respective data signals lines 47, scanning signal lines 41, and common signal lines 42, and between the pixel electrodes 34 and the counter electrodes 32. As the result, it is possible to prevent light leakage even when the medium A does not show optical isotropy. This is because a direction of the induced anisotropy, that is, a direction of a major axis of a refractive index ellipsoid is parallel to or orthogonal to the absorption axes of the polarizers 37 and 38.

In order to prevent the light leakage, it is conventionally necessary that the regions between the signal lines (data signal lines, scanning signal lines, common signals lines) be covered with the black matrix. On the contrary, the display panel 70 according to the exemplary embodiment is such that the light is prevented from leaking from the regions between the signal lines and the electrodes. Thus, it is not necessary to over the regions with the black matrix. This allows the black matrix to have a width equal to or less than that of the signal lines, and thus attain a better aperture ratio of the display panel.

The present invention is not limited to the exemplary embodiment where the absorption axial directions of the polarizers 37 and 38 cross each other orthogonally and are orthogonal to or parallel to the extending directions of the data signal lines 47, scanning signal lines 41, and common signal lines 42. Meanwhile, it is preferable that the absorption axial directions of the polarizers 37 and 38 cross each other orthogonally and are orthogonal to or parallel to at least either of the scanning signal lines 41, data signal lines 47, and common signal lines 42. This prevents the light leakage being caused by the electric field that occurs between the electrodes and the signal lines that are extended in parallel to or orthogonally to the absorption axial directions of the polarizers 37 and 38.

Moreover, unlike the conventional liquid crystal display elements of the IPS mode and FFS mode, the display panel 70 of the exemplary embodiment is configured such that a medium showing optical isotropy when no electric field applied thereon, but showing optical anisotropy when an electric field is applied. Unlike the conventional liquid crystal display element, this makes it unnecessary to specify the alignment of the liquid crystal molecules with the alignment film when no electric field is applied. Thus, the alignment film is not essential in the display panel 70 according to the exemplary embodiment. Thus, it possible to omit the rubbing step, which is necessary in the production process of the conventional liquid crystal display elements. In the rubbing step (rubbing alignment process), the alignment film made of a polymer such as polyimide is rubbed with a cloth or the like. Thus, the rubbing step is associated with fine dust and fine electric discharge (local discharge) which occurs due to high voltage static electricity. The dusts are a big problem in highly fine pixel electrodes and TFT forming process in which film deposition, exposure, and etching are repeated. The local electric discharge would damage the alignment film, or cause disconnection or electrostatic discharge damage in TFT and transparent electrode such as ITO.

On the contrary, the rubbing step can be omitted for the display panel 70 according to the exemplary embodiment. Thus, the display panel 70 according to the exemplary embodiment is free from such problems because no dust nor local electric discharge occur therein. Moreover, the elimination of the rubbing step cuts the production cost.

The display panel 70 may be configured such that an alignment film (not illustrated) is applied on each facing surface of the upper substrate 36 and the lower substrate 30. In this case, for example, it is preferable that the direction of the alignment process (rubbing process or optical alignment) is parallel with one of the absorption axial directions of the polarizers 37 and 38. Such alignment process aligns, along the absorption axial directions of the polarizers, the molecules adsorbed on a surface of the substrates (alignment film). This alleviates light leakage that occurs during black display, thereby attaining a high contrast.

Moreover, the display panel 70 may be treated with an alignment process to align the liquid crystal molecules along the direction (electric field application direction) in which the electric field is applied by the pixel electrodes 34 and counter electrodes 32. In this case, molecules in the vicinity of the alignment films can orient along the electric field application direction more easily. That is, the molecules can more easily orient compared with the arrangement in which no alignment process is carried out. This reduces driving voltage. It should be noted that the medium A used in the exemplary embodiment shows optical isotropy when no electric field is applied thereon, and has a shorter correlation distance (a distance in which orientation is transferred intermolecularly) than the medium used in the conventional liquid crystal display element. Thus, the molecules are correlated with molecules existing over a relatively long distance in the conventional liquid crystal display element. Thus, the alignment process such as forming alignment films on the substrates by, e.g., rubbing, causes the liquid crystal molecules in a wide range to orient together. However, the medium A has a short correlation distance of molecules compared with the medium of the conventional liquid crystal display element, as described above. Thus, the alignment films influence the molecules in a narrower range in the vicinity of the alignments films. Thus, the effect of the alignment process to reduce the driving voltage is smaller than in the conventional liquid crystal display elements.

In the configuration illustrated in FIG. 1, the counter electrodes 32 and the pixel electrodes 34 are interleave electrodes (comb-like shaped electrodes) having a plurality of tooth portions in a zigzag shape (saw-toothed shape) bended at a bending angle (saw-tooth angle) α. The "saw-toothed shape (wedge-like shape, chevron shape)" refers to a shape whose tooth portions 34b are extended away from the comb-base portion 34a, the tooth portions 34b bending in two directions alternatively at the saw-tooth angle a. In other words, the "saw-tooth shape" may be referred to as a shape made up with L-shaped constituents. Thus, the "saw-tooth shape" may be referred to as a shape whose L-shaped constituents, which correspond to "tooth unit", are aligned away from the longitudinal direction of the comb-base portion. Moreover, the "saw-tooth shape of the tooth portions" may be referred to as a shape of the tooth portions which is made of L-shaped constituents aligned to form zigzag lines. Moreover, the saw-tooth shape may be referred to as a shape made up with V-shaped constituents. Thus, the "saw-tooth shape" may be referred to as a shape whose V-shaped constituents, which correspond to "tooth unit", are aligned away from the longitudinal direction of the comb-base portion. Moreover, the "saw-tooth shape of the tooth portions" may be referred to as a shape of the tooth portions which is made of V-shaped constituents aligned to form zigzag lines.

Furthermore, the tooth portions of the counter electrodes 32 and the pixel electrodes 34 are arranged in parallel to each other with the insulating film 33 insulating therebetween in the configuration of FIG. 1. With this configuration, an electric field is applied on the medium layer 35 in two directions (first direction 49a and second direction 49b) when viewed from the normal direction of the substrate plane. This forms domains (medium domains) DM and DM' in which the directions the optical anisotropy of the medium A are different from each other.

That is, the display panel 70 according to the exemplary embodiment includes: the data signal lines 47; the scanning signal lines 41; TFTs 50 (switching elements), at least one of which is provided corresponding to respective intersections of the data signal lines 47 and the scanning signal lines 41; the pixel electrodes 34 being respectively connected to the TFTs 50 and having a comb-like shape with tooth portions 34b; and the counter electrodes 32 having tooth portions 32b that interleave with the tooth portions 34b, wherein the tooth portions 32b and tooth portions 34b are in a zigzag shape (wedge-like shape) that bends at a curving angle (bending angle) of 90 degrees, whereby in each pixel 71, electric fields are applied in two or more directions that make 90 degrees therebetween in order to form at least two domains (minute regions) DM and DM' in the medium layer 35.

By forming the counter electrodes 32 and the pixel electrodes 34 so that the electric fields are applied in two or more directions, it becomes possible to form such medium domains in the medium layer 35 that the medium A shows the optical anisotropy in different directions respectively. This improves the display panel 70 in terms of its viewing angle property.

In case where the counter electrodes 32 and pixel electrodes 34 are so formed that the electric fields are applied in two or more directions, it is preferable that at least two directions in which the electric fields are applied be orthogonal to each other. With this configuration, it is possible to form such medium domains that the optical anisotropy of the medium A in one of the medium domains is orthogonal to (makes 90 degrees with) the optical anisotropy of the medium A in the other one of the medium domains. This makes it possible to compensate for (canceling out) coloring phenomenon due to a diagonal viewing angle in one medium domain with that in the other medium domain. Thus, this configuration further improves the viewing angle property without scarifying the transmissivity.

Moreover, the electric field application directions 49a and 49b cross each other orthogonally and make 45 degrees with the absorption axial directions 49a and 49b of the polarizers 37 and 38 respectively in the configuration illustrated in FIG. 1. This configuration allows better compensation for the coloring phenomenon being caused by the diagonal viewing angle, and thus further improves the viewing angle property.

The display panel 70 can function as a shutter-type display panel in which the transmissivity of the medium layer 35 is changed by the optical anisotropy of the medium A that occurs due to an increase in a magnitude of orientational order along the electric field application direction. The transmissivity (P) can be estimated by using an equation $P(\%) = \sin^2(2\theta)$. Therefore, maxim transmissivity is attained when the direction of the optical anisotropy makes 45 degrees with the absorption axial directions of the polarizers 37 and 38 that cross each other orthogonally.

Where it is put that the transmissivity at 45 degrees is 100%, the brightness appears as 100% to human eyes when the transmissivity is about 90% or higher (for the human eyes, brightness of about 90% transmissivity or higher seems to be equivalent to the maximum brightness). Therefore, if 35 degrees $< \theta <$ 55 degrees, substantially maximum brightness for the human eyes is attained or the human eyes sense that the maximum brightness is attained. That is, as illustrated in the exemplary embodiment, a preferable configuration of a display panel in which the electric field is applied in the in-plane direction of the substrates is such that the directions (optical anisotropy directions) of the optical anisotropies generated in the respective domains $D_M$ and $D_M'$ when the electric field is applied thereon make about 45 degrees (angles of 45 degrees±10 degrees, preferably angles of 45 degrees±less than 10 degrees, more preferably angles of 45 degrees±less than 5 degrees, most preferably the angle of 45 degrees) with respect to the absorption axial directions 37a and 37b of the polarizers 37 and 38, and that the directions (optical anisotropy directions) of the optical anisotropies generated by the electric field applied on the respective domains $D_M$ and $D_M'$ make, with each other, about 90 degrees (angles of 90 degrees±less than 20 degrees, preferably angles of 90 degrees±10 degrees, and most preferably the angle of 90 degrees).

Moreover, as to the ratio of the respective domains in each pixel 71, as described above, a large improvement (compensation) in the coloring phenomenon appear to be attained for human eyes when the ratio between the two domains in which the optical anisotropies occur in different directions is in a range of 1:9 to 1:1 (preferably about 1:1). It was proved by an experiment that when the polar angle was ±60°, a domain segmentation in which the ratio between the domains DM and DM' in which the optical anisotropies occurred in different directions that made 90 degrees therebetween was 1:1 could substantially halved the color change (the range in which the change in the chromaticity coordinates occurred, the chromaticity coordinates expressed as the distance between chromaticity coordinates: $\sqrt{\{\Delta x^2 + \Delta y^2\}}$) compared with the arrangement in which no domain segmentation was done. Moreover, it was observed that the color change was smaller with larger ratios between the two domains (DM/DM') from 1/9 to 1/1, and was smallest when the ratio was 1/1. Thus, it is preferable that the ratio between domains DM and DM' be 1:1.

4. Modifications of Display Panel 70

Moreover, the present invention is not limited to the arrangement which is mainly discussed above as an example and in which each pixel 71 has two types of domains, and optical anisotropy of the same direction occur respective in each type of domains. The present invention may be arranged such that more than two types of domains are provided and optical anisotropy of the same direction occur respective in each type of domains. More specifically, as described above, it is preferable that the directions of the optical anisotropies occurred in the respective domains when the electric field is applied or when no electric field is applied make about 45 degrees (45 degrees±10 degrees) with respect to the absorption axes 37a and 38a of the polarizers 37 and 38, and that the directions of the optical anisotropies occurred in the respective domains when the electric field is applied or when no electric field is applied make, between themselves, about 90 degrees (90 degrees±20 degrees). However, the angles may be independently shifted from 45 degrees or 90 degrees.

Incidentally, the inventors of the present inventions studied a domain segmentation applied to the display modes (such as IPS mode and FFS mode) in which the conventional liquid crystal material was used and the display was carried out by changing the orientation direction of the liquid crystal molecules in the in-plane direction of the substrates. For the domain segmentation, the conventional display apparatus was so configured that electrodes are so provided that the electric fields were applied in two or more directions. the inventors of the present inventions found that, in this case, the preferable electric field application directions in the domains were different from the preferable electric field application directions in the display apparatus 70 according to the exemplary embodiment. In the display panel 70 according to the exemplary embodiment, it is preferable, as described above, that the electric field application directions make 90 degrees therebetween. On the other hand, it is preferable in the conventional liquid crystal display elements that the electric field application directions make an angle close to 0 degree, but not 90 degrees. This is explained below referring to FIGS. 5(a) and 5(b).

Figure 5:
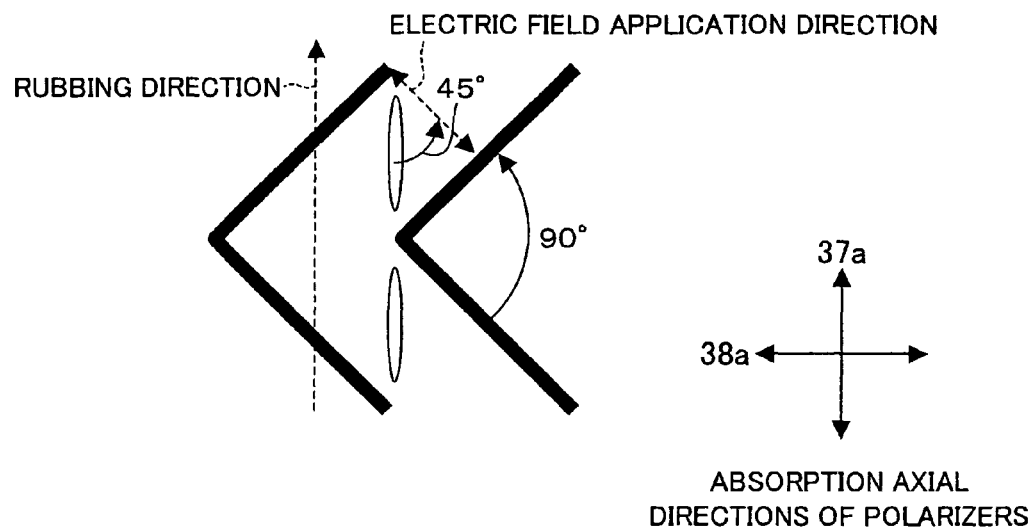
FIG. 5(a) is a view schematically illustrating rotation of liquid crystal molecules in a conventional liquid crystal display element having electrodes zigzag-shaped with bending angles of 90 degrees.
FIG. 5(b) is a view schematically illustrating rotation of liquid crystal molecules in a conventional liquid crystal display element having electrodes zigzag-shaped with bending angles of 35 degrees.
Figure 5:
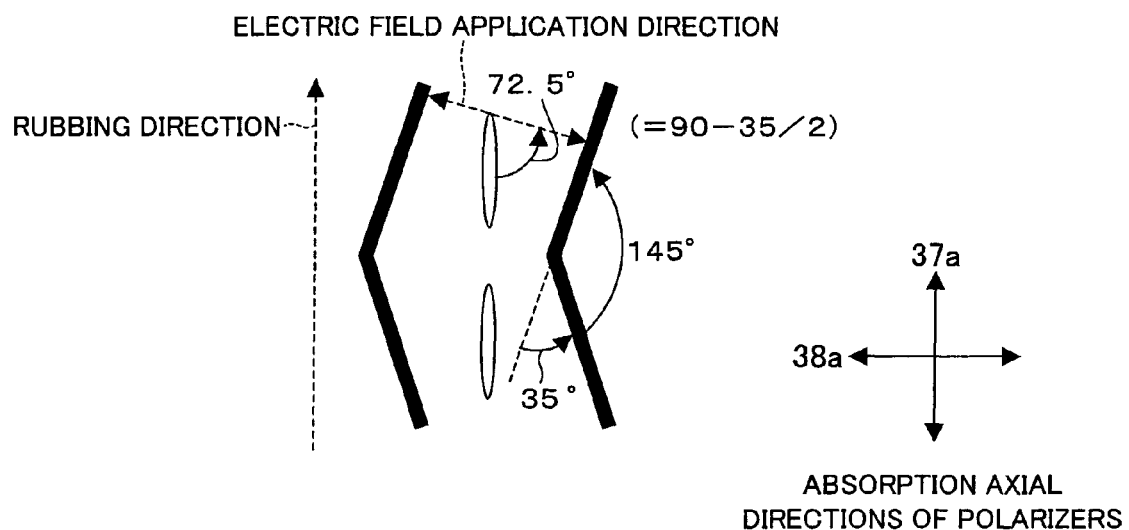

FIG. 5(a) is a view schematically illustrating rotation of liquid crystal molecules in the conventional liquid crystal display mode being provided with the zigzag electrodes that are bent at a curving angle (bending angle) of 90 degrees, that is, that are configured to give the domains to have the electric field application direction that makes an angle of 90 degrees with that of their adjacent domains. Meanwhile, FIG. 5(b) is a view schematically illustrating rotation of liquid crystal molecules in the conventional liquid crystal display mode being provided with the zigzag electrodes that are bent at a curving angle (bending angle) of 35 degrees, that is, that are configured to give the domains to have the electric field application direction that makes an angle of 35 degrees with that of their adjacent domains.

As described above, in order to attain the maximum transmissivity, the liquid crystal molecules in each domain should be rotated 45 degrees by application of the electric field. The liquid crystal molecules are rotated to be along the electric field application direction. In the case illustrated in FIG. 5(a), it is necessary that the direction of the liquid crystal molecules and the electric field application direction be completely parallel to each other. Thus, a large electric field should be applied. On the other hand, in the case illustrated in FIG. 5(b), the rotation to 45 degrees is merely an angle beyond which the liquid crystal molecules are rotated. Thus, a large voltage is unnecessary to rotate the liquid crystal molecules to 45 degrees. That is, in the domain segmentation in the mode (such as IPS mode or FFS mode) in which the conventional liquid crystal material is used and the display is carried out by changing the orientation direction of the liquid crystal molecules in plane, it is only required that the respective domains in the pixel have different electric field application directions, and it is advantageous that the electric field application directions make an angle close to zero degree. The reason why the conventional liquid crystal display mode (e.g., SIPS (Super In Plane Switching) mode, which is one type of the IPS mode) is arranged that the orientation direction and the electric field application direction make an angle slightly tilted from zero degree is to allow the liquid crystal molecules to rotate in either two ways depending on the applied electric field. Typical arrangement is such that the orientation direction and the electric field application direction make an angle in a range of from several degrees to 20 degree. As described above, the display panel 70 according to the exemplary embodiment operates in the display principle utterly different from that of the conventional liquid crystal display elements. Thus, the most preferable electrode configuration for the conventional liquid crystal display mode (such as SIPS mode) is not preferable in the exemplary embodiment.

Besides, the counter electrodes 32 and pixel electrodes 34 may be configured to apply the electric field in more than two directions or in one direction. For example, the counter electrodes 32 and pixel electrodes 34 may respectively have tooth portions 32b and 34b bent portions (saw-tooth portion) 32b1, 32b2, . . . , 32br, and 34b1, 34b2, . . . , 34br (r is an arbitral integer that indicates in how many directions the optical anisotropies occur in each pixel 71 by electric field applications) that make 90 degrees with their adjacent bent portions, thereby being configured to apply electric fields in more than two directions, some of which cross each other substantially orthogonally.

Again in this configuration, it is preferable that the absorption axial directions 37a and 38a of the polarizers 37 and 38 cross each other orthogonally, and make 45 degrees with the electric field application directions that cross each other orthogonally.

The inventors of the present invention found that this configuration also attain a display panel 70 having a wide viewing angle by preventing the coloring phenomenon in all the directions without deteriorating transmissivity.

Moreover, in the configuration illustrated in FIG. 1, there is a non-display contributing region (which does not contributes to the display) in a portion of a region 59 between the data signal line 47 and the counter electrodes 32 that are arranged to face the data signal line 47 in the pixel 71.

Figure 6:
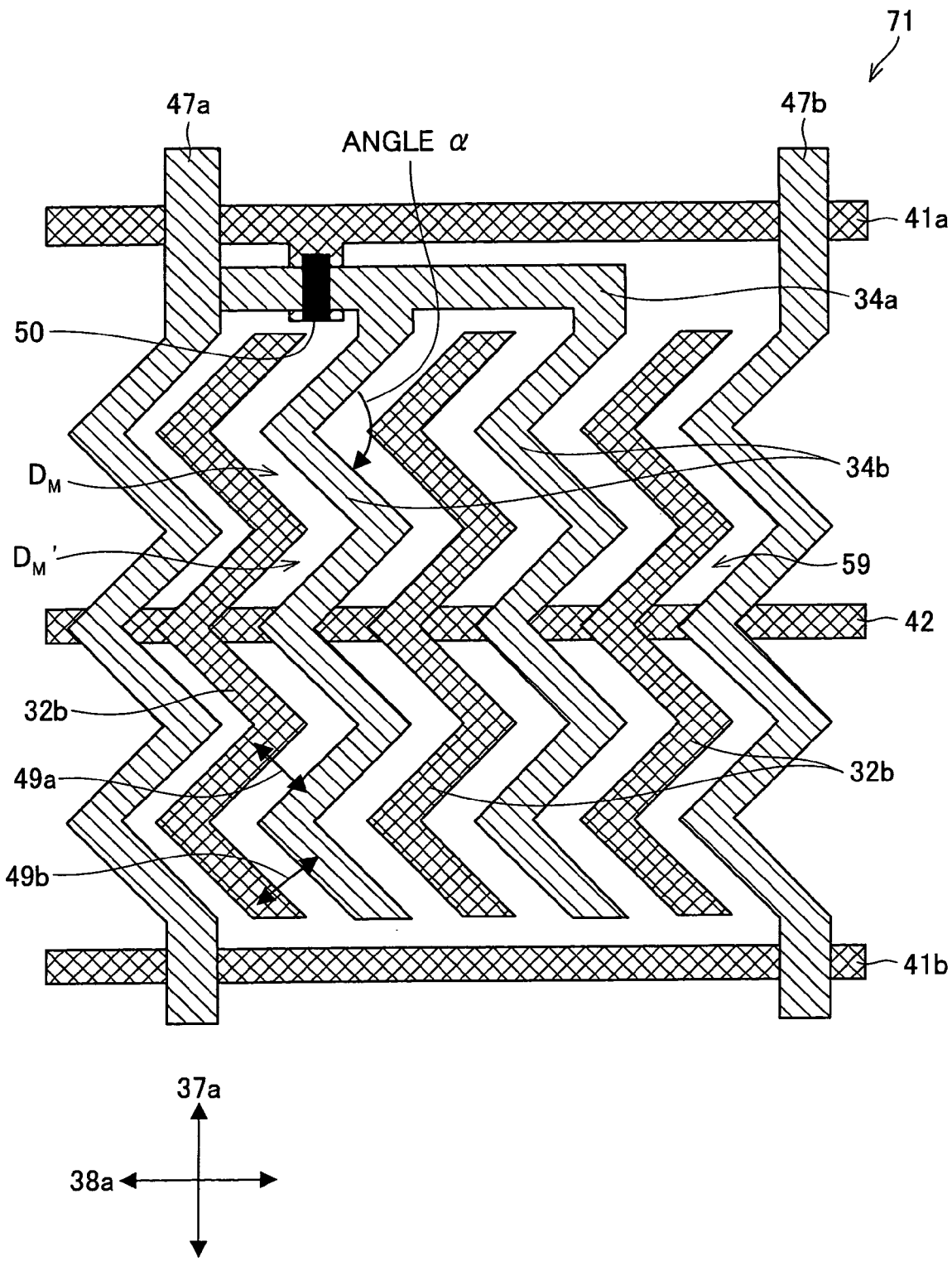
FIG. 6 is a cross-sectional view illustrating a modification of the configuration of a pixel of the display panel in accordance with the embodiment of the present invention.
Figure 7:
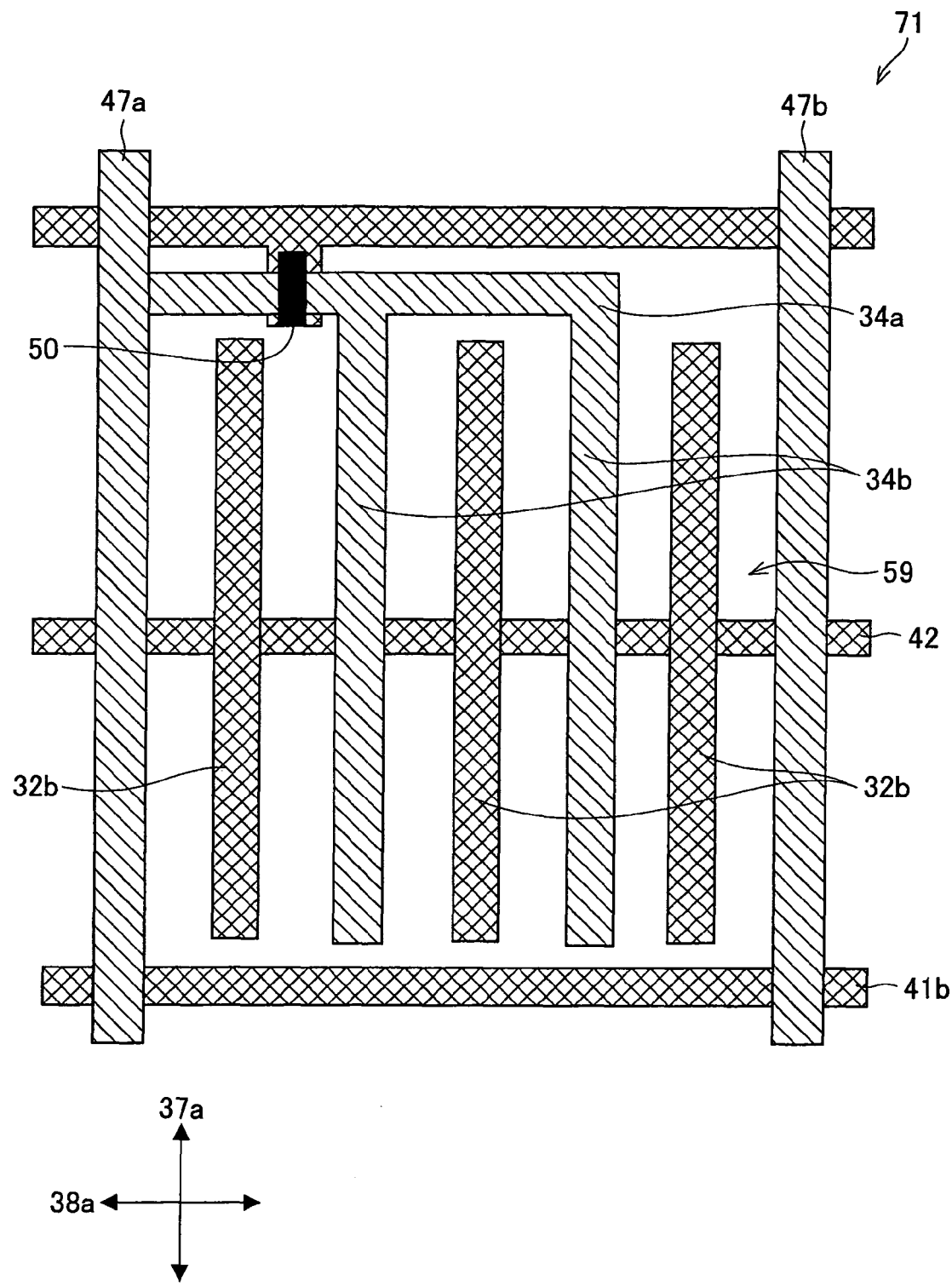
FIG. 7 is a cross-sectional view illustrating a modification of the configuration of a pixel of the display panel in accordance with the embodiment of the present invention.

In view of this, as in the configuration illustrated in FIG. 6, the data signal line 47 may not be linear, but bended (zigzagged) in parallel with bending (tooth portions) of the counter electrode 32 and pixel electrodes 34 located in the pixel 71. This significantly reduces the area of the non-display contributing region occurred in the region 59.

While it reduces the area of the non-display contributing region, the zigzag-shaped data signal lines 47 cannot be parallel or orthogonal to the absorption axial directions 37a and 38a of the polarizers 37 and 38. Because of this, the electric field formed between the data signal lines 47 and the electrodes in the pixels (i.e., pixel electrodes 34 or counter electrodes 32) induces a change in the magnitude of the optical anisotropy of the medium A. This results in light leakage. Therefore, in the configuration in which the data signal lines 47 are zigzag-shaped, it is preferable to use a medium having a large threshold (a voltage value at which the change in the magnitude of the optical anisotropy occurs).

Such a medium A with a large threshold requires a large electric field intensity to change the magnitude of the optical anisotropy thereof. This makes it difficult for the electric field occurred between the data signal lines 47 and the electrodes in the pixel to induce the change in the magnitude of the optical anisotropy of the medium A. Thereby, the light leakage becomes hard to occur.

The present invention is not limited to the configuration in which the data signal lines 47 are zigzag-shaped, and may be arranged such that the scanning signal lines (gate signal lines) 41 or common signal lines 42 are zigzag-shaped.

Moreover, the present invention is not limited to the embodiment in which the counter electrodes 32 and the pixel electrodes 34 are arranged along the data signal lines 47. For example, the counter electrodes 32 and the pixel electrodes 34 may be arranged along the scanning signal lines 41. As an alternative, the common signal lines 42 may be arranged in parallel with the data signal lines 47. Moreover, the scanning signal lines 41 may be zigzag-shaped in parallel with the bending of the tooth portions of the counter electrodes 32 and pixel electrodes 34. In the configuration in which the scanning signal lines 41 are zigzag-shaped, a medium with a large threshold value is preferable as in the configuration illustrated in FIG. 6 in which the data signal lines 47 are zigzag-shaped.

In the following, one example of a production method for the configuration in which the common signal lines 42 are parallel with the data signal lines 47.

Firstly, a metal (e.g., MoW) of a high electric conductivity is vapor-deposited on the lower substrate 30, and then patterned into a predetermined pattern thereby to form the scanning signal lines 41. After that, silicon nitrogen oxide film, silicon nitride film, amorphous silicon layer, or the like is vapor-deposited and then patterned into a predetermined pattern. Subsequently, ITO is vapor-deposited and then patterned into a predetermined pattern thereby to form the counter electrodes 32.

Next, the metal film containing highly conductive aluminum is formed by vapor deposition and then patterned into a predetermined pattern thereby to form the data signal lines 47 and counter signal lines 42 in such a way that the common signal lines 42 are electrically connected with the counter electrodes 32, and that the distance between the data signal lines 47 and common signal lines 42 is wider than the width of the data signal lines 47. The data signal lines 47 and common signal lines 42 are prevented from being electrically connected with each other by having a wider distance therebetween than the width of the data signal lines 47.

After that, the protective film is formed. Then, ITO is vapor-deposited and then patterned into a predetermined pattern thereby to form the pixel electrodes 34.

In this production method, the scanning signal lines 41 are formed at an early stage in the display panel formation process. Thus, the scanning signal lines 41 should satisfactorily tolerable against heat applied thereon throughout the display panel formation process. Thus, the scanning signal lines 41 should be made of a metal (e.g., MoW) that is excellent in heat resistance. On the other hand, the common signal lines 42 and the data signal lines 47, which are formed in later stages in the display panel formation process, may be made of a metal less heat resistance than the metal of which the scanning signal lines 41 are made. Thus, the common signal lines 42 and the data signal lines 47 may be made of a metal that is less heat resistance but more electrically conductive than the material of which the scanning signal lines 41 are made. For example, the common signal lines 42 and the data signal lines 47 may be made of aluminum. The common signal lines 42 made of a metal of high electrical conductivity may have a narrower line width, which leads to a smaller area of the common signal lines 42 per unit pixel. This improves the transmissivity of the display panel.

Moreover, in the configuration in FIG. 1, the distance between the scanning signal lines 41 and the common signal lines 42 is greater than the width of the scanning signal lines 41. Such large distance between the scanning signal lines 41 and the common signal lines 42 prevents the electric conduction (i.e., electric connection) between the scanning signal lines 41 and the common signal lines 42.

Moreover, the present invention is not limited to the configuration of FIG. 1 in which the counter electrodes 32 and the pixel electrodes 34 have tooth portions in the zigzag shape. For example, the counter electrodes 32 and the pixel electrodes 34 may have tooth portions in a linear shape. Moreover, the present invention is not limited to the configuration of FIG. 6 in which the common signal lines 42 are respectively arranged substantially in the middle between the adjacent scanning signal lines 41 and substantially in parallel with the scanning signal lines 41, and the tooth portions 32*b* of the counter electrodes 32 are extended in directions from the common signal lines 42 toward the respective scanning signal lines 41.

Figure 8:
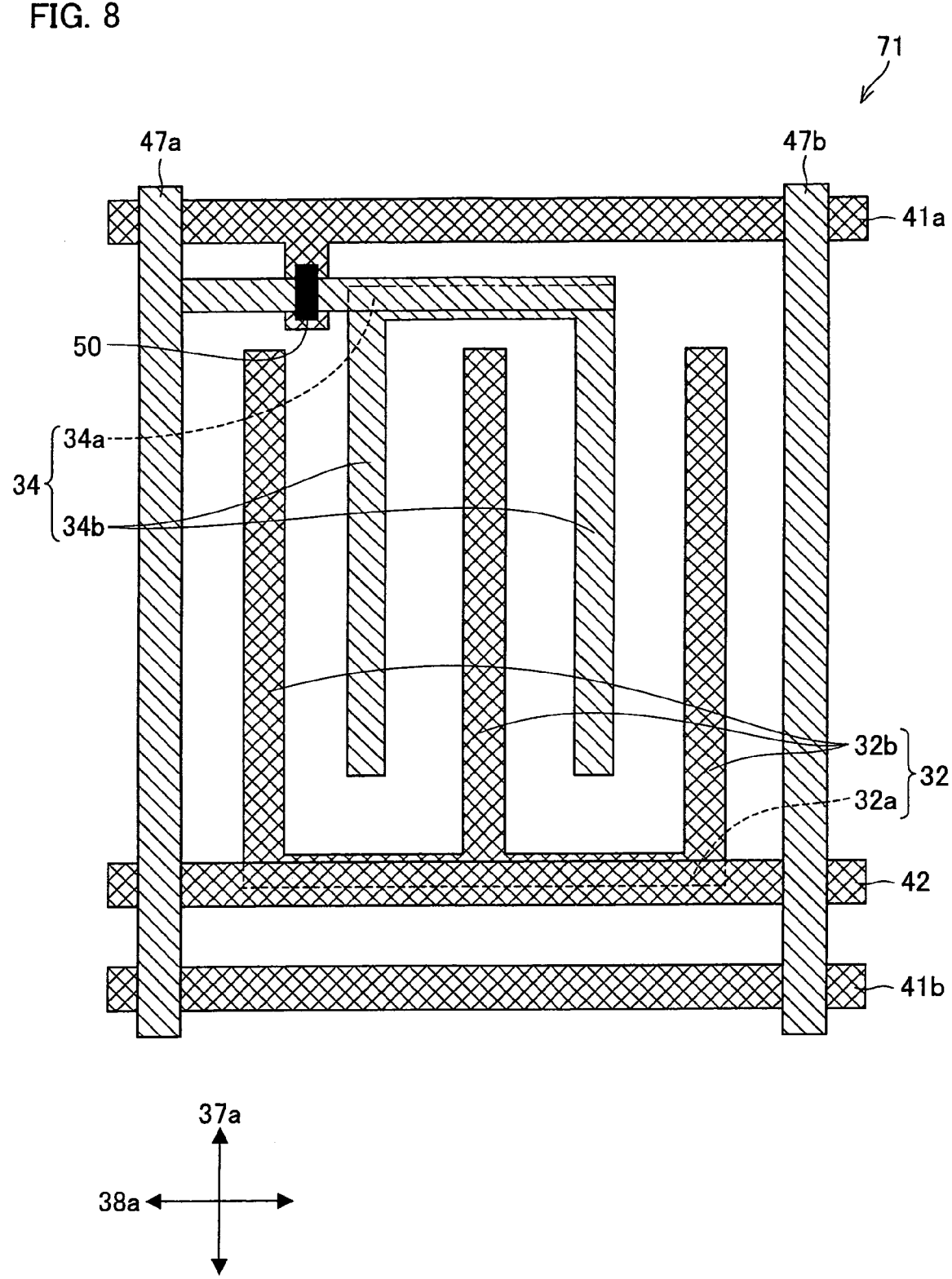
FIG. 8 is a cross-sectional view illustrating a modification of the configuration of a pixel of the display panel in accordance with the embodiment of the present invention.

For example, as illustrated in FIG. 8, each common signal line 42 may be respectively located in the vicinity of a scanning signal line 41 that is arranged to drive a pixel that is adjacent to that pixel with which the common signal line 42 is associated, and tooth portions 32*b* of counter electrodes 32 are extended from the common signal line 42 to a scanning signal line 41 that is arranged to drive the pixel with witch the common signal lines 42 is associated.

Figure 9:
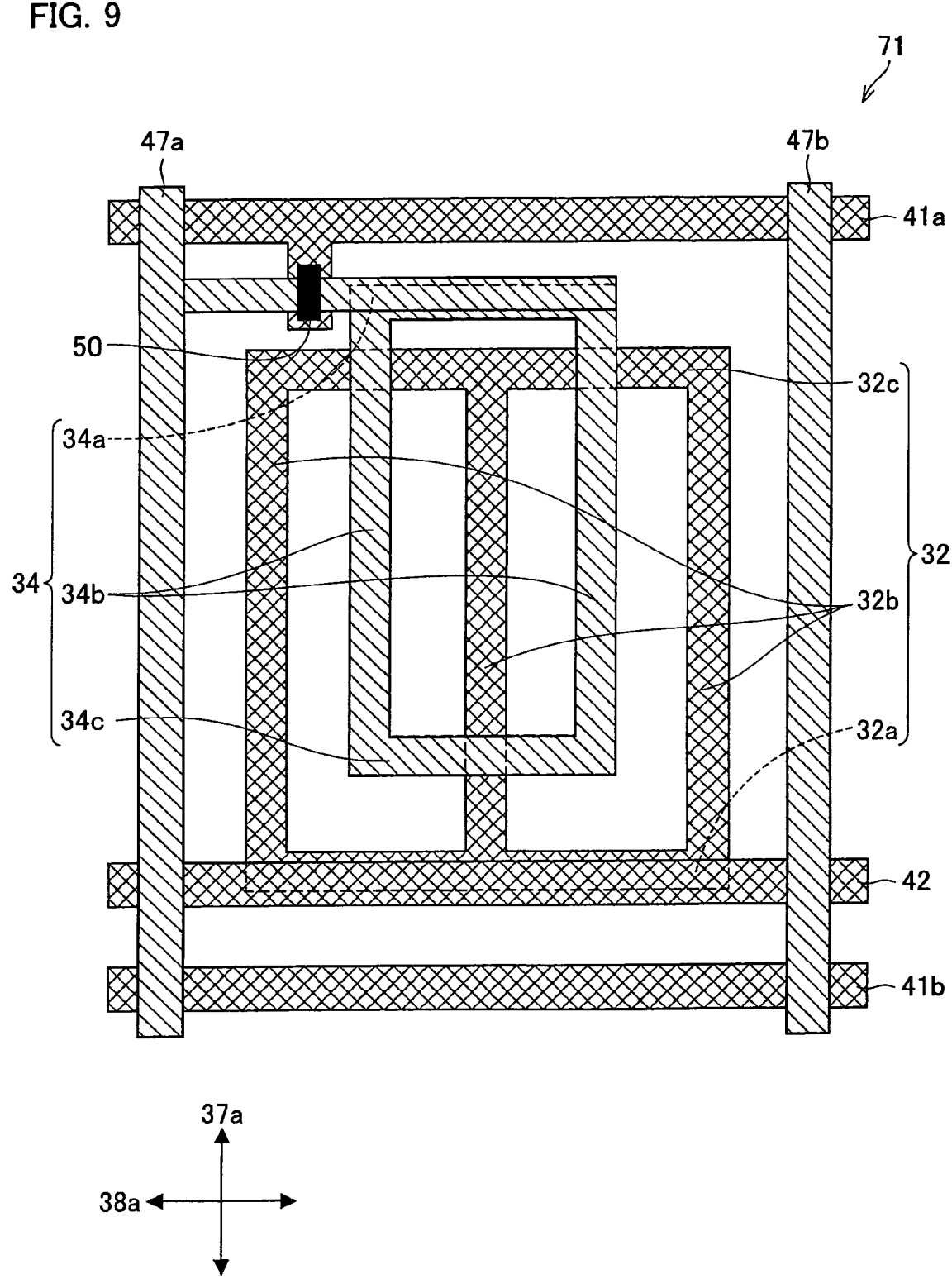
FIG. 9 is a cross-sectional view illustrating a modification of the configuration of a pixel of the display panel in accordance with the embodiment of the present invention.

Moreover, as illustrated in FIG. 9, the tooth portions 32*b* are connected with each other via connection portions 32*c* that are connected to tip portions of the tooth portions 32*b* respectively.

Moreover, the distance L2 between the adjacent tooth portions 32*b* of the counter electrodes 32 may be same as or different from the width P2 of the tooth portions 34*b* of the pixel electrodes 34. Moreover, the distance L3 between the tooth portions 34*b* of the pixel electrodes 34 may be same or different from the width P1 of the tooth portions 32*b* of the counter electrodes 32.

Moreover, the present invention is not limited to the configuration of FIG. 4 in which the pixel electrodes 34 and the counter electrodes 34 do not overlap each other when viewed in the normal direction of the substrate plane. For example, part or whole of the pixels electrodes may overlap the counter electrodes 32 when viewed in the normal direction of the substrate plane.

That is, the counter electrode 32 may not have a comb-like shape (in other words, the counter electrodes 32 and the pixel electrodes 34 may not be interleave electrode). For example, the counter electrodes 32 may have a rectangular (or square) shape of the unit pixel in size, as illustrated in FIG. 10.

Figure 10:
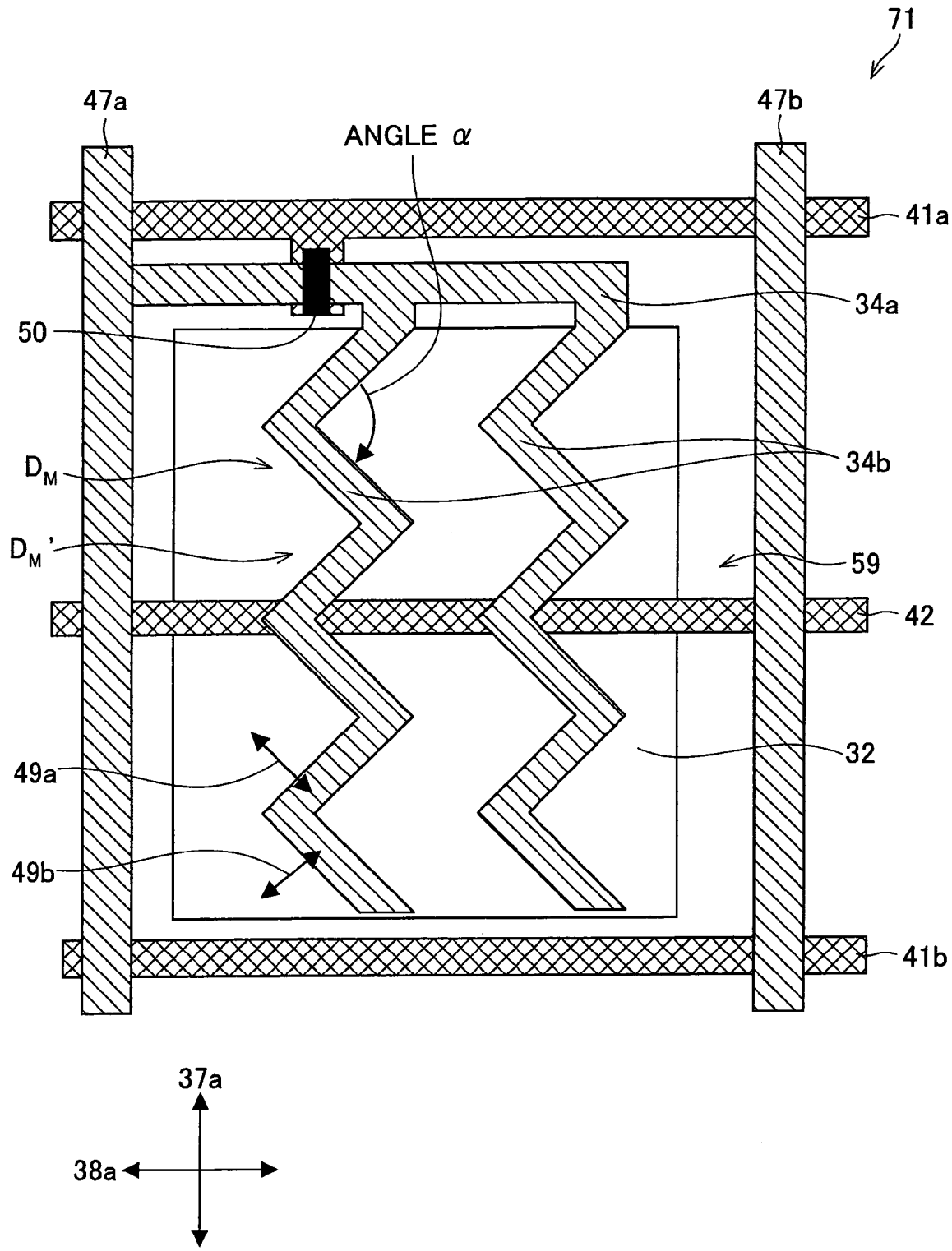
FIG. 10 is a cross-sectional view illustrating a modification of the configuration of a pixel of the display panel in accordance with the embodiment of the present invention.
Figure 11:
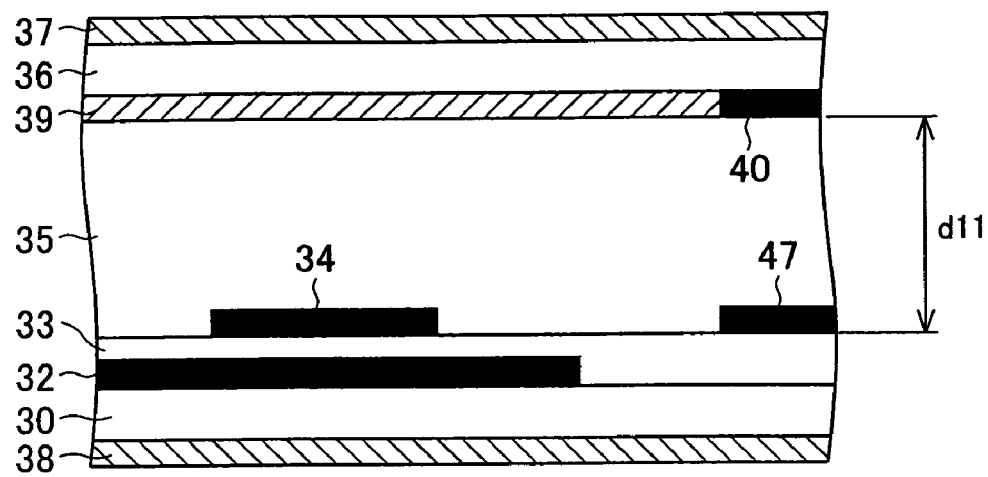
FIG. 11(a) is a cross-sectional view illustrating a modification of the configuration of a pixel of the display panel in accordance with the embodiment of the present invention.
FIG. 11(b) is a cross-sectional view illustrating a modification of the configuration of a pixel of the display panel in accordance with the embodiment of the present invention.
Figure 11:
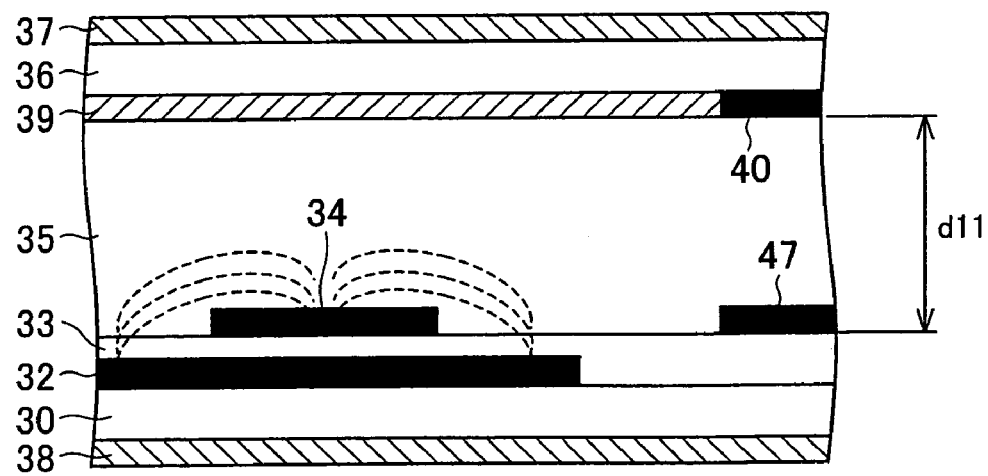

FIGS. 11(*a*) and 11(*b*) are cross sectional views illustrating an example (e.g., the configuration of FIG. 10) in which the pixels electrodes 34 overlap the counter electrodes 32 when viewed in the normal direction of the substrate plane. FIG. 11(*a*) illustrates a case where no electric field is applied, while FIG. 11(*b*) illustrates a case where an electric field is applied.

As illustrated in FIG. 11(*b*), the configuration in which the pixels electrodes 34 overlap the counter electrodes 32 when viewed in the normal direction of the substrate plane can attain a parabolic fringe electric field having a larger curvature and radius than in the conventional configuration in which the pixel electrode 34 and the counter electrodes 32 are formed in the same layer. The change in the orientation of the medium A is induced in the region on the electrodes with this fringe electric field. More specifically, the equipotential lines are formed on regions above the counter electrodes 32 and pixel electrodes 34, in addition to between the counter electrodes 32 and the pixel electrodes 34, when an electric field is applied thereon. With this, it is possible to induce the change in the magnitude of the optical anisotropy of the medium A in the regions above the counter electrodes 32 and the pixel electrodes 34 by the electric field application.

It was observed in the configuration in which the counter electrodes 32 have a shape as illustrated in FIG. 10 that the maximum transmissivity of a display panel 70 was approximately 4%, which is better than conventional typical display devices. This indicates that electric lines of force occur between the electrodes by applying the electric field between the electrodes even in the configuration of FIG. 10. That is, the configuration in which the counter electrodes 32 and the pixel electrodes 34 overlap each other in the normal direction of the substrate plane allows the formation of the equipotential lines on the region above the pixel electrodes 34 and the counter electrodes 32, in addition to between the pixel electrodes 34 and the counter electrodes 32, when the electric field is applied thereon. This makes it possible to induce a change in the magnitude of the optical anisotropy of the medium A in the regions above the pixel electrodes 34 and the counter electrodes 32 by electric field application. Thus, the equipotential lines are formed in the regions substantially similar to the regions where the equipotential lines are formed in the configuration in which the counter electrodes 32 are formed in the comb-like shape (i.e., the counter electrodes 32 and the pixel electrodes 34 are interleaved). Thus, this configuration attains an effect similar to that of the configuration in which the counter electrodes 32 are comb-like shaped.

Moreover, as illustrated in FIGS. 11(*a*) and 11(*b*), it is also preferable in the configuration the pixel electrodes 34 and the counter electrodes 32 overlap each other when viewed in the normal lines of the substrate plane that the distance between the scanning signal lines 41 and the common signal lines 42 be greater than the width of the scanning signal lines 41. By configuring such that the distance between the scanning signal lines 41 and the common signal lines 42, it is possible to prevent electric conduction between the scanning signal lines 41 and the common signal lines 42.

The shape of the counter electrodes 32 are not limited to the rectangular/square shape or comb-like shape, and may be any shape as appropriate as long as an electric field can be applied on the medium A in the pixels in which the counter electrodes 32 are respectively provided.

Figure 12:
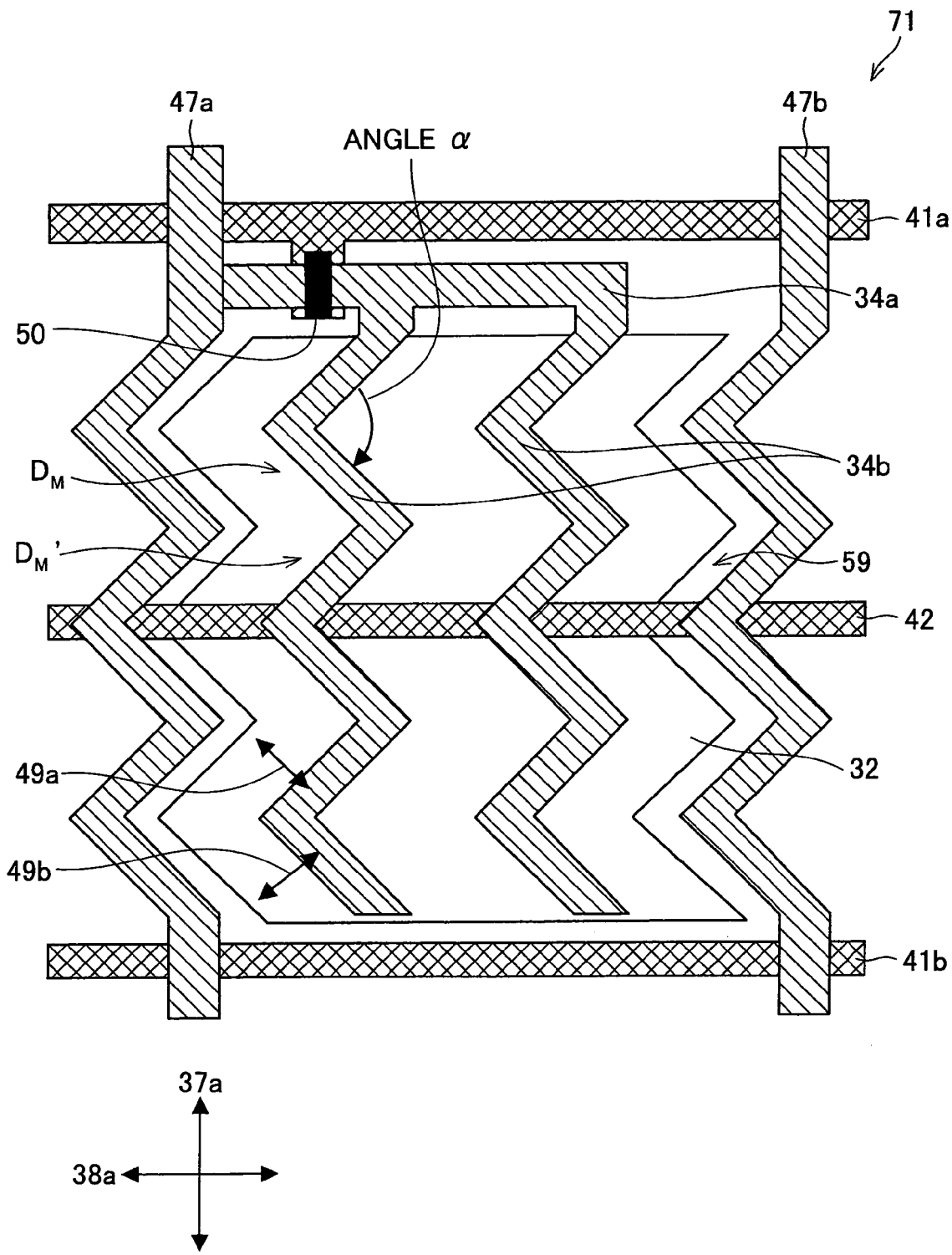
FIG. 12 is a cross-sectional view illustrating a modification of the configuration of a pixel of the display panel in accordance with the embodiment of the present invention.
Figure 13:
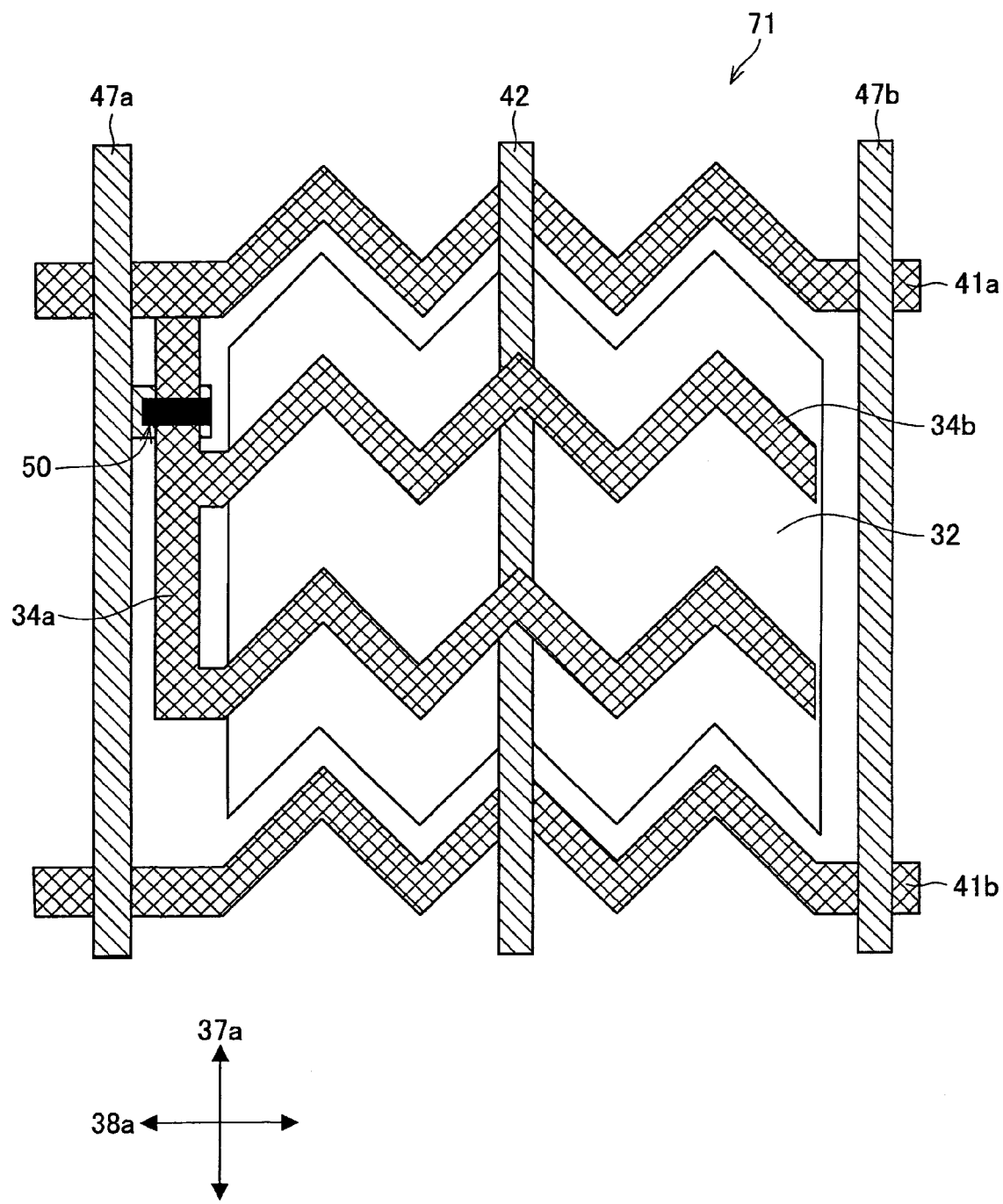
FIG. 13 is a cross-sectional view illustrating a modification of the configuration of a pixels of the display panel in accordance with the embodiment of the present invention.

For example, in the configuration in which the data signal lines 47 are zigzag-shaped, the pixel electrodes 34 may be configured such that portions thereof which face the data signal lines 47 have a zigzag shape that is along the zigzag shape of the data signal lines 47, as illustrated in FIG. 12. Moreover, in the configuration in which the scanning signal lines 41 are zigzag-shaped, the pixel electrodes 34 may be configured such that edges thereof which face the scanning signal lines 41 are along the shape of the scanning signal lines 41, as illustrated in FIG. 13.

Figure 14:
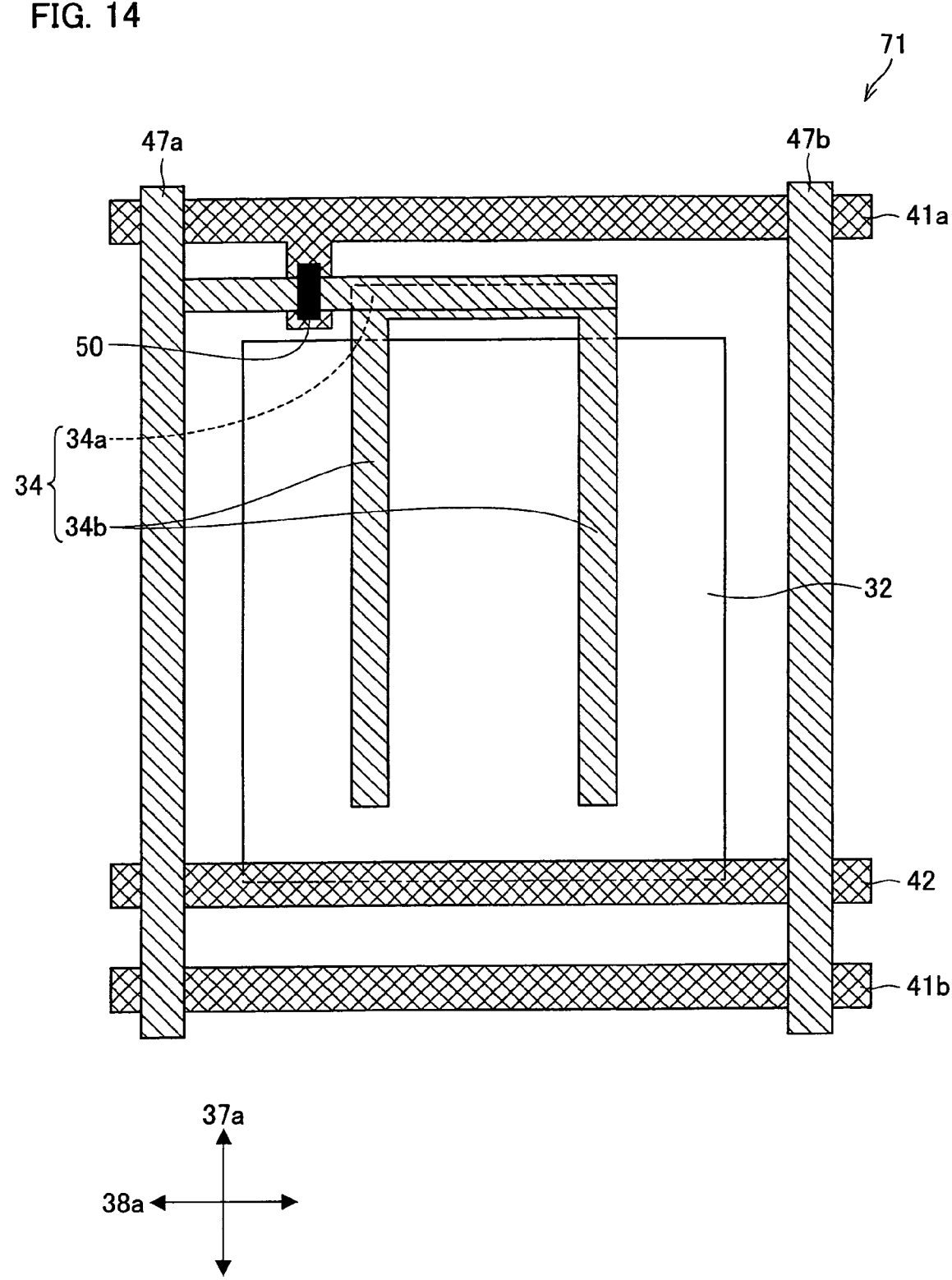
FIG. 14 is a cross-sectional view illustrating a modification of the configuration of a pixel of the display panel in accordance with the embodiment of the present invention.
Figure 15:
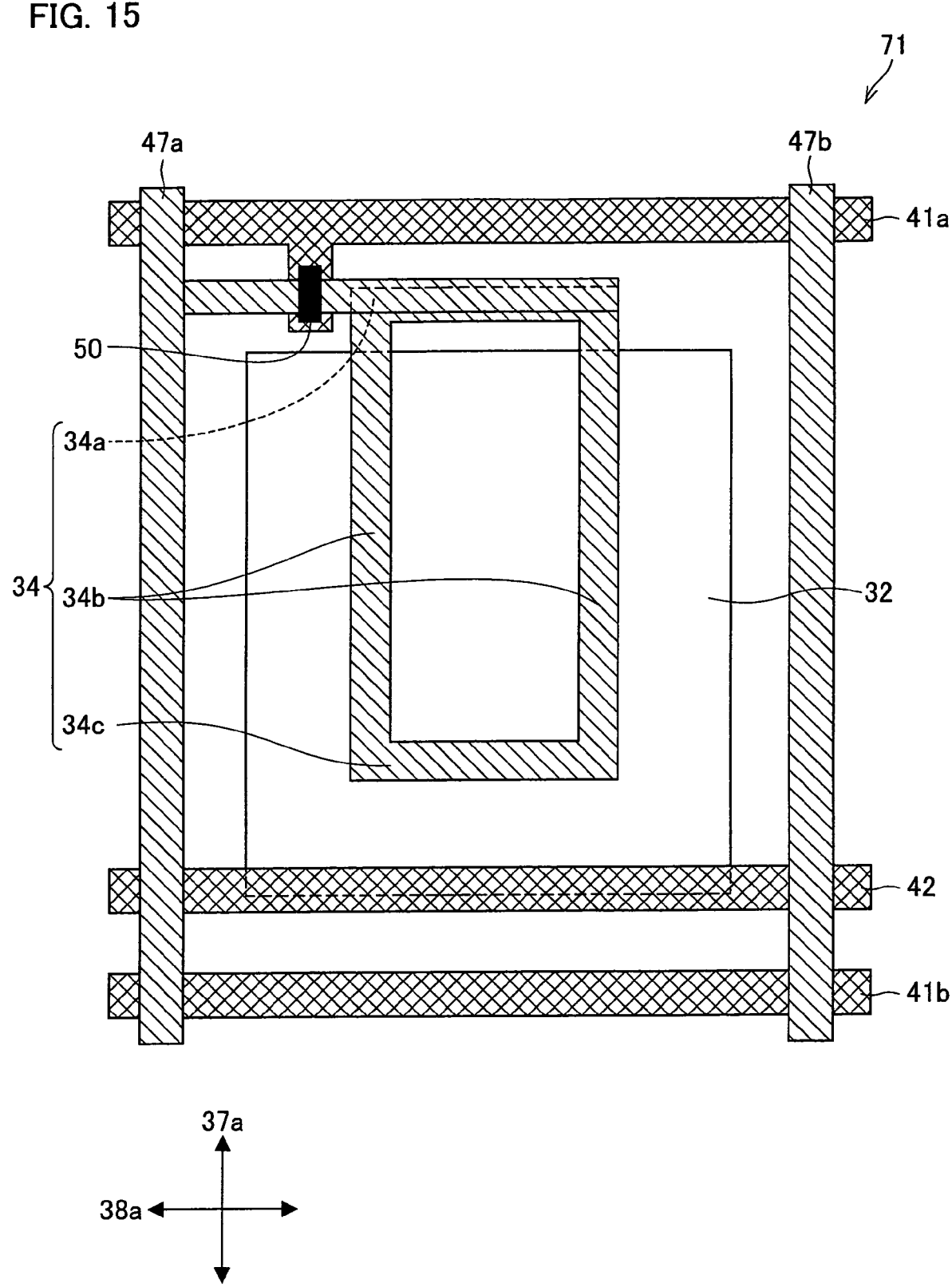
FIG. 15 is a cross-sectional view illustrating a modification of the configuration of a pixel of the display panel in accordance with the embodiment of the present invention.
Figure 16:
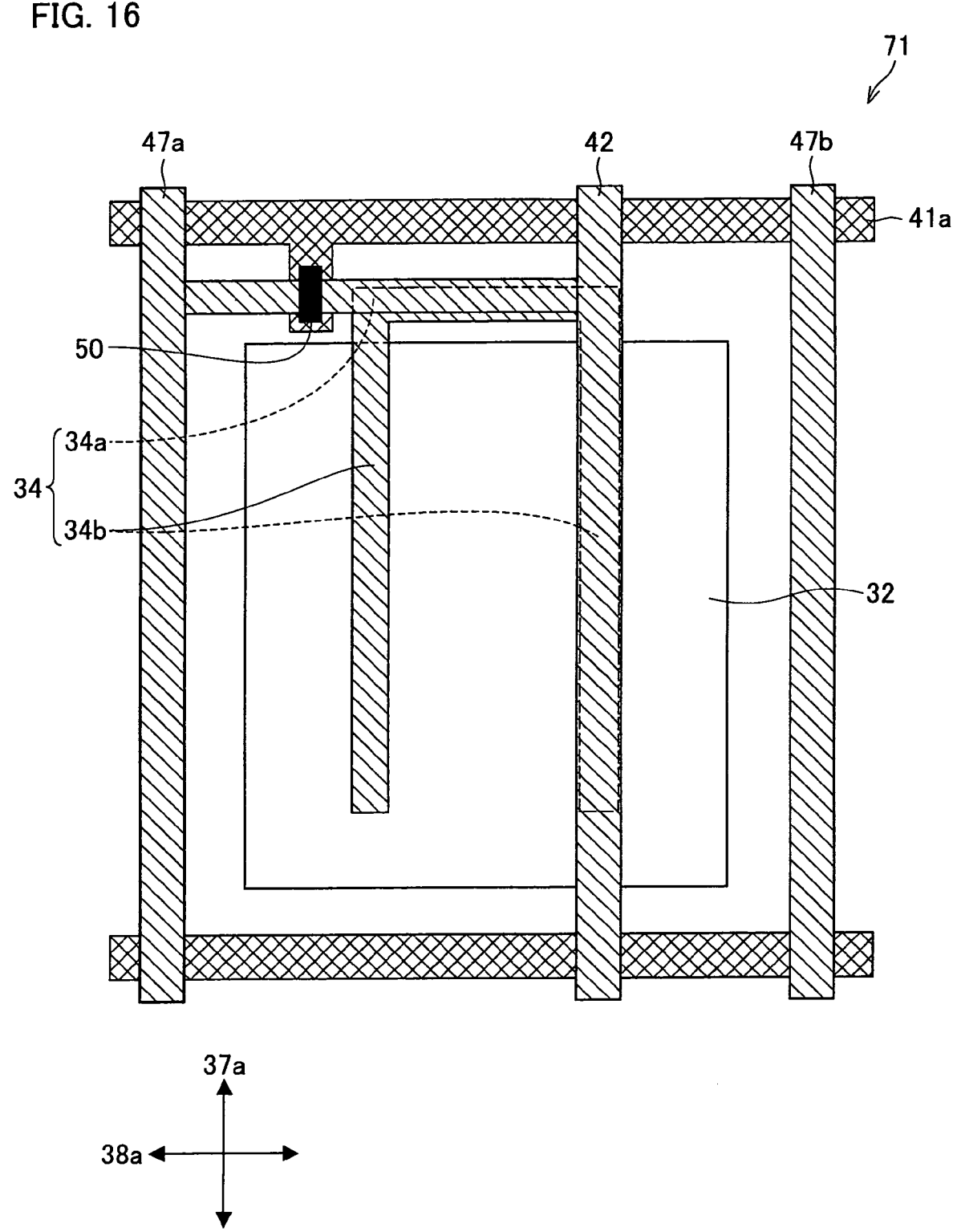
FIG. 16 is a cross-sectional view illustrating a modification of the configuration of a pixel of the display panel in accordance with the embodiment of the present invention.

Moreover, it is an alternative that, as illustrated in FIG. 14, tooth portions 34b of the pixel electrodes 34 are linear in shape, which the counter electrodes 32 are rectangular/square in shape. Furthermore, the configuration of FIG. 14 may be modified such that, as illustrated in FIG. 15, the tip of the tooth portions 34b of the pixel electrodes 34 are connected via the connecting portions 34c. Further, as illustrated in FIG. 16, the common signal lines 42 may be in parallel with the data signal lines 47.

Moreover, in each of the configurations discussed above, the positions and the shapes the pixel electrodes 34 may be exchanged with these of the counter electrodes 32.

Moreover, the present invention is not limited to the exemplary embodiment in which the black matrix 40 is provided to the upper substrate 36. The black matrix 40 may be provided to the lower substrate 30. For example, the black matrix 40 may be formed on an insulating film provided above the data signal lines 47 (i.e., provided between the insulating film and the upper substrate 36), in such a manner that the black matrix 40 covers the data signal lines 47. In case where the black matrix is provided to the upper substrate 36, the black matrix should be formed with a certain margin in case where accuracy is low in bonding the upper substrate 36 and the lower substrate 30. The aperture ratio becomes lower accordingly as much as the margin is. On the other hand, in case where the black matrix is provided to the lower substrate 30, the margin for bonding can be omitted. Thus, the aperture ratio is improved accordingly due to the omission of the margin. This leads to better transmissivity.

While the counter electrodes 32 and pixel electrodes 34 are provided to the lower substrates 30 in the exemplary embodiment, a shield electrode (third electrode) may be additionally provided to the upper substrate 36, the shield electrode covering the surface of the upper substrate 36.

FIGS. 17(a) to 17(e) are cross sectional views illustrating exemplary configurations in which a shield electrode 31 is provided to the upper electrode 36. In the exemplary configuration of FIG. 17(a), the shield electrode 36 is provided on that side (facing side) of the upper substrate 36 which faces the lower substrate 30, the shield electrode 31 covering the color filter 39, in addition to the configuration of FIGS. 11(a) and 11(b).

In the exemplary configuration of FIG. 17(b), the shield electrode 31 is provided between the upper substrate 36 and the color filter 39. In the exemplary configuration of FIG. 17(c), the shield electrode 31 is provided on that side of the upper substrate 36 which is a reverse side of the facing side thereof, the shield electrode 31 covering the polarizer 37. In the exemplary configuration of FIG. 17(d), the shield electrodes 31 are provided between the upper substrate 36 and the polarizer 37.

The present invention is not limited to the exemplary configurations of FIGS. 17(a) to 17(d), in which the shield electrode 31 is provide to the upper substrate 36. A shield electrode may be provided to the lower substrate 30. As in the exemplary configuration of FIG. 17(e), another shield electrode 31 may be provided on that side of the lower substrate 30 which is a reverse side of the facing side of the lower substrate 30 (i.e., a reverse side of that side of the lower substrate 30 which faces the upper substrate 36). By providing the shield electrodes 31 to both the substrates, it is possible to attain a greater shield effect. The present invention is not limited to the exemplary configuration of FIG. 17(e) in which the another shield electrode 31 is arranged to cover the polarizer 38. For example, another shield electrode 31 may be provided between the lower substrate 30 and the polarizer 38.

Preferably, the shield electrode 31 may be made of a transparent electrode material such as ITO (Indicum Tin Oxide), IZO (Indium Zinc Oxide), ZnO, or the like. In the exemplary configurations of FIGS. 17(a) to 17(e), the shield electrode 31 is made of ITO with a thickness of 0.3 μm. Note that this electrode material and the thickness are merely examples and the present invention is not limited to these.

In the configurations of FIGS. 17(a) to 17(e) where the shield electrode 31 had a GND potential, that is, the counter electrodes 32 and the pixel electrodes 34 had the same when no electric field was applied, it was observed that that fluctuation in brightness could be reduced compared with the configurations in which no shield electrode 31 was provided.

In case of the display panel in which no shield electrode is provided, static electricity affects inside of the cells, a result of which the medium A responds to the static electricity so as to cause fluctuation in brightness. It is considered that the cells are shielded from the external static electricity by the shield electrode 31 provided as in FIGS. 17(a) to 17(e), thereby preventing the static-electricity-causing problems described above.

In the display panel 70 in which no shield electrode 31 was provided, it was observed that, when the display panel 70 was touched with an object having static electricity, light leakage occurred especially during black display, thereby causing display quality deterioration such as lower contrast. However, in the display panel 70 in which the shield electrode 31 was provided, no such problems occurred.

It is not necessary that the shield electrode 31 should have zero potential. As long as the electric potential of the shield electrode 31 is fixed at a certain value, the shield effect as described above can be attained. For example, such a shield effect can be attained by causing a floating state of the shield electrode in which the shield electrode is electrically cut off from the other electrodes and signal lines provided in the display panel 70. Moreover, the shield effect can be enhanced by fixing the shield electrode 31 at the GND potential (i.e., connecting the shield electrode 31 to the GND).

Moreover, when the shield electrode 31 is provided in the display panel 70, the display unevenness due to the unevenness of temperature can be restrained. The following will discuss why this can be attained.

External environments, light source (back light) of the display panel, and the shape of the display panel are possible causes of the temperature unevenness. Especially, the external environments are factors that change regardless of the designs of the display devices. Therefore, the display devices should be configured to deal especially with the external environments. Most effective configuration is to provide an electric conductive material on an external side (outermost surface) of the display panel.

Assume a display operation using a display panel 70 in which the medium A is 5CB (4-cyano-4'-pentyl biphenyl, made by Aldrich) and is kept at temperatures in the vicinity of a temperature right above its nematic-isotropic phase transition point. In this case, the transmissivity changes dramatically without temperature control of ±0.1K. That is, the optical anisotropy attained by an electric field application is expressed by:

$$\Delta n = \lambda \cdot Bk \cdot E^2, \tag{3}$$

where λ is a wavelength (m) of incident light in vacuum, and Bk is the Kerr constant (m/V²), and E is intensity of applied electric field (V/m). It is known that, as the temperature increases, the Kerr constant Bk decreases according to the function proportional to: 1/(T−Tni). Thus, the Kerr constant Bk is susceptible to the influence from the temperature (T) of the display panel. Therefore, in the display panel in which the Kerr effect is utilized, even slight temperature unevenness would cause a large optical anisotropy change (Δn: birefringence) in the medium A of the medium layer 35, thereby causing a large change in the transmissivity. This would cause display unevenness.

However, the temperature unevenness can be reduced and thus better display property can be attained by covering the medium 35 with a material having high heat conductivity (i.e., shield electrode 31), as in the display panel of the exemplary embodiment.

In general, heat conductivity of organic materials (such as the medium A and polarizers 37 and 38) is about 2 W/m·K, and heat conductivity of the substrates 30 and 36 such as the glass substrate is about 0.8 W/m·K. Meanwhile, ITO, which can be used for the transparent electrode, has a heat conductivity of about 8 W/m·K, which is ten times greater than that of the glass substrate. In general, electric conductive material has a high heat conductivity. Therefore, it is possible to reduce the temperature unevenness (temperature uneven distribution) by covering the medium A with an electric conductive material such as ITO or the like.

This effect cannot be attained in the conventional liquid crystal display elements. That is, the property values of the conventional liquid crystal materials are almost unchangeable by a temperature change of several K. On the other hand, in the display panel in which the display operation is carried out by utilizing the change in the magnitude of the optical anisotropy, the temperature fluctuation is large in theory as described above, and thus display unevenness would be caused due to the temperature unevenness. In other words, the problem of the display unevenness due to the temperature unevenness of several K is a problem associating display panels in which the change in the magnitude of the optical anisotropy is utilized, like the display panel 70 of the exemplary embodiment. In the exemplary embodiment, this problem is solved by providing the shield electrode 31 in the display panel 70.

Moreover, it is preferable that di>L1, where L1 is the distance (electrode-electrode distance) between the counter electrodes 32 and the pixel electrodes 34, and di is the distance between the pixel electrodes 34 and the shield electrodes 31. This configuration attains the shield effect without increasing the driving voltage.

However, even if di<L1, it is possible to attain the static electricity shield effect and the prevention of the temperature unevenness, even though the driving voltage becomes high. Especially if di>3 μm, even though the driving voltage becomes high, the transmittance is not sacrificed as long as the voltage is high. Because Δn is typically approximately 0.1 when the medium A is oriented perfectly, it is preferable that di·Δn=about 300 nm at least (>λ/2), in order to maintain the transmittance. Therefore, it is preferable that di>3 μm.

As described above, there is no particular limitation in the location of the shield electrode 31. However, it is preferable to provide the electrode 31 at a location closer to the medium 35, in other words, between the upper substrate 36 and lower substrate 30, that is, to the inner side (i.e. facing side) of the upper substrate 36 and/or lower substrate 30, because this allows the shield electrode 31 to be closer to (in a greater vicinity of) the medium layer 35, thereby attaining higher shielding effect.

The display panel 70 according to the exemplary embodiment is such that the medium A is hardly affected from the electric field, unlike the liquid crystal display element of the IPS mode. Thus, it is possible to provide the shield electrode 31 to that facing (inner) side of at least one of the upper substrate 36 and lower substrate 30, which faces against a facing side of the other. As described above, there is no particular limitation in the location of the shield electrode 31. The effect is attained as long as the shield electrode 31 is so provided as to overlap the display section (the region (display region) where the light passes through) in each pixel 71.

It is preferable that the shield electrode 31 be formed in the whole region that contributes to the display operation. In other words, it is preferable that the electrode 21 be formed at least in the region that contributes to the display operation. This arrangement is preferable because it attains more remarkable shield effect. That is, the shield electrode 31 may be formed by being patterned such that the shield electrode 31 covers only the region that contributes to the display. By forming the shield electrode 31 such that the shield electrode 31 does not cover the region that does not contribute to the display, the load capacitance is reduced, thereby improving the charging property of the switching elements 50 such as TFTs.

Further, the shield electrode 31 may be arranged such that it overlaps two or more consequent (adjacent) pixels 71. More specifically, the shield electrode 31 may be provided, for example, on the surface of at least one of the substrates (i.e. on the other principal plane of the substrates than the principal plane of the substrates on which the first and the second electrodes (counter electrodes 32 and the pixel electrodes 34) are provided, where the principal plane is a surface of one of the substrates but the other principal plane is any one of that surface of the one of the substrates and surfaces of the other one of the substrates). Further, the shield electrode 31 may be provided, for example, to cover at least that region of at least one of the substrates which corresponds to a display screen (i.e. a whole area of a part of the principal plane of one of the substrates which corresponds to the display screen). As an alternative, the electrode 21 may be provided per pixel 71 so that the electrodes 21 are provided independently from each other (here, principal surfaces of the substrates encompass front and/or back surfaces of the substrates).

The shield electrode 31 may have a function as a heating means for heating the medium layer 35, in addition to the function as the shield electrode for shielding the static electricity, and the function of reducing the temperature unevenness. By this, it is possible to more effectively reduce or prevent the display unevenness caused due to the temperature unevenness in the medium layer 35.

The shield electrode 31 may have such a shape that the shield electrode 31 dose not overlap the counter electrodes 32 and the pixel electrodes 34 when viewed in the normal direction of the substrate plane. With this configuration, it is possible to reduce load capacitance that occurs between (i) the shield electrode 31 and (ii) the counter electrodes 32 and the pixel electrodes 34. This improves the charging property of the pixels.

Moreover, the shield electrode 31 is preferably made of a transparent electrode such as ITO (Indium Tin Oxide), IZO (Indium Zinc Oxide), ZnO, or the like. By configuring the shield electrode 31 as transparent electrodes, it is possible to prevent transmissivity deterioration while attaining the static electricity shielding effect. This attains a display panel of high reliability.

Moreover, a groove (groove section) may be formed in the counter electrodes 32 or the pixel electrodes 34. That is, at least either of the counter electrodes 32 and the pixel electrode 34 may have a groove section in which no electrode material is provided when viewing the electrodes in the normal direction of the substrate plane. By providing such a groove section, it is possible to attain a greater charging capacitance between the counter electrodes and the pixel electrodes 34. Moreover, it is possible to reduce a phenomenon that a DC electric field is applied on the medium layer 35 during electric field application on the medium layer 35. This reduces deterioration of the medium A, thereby causing the display panel more reliable and durable.

Figure 18:
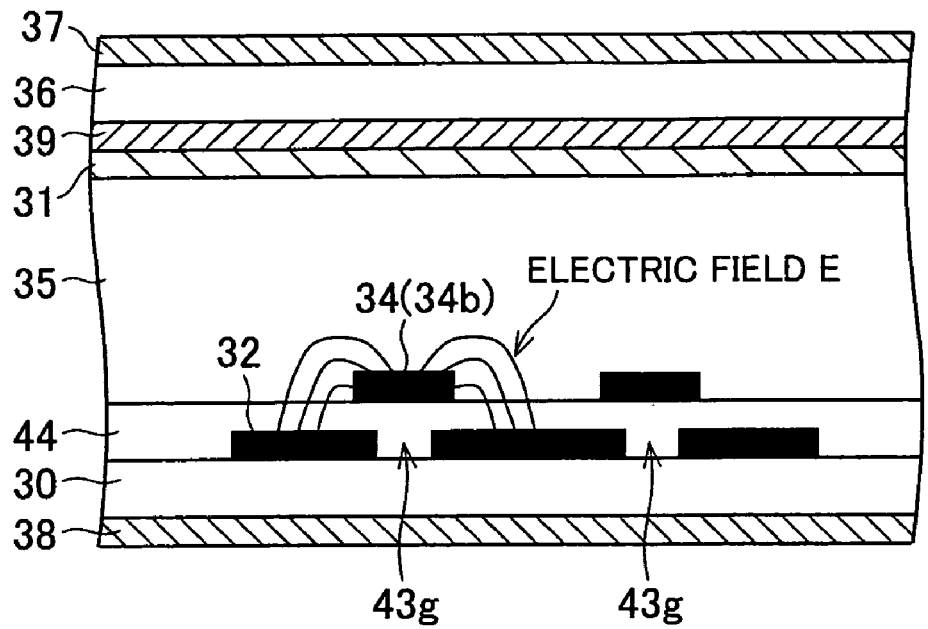
FIGS. 18(a) to 18(b) are cross-sectional views illustrating a modification of the configuration of a pixel of the display panel in accordance with the embodiment of the present invention.
Figure 18:
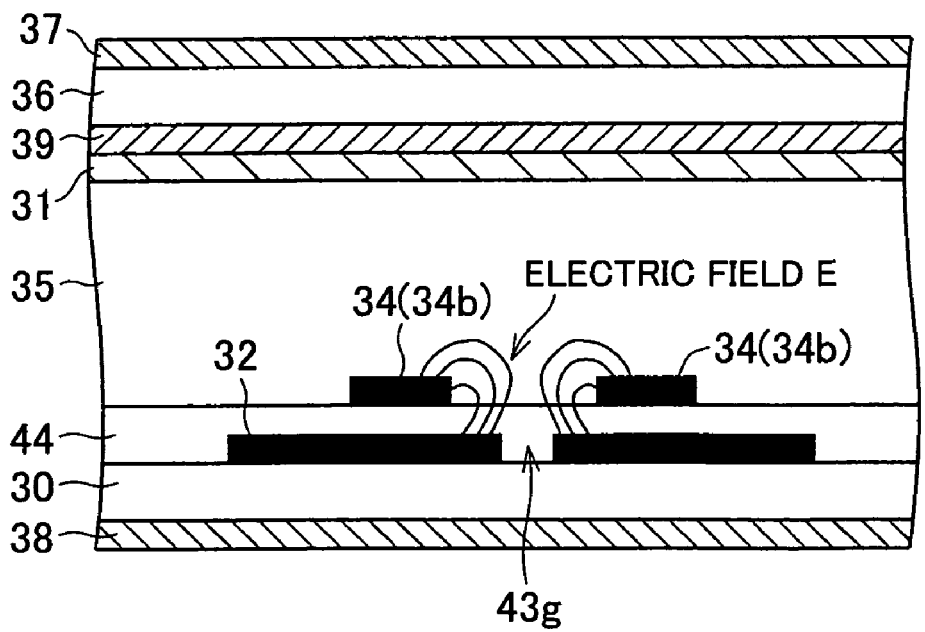

For example, as illustrated in FIG. 18(a), the counter electrode 32 may be configured to have a groove 48b in a position that overlaps the tooth portions 34b of the pixel electrode 34 when viewed in the normal direction of the substrate plane. In this case, the width of the groove 48b is preferably narrower than the width of the tooth portions 34b of the pixel electrode 34. In the example of FIG. 18(a), the width of the groove 48b is in a range of 1.5 μm to 3 μm. The formation of the groove 48b alleviates the problem of insufficient charging that would occur due to the capacitance between the shield electrode 31 and the counter electrodes 32.

Moreover, as illustrated in FIG. 18(b), a groove 43g is provided in a region between the adjacent tooth portions 34b of the pixel electrode 34 (i.e., a region which is not overlapped by the tooth portions 34b when viewed in the normal direction of the substrate plane).

In the configuration where no groove 43g as illustrated in FIG. 18(b) is provided, the electric field application on the medium A would cause a DC voltage due to differences in the orientation states of the medium A between (+) frame state and (−) frame state. This DC voltage would deteriorate the medium A, thereby causing pixel defects.

On the contrary, in the configuration where the groove 43g is provided in the region between the tooth portions 34b as illustrated in FIG. 18(b), the orientation states of the medium A are substantially same between the (+) frame state and (−) frame state. Thus, almost no DC voltage occurs in the medium A. Accordingly, the deterioration of the medium A due to the DC voltage and the pixel defects due to the deterioration of the medium A can be prevented.

As described above, by providing the shield electrode(s) 31 in addition to the counter electrodes 32 and the pixel electrodes, it is possible to provide earthing for (i.e., provide shielding against) the static electricity (charging current). This protects the display panel 70 from the static electricity, and prevents (i) brightness fluctuation that is caused by response of the medium A to the static electricity, and (ii) display unevenness that is caused by the temperature unevenness.

5. Display Principle of Display Panel 70

Next, display principle of the display element (display panel) according to the exemplary embodiment are described below. The following description mainly discuses a configuration in which the display panel according to the exemplary embodiment is a transmissive type of display panel and is substantially optically isotropic or preferably optically isotropic when no electric field is applied but becomes optically anisotropic when the electric field is applied. However, it should be noted that present invention is not limited to this configuration.

The medium A used in the exemplary embodiment is a medium whose optical anisotropy is changeable in magnitude by and according to an electric field applied thereon. When an electric field Ej is externally applied on a material, electric displacement Dij occurs (electric displacement $Dij=\epsilon ij \cdot Ej$). When such electric displacement Dij occurs, there is a slight change in dielectric constant ($\epsilon ij$). At the frequencies of light, the square of the refractive index (n) is equivalent to the dielectric constant. Thus, the medium A may be referred to as a material whose refractive index is changeable by and according to the electric field applied thereon.

As described above, the display panel according to the exemplary embodiment carries out its display operation by utilizing the phenomenon (electro-optical effect) in which the refractive index of the material is changeable by and according to the external electric field. Unlike liquid crystal display element in which rotation of the molecules (molecular orientation direction) due to electric field application is utilized, the optical anisotropy is not changed in its direction, and the change (mainly, electronic polarization, orientation polarization) in the magnitude of the optical anisotropy is utilized to perform the display operation in this display panel.

Figure 20:
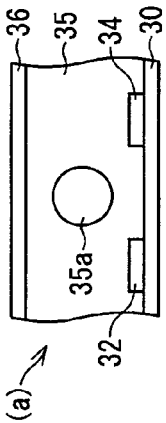
FIG. 20 is an explanatory view schematically illustrating differences between the display panel of the present invention and conventional liquid crystal display elements in terms of display principle.

FIG. 19(a) is a cross sectional view schematically illustrating the configuration of the display panel according to the exemplary embodiment when no electric field is applied (OFF state), whereas a cross sectional view schematically illustrating the configuration of the display panel according to the exemplary embodiment when an electric field is applied (ON state). Moreover, FIG. 19(c) is a graph illustrating a relationship between the applied voltage and the transmissivity in the display panel according to the exemplary embodiment. Moreover, FIG. 20 are an explanatory views schematically illustrating differences of the display principle between the display panel according to the exemplary embodiment and the conventional liquid crystal display elements. The differences are shown by average shapes of refractive index ellipsoids of the medium (i.e. shapes of cut surfaces of refractive index ellipsoids) and their main axis directions, when no electric field (voltage) is applied (OFF state) and when an electric field (voltage) is applied (ON state). That is, FIG. 20(a) is a cross-sectional view illustrating the display panel according to the exemplary embodiment when no electric field is applied (OFF state). FIG. 20(b) is a cross-sectional view illustrating the display element when an electric field is applied (ON state). FIG. 20(c) is a cross-sectional view illustrating a conventional TN (Twisted Nematic) mode liquid crystal display element when no electric field is applied. FIG. 20(d) is a cross-sectional view illustrating the conventional TN mode liquid crystal display element when an electric field is applied. FIG. 20(e) is a cross-sectional view illustrating a conventional VA (Vertical Alignment) mode liquid crystal display element when no electric field is applied. FIG. 20(f) is a cross-sectional view illustrating the conventional VA mode liquid crystal display element when an electric field is applied. FIG. 20(g) is a cross-sectional view illustrating a conventional IPS (In Plane Switching) mode liquid crystal display element when no electric field is applied. FIG. 20(h) is a cross-sectional view illustrating the conventional IPS mode liquid crystal display element when an electric field is applied.

Generally, the refractive index of a material is not isotropic but varies according to its directions. Here, in cases where an x direction is a direction parallel to a substrate surface (in-plane direction of the substrate, substrate in-plane direction) and a direction opposite to the electrodes 32 and 34, and a y direction is a direction parallel to the substrate surface (in-plane direction of the substrate, substrate in-plane direction) and a direction perpendicular to the direction opposite to the electrodes 32 and 34, and a z direction is a direction perpendicular to the substrate surface (normal direction of the substrate, substrate normal direction), the anisotropy of the refractive index (i.e., optical anisotropy) is shown by an ellipsoid (refractive index ellipsoid) shown by the following equation (1) using an arbitrary orthogonal coordinate system ($X_1$, $X_2$, $X_3$):

$$\sum_{ij}\left(\frac{1}{n_{ij}^2}\right)X_i X_j = 1 \tag{1}$$

($n_{ji}=n_{ij}$, i, j=1, 2, 3).

When the equation (1) is rewritten by using a coordinate system ($Y_1, Y_2, Y_3$) of the main axis direction of the ellipsoid, the following relational equation (2) is obtained:

$$Y_1^2/n_1^2 + Y_2^2/n_2^2 + Y_3^2/n_3^2 = 1 \tag{2}$$

n1, n2, and n3 (hereinafter referred to as nx, ny, and nz) are called main refractive indices, and correspond to half in length of three main axes in the ellipsoid. In case of a light wave proceeding from an origin to a direction perpendicular to a surface of $Y_3$=0, the light wave has polarization components in $Y_1$ direction and $Y_2$ direction. The refractive indices of the components in $Y_2$ direction and $Y_2$ direction are respectively nx and ny. Generally, a light proceeding in an arbitrary direction goes through the origin, and a surface perpendicular to a direction in which the light wave proceeds is a cut surface of the refractive index ellipsoid. Directions of main axes of this ellipse are polarization component directions of the light wave. Half in length of the main axis corresponds to the refractive index. The following description explains the differences of the display principle between the display panel according to the exemplary embodiment and the conventional liquid crystal display elements. TN mode, VA mode, and IPS mode are used as examples of the modes of the conventional liquid crystal display element.

As illustrated in FIGS. 20, the conventional TN mode liquid crystal display element is structured such that a liquid crystal layer 105 is sandwiched between a pair of substrates 101 and 102 which are provided face to face, and transparent electrodes (electrode) 103 and 104 are respectively provided on the substrates 101 and 102. When no electric field is applied, liquid crystal molecules of the liquid crystal layer 105 are oriented such that long-axis directions of the liquid crystal molecules are oriented in spirally twisted directions. When an electric field is applied, the liquid crystal molecules are oriented such that the long-axis direction of each of the liquid crystal molecules is along an electric field direction. As illustrated in FIGS. 20, a typical refractive index ellipsoid 105*a* is such that its main axis direction (long-axis direction) is parallel to the substrate surface (substrate in-plane direction) when no electric field is applied. As illustrated in FIGS. 20, the typical refractive index ellipsoid 105*a* is such that its main axis direction turns to the substrate normal direction when an electric field is applied. That is, the shape of the refractive index ellipsoid 105*a* is an ellipse when no electric field is applied and when an electric field is applied. The long-axis direction (main axis direction, direction of the refractive index ellipsoid 105*a*) changes depending on whether or not an electric field is applied. That is, the refractive index ellipsoid 105*a* rotates. Note that, the shape and the size of the refractive index ellipsoid 105*a* do not change so much.

As illustrated in FIGS. 20, the conventional VA mode liquid crystal display element is structured such that a liquid crystal layer 205 is sandwiched between a pair of substrates 201 and 202 which are provided face to face, and transparent electrodes 203 and 204 (electrode) are respectively provided on the substrates 201 and 202. When no electric field is applied, liquid crystal molecules of the liquid crystal layer 205 are oriented such that the long-axis direction of each of the liquid crystal molecules is substantially perpendicular to the substrate surface. When an electric field is applied, the liquid crystal molecules are oriented such that the long axis direction of each of the liquid crystal molecules is perpendicular to an electric field. As illustrated in FIGS. 20, a typical refractive index ellipsoid 205*a* is oriented such that the main axis direction (long-axis direction) turns to the substrate normal direction when no electric field is applied. As illustrated in FIGS. 20, the typical refractive index ellipsoid 205*a* is oriented such that the main axis direction is parallel to the substrate surface (substrate in-plane direction) when an electric field is applied. That is, in case of the VA mode liquid crystal display element, just like the TN mode liquid crystal display element, the shape of the refractive index ellipsoid 205*a* is an ellipse. The long-axis direction changes (the refractive index ellipsoid 205*a* rotates) depending on whether or not an electric field is applied. Moreover, the shape and the size of the refractive index ellipsoid 205*a* do not change so much. As illustrated in FIGS. 20, the conventional IPS mode liquid crystal display element is structured such that a pair of electrodes 302 and 303 are provided face to face on a substrate 301. When an electric field (voltage) is applied from the electrodes 302 and 303 to a liquid crystal layer sandwiched between the substrate 301 and a counter substrate (not illustrated), liquid crystal molecules of the liquid crystal layer change their orientation directions (main axis direction (long-axis direction) of the refractive index ellipsoid 305*a*). Therefore, it is possible to realize different display states depending on whether or not an electric field is applied. That is, in case of the IPS mode liquid crystal display element, just like the TN mode liquid crystal display element and the VA mode liquid crystal display element, the shape and the size of the refractive index ellipsoid 205*a* do not change so much (that is, the refractive index ellipsoid 305*a* is an ellipse), but the main axis direction changes (the refractive index ellipsoid 305*a* rotates) depending on whether or not an electric field is applied.

Thus, according to the conventional liquid crystal display elements, the liquid crystal molecules are oriented in a certain direction (typically, in a single direction) when no electric field is applied. When an electric field is applied, the liquid crystal molecules change their orientation direction all together so as to carry out the display (modulation of transmittance). That is, although the shape and the size of the refractive index ellipsoid do not change (that is, the shape is an ellipse), only the main axis direction (long-axis direction) of the refractive index ellipsoid is rotated (changed) by applying an electric field, so that the display is carried out. Therefore, the long-axis direction of the refractive index ellipsoid is not limited to a direction perpendicular to or parallel to a direction of an electric field application. That is, according to the conventional liquid crystal display elements, the orientational order parameter of the liquid crystal molecules is substantially constant, and the display is carried out by changing the orientation directions (modulation of transmittance). That is, according to the conventional liquid crystal display elements, when an electric field is applied, the orientational order parameter is substantially constant, but a direction of an orientational easy axis changes. Meanwhile, as illustrated in FIGS. 20, the display panel according to the display panel, the refractive index ellipsoid 35*a* is spherical when no electric field is applied, that is, the refractive index ellipsoid 35*a* is optically isotropic when no electric field is applied (nx=ny=nz, orientational order parameter≈0 (substantially 0) in a scale not smaller than the wavelength of visible light).

Moreover, the refractive index ellipsoid is optically anisotropic when an electric field is applied (nx>ny, orientational order parameter>0 in the scale not smaller than the wavelength of visible light), and the refractive index ellipsoid 35a becomes an ellipse (shows the optical anisotropy). Moreover the major axis direction of the refractive index ellipsoid 35a becomes perpendicular to the electric field application direction. That is, when the dielectric anisotropy of the dielectric material is negative (negative type liquid crystal), the major axis direction of the refractive index ellipsoid 35a is perpendicular to the electric field direction (perpendicular state) regardless of how much electric field is applied. When the dielectric anisotropy of the dielectric material is positive (positive type liquid crystal), the major axis direction of the refractive index ellipsoid 35a is parallel to the electric field direction (parallel state) regardless of how much electric field is applied. In the present invention, the electric field application direction and at least one of the major axis directions of the refractive index ellipsoid 35a are parallel or perpendicular to each other always.

Note that, in the present invention, the orientational order parameter≈0 in the scale not less than the wavelength of visible light indicates that the orientational order parameter is such a state: when the orientational order parameter≈0 in the scale not less than the wavelength of visible light, a majority of the liquid crystal molecules or the like are oriented in a certain direction (there is an orientational order) when observed in a scale smaller than the wavelength of visible light, whereas, in the scale larger than the wavelength of visible light, the orientation directions of the molecules are averaged (that is, random) and there is no orientational order. Therefore, when the orientational order parameter≈0 in the scale not less than the wavelength of visible light, the orientational order parameter is so small that it causes no effect on the light in the wavelength range of the visible light and the light larger than the wavelength of visible light. For example, when the orientational order parameter≈0 in the scale equal to or greater than the wavelength of visible light, the black display is realized under crossed nicols. Furthermore, in the present invention, "the orientational order parameter>0 in the scale equal to or greater than the wavelength of visible light" indicates that the orientational order parameter in the scale equal to or greater than the wavelength of visible light is greater than the orientational order parameter of substantially 0. For example, when the orientational order parameter>0 in the scale equal to or greater than the wavelength of visible light, the white display (and/or gray display, which is a gradation display) is realized under crossed nicols. That is, the display panel according to the exemplary embodiment is such that the molecules constituting the medium A are directed randomly in any directions when no electric field is applied. However, the molecules are oriented in an order (orderly structure, orientational order) smaller than the wavelength of visible light (the orientational order parameter in the scale not smaller than the wavelength of visible light≈0) and thus no optical anisotropy is caused. Therefore, the shape of the refractive index ellipsoid 35a is spherical as illustrated in FIGS. 20. When the electric field is applied as illustrated in FIG. 19(b), orientational state of the respective molecules is changed because the respective molecules are directed along the in-plane direction of the substrates because the molecules have the positive dielectric anisotropy. Moreover, when the orientation state is changed, the optical anisotropy is caused (the orientational order parameter in the scale not smaller than the wavelength of visible light>0) as a result of distortion occurred in the orderly structure smaller than the wavelength of visible light. As described above, the display panel in accordance with the exemplary embodiment is arranged such that, when no electric field is applied, the refractive index ellipsoid 35a has such a shape (nx=ny=nz) that causes the optical isotropy, and when the electric field is applied, the refractive index ellipsoid 35a has such a shape that causes the optical anisotropy. That is, the display panel in accordance with the exemplary embodiment is arranged such that the shape and the size of the refractive index ellipsoid 35a are changeable by and according to the electric field applied thereon.

Figure 21:
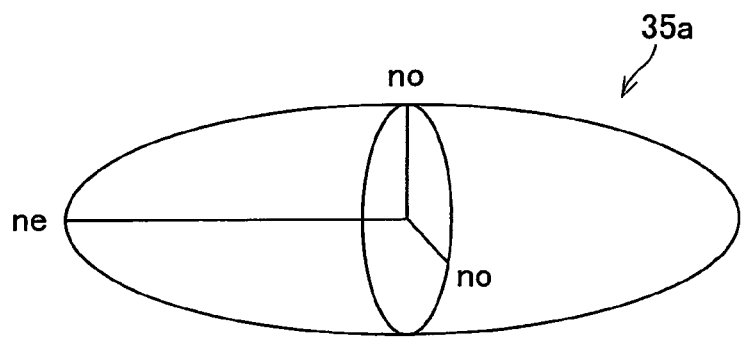
FIG. 21 is a view schematically illustrating a shape of a refractive index ellipsoid according to the embodiment of the present invention.

Moreover, FIG. 21 is a schematic view illustrating the shape of the refractive index ellipsoid 35a of one molecule in the medium A when the electric field is applied, in the display panel in accordance with the exemplary embodiment. As illustrated in FIG. 21, the shape of the refractive index ellipsoid 35a is indicated as a cross section of the refractive index ellipsoid (ellipsoid) taken along a plane passing through an original point and perpendicular to a propagation (traveling, proceeding) direction of light wave. As described above, the major axis direction of the ellipsoid is a component direction of the polarized light of the light wave, and a half of the length of the major axis corresponds to a refractive index along that direction.

The medium A according to the exemplary embodiment is optically isotropic (in isotropic phase) when no electric field is applied, and becomes optically anisotropic when the electric field is applied thereon. Thus, the refractive index ellipsoid 35a has a spherical shape, that is, is optically isotropic when no electric field is applied thereon. When electric field is applied thereon, the refractive index ellipsoid 35a becomes optically anisotropic.

Where, as illustrated in FIG. 21, ne is the refractive index along the major axis direction of the ellipsoid (that is, the component direction of the polarized light of the light wave) due to the occurrence of the optical anisotropy when the electric field is applied, that is, the refractive index (extraordinary light refractive index) along the major axis direction of the molecule 9, and no is the refractive index along the direction perpendicular to the major axis direction of the ellipsoid, that is, the refractive index (ordinary light refractive index) along the minor axis direction of the molecule 9, the refractive index anisotropy (Δn) (change in birefringence) is expressed by Δn=ne−no. That is, in the present invention, the refractive index anisotropy (Δn) indicates the change in the birefringence expressed as Δn=ne−no (ne: extraordinary light refractive index, no: ordinary light refractive index). ne and no are changed in the present invention, but not in the conventional liquid crystal display devices.

The major axis direction of the refractive index ellipsoid 35a is parallel to the electric field application direction when the electric field is applied (in case of the medium having the positive dielectric anisotropy), or the major axis direction of the refractive index ellipsoid 3a is perpendicular to the electric field application direction when the electric field is applied (in case of the medium having the negative dielectric anisotropy).

On the other hand, in the conventional liquid crystal display element, the display operation is carried out by utilizing the rotation of the major axis direction of the refractive index ellipsoid by the electric field application. Thus, in the conventional liquid crystal display element, the major axis direction of the refractive index ellipsoid is not always parallel or perpendicular to the electric field application direction. Thus, according to the display panel of the exemplary embodiment, the direction of the optical anisotropy is constant (electric field application direction does not change), and the display is carried out by, for example, changing the orientational order parameter in the scale not smaller than the wavelength of visible light. The magnitude of the optical anisotropy (for example, the orientational order in the scale not smaller than the wavelength of visible light) of the medium A itself is changed in the display panel of the exemplary embodiment. Therefore, the display panel of the example embodiment is totally different from the conventional display elements in terms of the display principle.

Note that, the medium A sealed between the substrates 30 and 36 to form the medium layer 35 may be any medium provided that the magnitude of the optical anisotropy thereof is changeable by and according to the electric field applied thereon. For example, the medium A may be such a medium that is substantially optically isotropic (the orientational order parameter in the scale not smaller than the wavelength of visible light>>0) when the electric field is applied or when no electric field is applied, and in which optical modulation is induced by the electric field application (that is, the medium becomes optically anisotropic or isotropic by the electric field application). Moreover, the medium A may be such a material (medium) in which the orientational order parameter in the scale not smaller than the wavelength of visible light is increased among the molecules 9 or molecular agglomerations (clusters) by and according to the application of the electric field (it is further increased from a value of the orientational order parameter in a state where the optical modulation is already induced (the orientational order parameter in the scale not smaller than the wavelength of visible light>0)).

In the present invention, to change in the magnitude of the optical anisotropy of the medium A by and according to electric field applied on the medium A indicates that, as described above, is to change the refractive index ellipsoid 35a by and according to the electric field applied on the medium A. In the aforementioned configuration in which the medium A is optically isotropic when no electric field is applied and the magnitude of its optical anisotropy is changeable by and according to the electric field applied thereon, that is, in the configuration in which the optical anisotropy of the medium A is generated when the electric field is applied, the shape of the refractive index ellipsoid 35a is changed from the spherical shape to the ellipsoidal shape by and according to the electric field applied thereon.

As illustrated by the display panel of the exemplary embodiment, as illustrated in FIG. 19(a), the medium A sealed in a space between the substrates 30 and 36 is in the isotropic phase when no electric field (voltage) is applied to the electrodes 32 and 35, and the medium A is optically isotropic. On this account, the black display is carried out. Moreover, in the regions 59, where the electric field is applied between the data signal lines 47 and the electrodes 34, the direction of the optical anisotropy induced in the medium A is parallel to or perpendicular to the absorption axes 37a and 38a of the polarizers 37 and 38. On this account the black display is carried out. Meanwhile, as illustrated in FIG. 19(b), when an electric field is applied to between the electrodes 32 and 34, each of the molecules 9 in the medium A is aligned such that the long-axis directions of the molecules 9 are along the electric field formed between the electrodes 32 and 34. Therefore, the birefringence phenomenon occurs. As illustrated in FIG. 19(c), due to the birefringence phenomenon, it is possible to modulate transmissivity of the display panel according to the voltage between the electrodes 32 and 34. Note that, at a temperature which is sufficiently far from a phase transition temperature (transition point), a high voltage is required in modulating the transmissivity of the display panel. However, at a temperature which is just above the transition point, it is possible to adequately modulate the transmissivity of the display panel with a voltage from 0V to about 100V.

For example, according to Non-patent Literature 3, in cases where the refractive index of the electric field direction is n// and the refractive index of the direction perpendicular to the electric field direction is n⊥, a relationship between double refractive change (Δn=n//−n⊥) and the outer electric field, that is, the electric field E (V/m) is shown by:

$$\alpha n = \lambda \cdot B_k \cdot E^2. \qquad (3),$$

where λ is a wavelength (m) of the incident light in a vacuum, and Bk is the Kerr constant (m/V²), and E is an intensity of applied electric field (V/m).

It is well-known that, with a rise in temperature (T), Kerr constant B decreases according to a function proportional to $1/(T-Tn_i)$. It is possible to drive the molecules with low electric field intensity when the temperature is around the transition point (Tni). However, high electric intensity is steeply required with a rise in temperature (T). On this account, at a temperature which is very far from the transition temperature (a temperature which is enough higher than the transition temperature), a high voltage is required in modulating the transmittance of the display panel. However, at a temperature which is just above the phase transition point, it is possible to adequately modulate the transmittance of the display panel with a voltage of about 100V or less.

6. Examples of Medium

The present invention is not limited to the exemplary embodiment in which the medium A is a mixture of JC-1041xx (50.0 wt %), 5CB (38.5 wt %), and ZLI-4572 (11.1 wt %). The medium A may be any material, as long as it is optically isotropic (at least macroscopically optically isotropic) when no electric field is applied thereon, and the magnitude of whose optically anisotropy (at least optical anisotropy in the direction parallel to the substrate plane) is changeable by and according to the electric field applied thereon. A material whose birefringence is increased by electric field application is especially preferable. Examples of such materials are materials showing the Pockels effect, materials showing the Kerr effect, or the like material (various organic materials and inorganic materials).

The Pockels effect and the Kerr effect (which themselves are observed in isotropic states) are an electro-optical effect proportional to the electric field and an electro-optical effect proportional to square of the electric field, respectively. When no electric field is applied, the material of the Pockels effect or the Kerr effect is in an isotropic phase, and thus optically isotropic. When an electric field is applied, however, major axial directions of molecules of a compound are orientated along the direction of the electric field in a region (part of the material) in which the electric field is applied, whereby birefringence occurs in the region (part of the material). The occurrence of birefringence changes (modulates) transmissivity of the material. For example, a display mode using a material showing the Kerr effect is such that localization of electrons within one molecule is controlled by the application of the electric field. By doing this, individual molecules randomly orientated are rotated individually to change their directions. Thus, the display mode using the material showing the Kerr effect is very fast in responding speed. Moreover, because the molecules are randomly orientated, this display mode has such an advantage that it has no viewing angle limitation. Among materials that may be the medium A, materials whose property is roughly proportional to the electric field or the square of the electric field may be considered as the materials showing the Pockels effect or the Kerr effect.

Examples of the materials showing the Pockels effect include organic solid materials and the like such as hexamine and the like. However, the present invention is not limited to this. Various organic or inorganic materials showing the Pockels effect may be applicable as the medium A.

The medium layer 35 may comprise an orientation auxiliary agent for facilitating the change in the magnitude of the optical anisotropy of the medium A during electric field application, or for stabilizing the optical isotropy. For example, photopolymerizable monomer may be polymerized in the medium 35 by irradiating ultra violet on a mixture in optical isotropic phase at a temperature in the vicinity of a cholesteric phase-optical isotropic phase transition temperature thereof, the mixture being prepared with the foregoing mixture (87.1%), TMPTA (trimethylolpropane triacrylate, Aldrich) (5.4 wt %), RM257 (7.1 wt %), and DMPA (2,2-dimethoxy-2-phenyl-acetophenone) (0.4 wt %). By forming an orientation auxiliary agent, it is possible to widen the temperature range in which the medium A (medium layer 35) shows optical isotropy. The mixture containing the photopolymerizable monomer shows positive dielectric anisotropy.

Other non-limiting examples of materials showing the Kerr effects are mixtures of liquid crystalline materials represented by the following structural formulae (2) to (4):

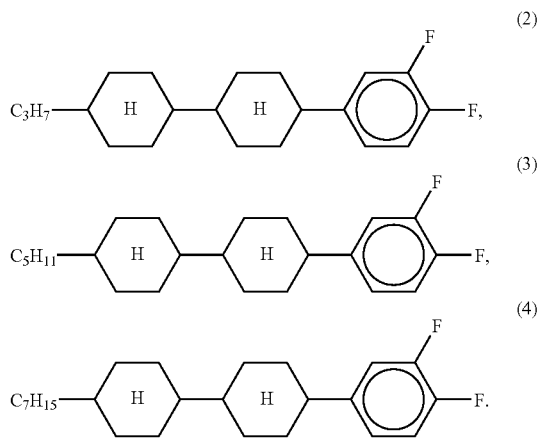

The compound represented by the structural formula (2) is 3HPFF, which is 1,2-difluoro-4-[trans-4-(trans-4-n-propyl-cyclohexyl) cyclohexyl]benzene. The compound represented by the structural formula (3) is 5HPFF, which is 1,2-difluoro-4-[trans-4-(trans-4-n-pentylcyclohexyl) cyclohexyl]benzene. The compound represented by the structural formula (4) is 7HPFF, which is 1,2-difluoro-4-[trans-4-(trans-4-n-pentyl-cyclohexyl) cyclohexyl]benzene. This mixture shows negative dielectric anisotropy. The Kerr effect is observed in a material transparent to incident light. Therefore, the material showing the Kerr effect is used as a transparent medium. In general, temperature increase causes the liquid crystalline material to transit from a liquid phase having a short distance order to an isotropic phase having a random orientation at a molecular level (the isotropic phase in which the molecules are randomly orientated). That is, the Kerr effect of the liquid crystalline material is a phenomenon that is observed not in a nematic phase but in a liquid that is at its liquid phase-isotropic phase transition temperature or at a higher temperature (that is, the Kerr effect is observed in a material in the isotropic state). The liquid crystalline material is used as a transparent dielectric liquid.

Dielectric liquids of the liquid crystalline materials and the like are more isotropic at a higher operating environmental temperature (heating temperature) attained by heating. Thus, in case where the medium A is a dielectric liquid of a liquid crystalline material or the like, the following configurations, for example, may be adopted in order to use the dielectric liquid while it is transparent, that is, to use the dielectric liquid in the liquid state transparent to the visible light: (1) to provide heating means (not shown) such a heater or the like in a periphery of the medium layer 35 in order that the dielectric liquid heated to its transparent point or higher by using the heating means may be used; (2) to utilize heat radiation from a back light or heat conduction from the back light and/or a peripheral driving circuit in order that the dielectric liquid heated to its transparent point or higher may be used (in this case, the back light and/or the peripheral driving circuit act as heating means); or the like arrangement. Moreover, it may be arranged that (3) as the heater, a sheet heater (heating means) is attached to at least one of the substrates 32 and 34 in order that the dielectric liquid heated to a designated transparent may be used. Further, in order that the dielectric liquid may be used in the transparent state, the dielectric liquid may be made of a material whose transparent point is lower than a lower limit of the operating temperature of the display panel.

The medium A preferably contains a liquid crystalline material. In case where the medium A is a liquid crystalline material, it is preferable that the liquid crystalline material be macroscopically a transparent liquid in the isotropic phase but microscopically containing clusters, which are agglomerations of molecules orientated in a certain direction in a short distance order. Because, when used, the liquid crystalline material is arranged to be transparent with respect to the visible light, the clusters are also arranged to be transparent with respect to the visible light (that is, as being optically isotropic) when used.

In order to cause the liquid crystalline material containing the clusters to be transparent as such, the following configurations may be adopted, for example: the display panel may be controlled in terms of temperature by using heating means such as a heater as described above; the medium layer 35 may be segmented into small regions by using a polymer material or the like as described in Patent Literature 3; the liquid crystalline material may be minute droplets having a diameter smaller than the wavelength of the visible light, for example by arranging such that the liquid crystalline material has a diameter of, for example, 0.1 μm or less, thereby restraining scattering of the light in order to cause such liquid crystalline material to be transparent; the liquid crystalline material may be made of a liquid crystalline compound that is in the transparent isotropic phase at the operating environment temperature (room temperature). The scattering of light is negligible when the diameter of the liquid crystalline material and a diameter (major axis) of the clusters is 0.1 μm or less, that is, smaller than the wavelength of the visible light (wavelength of incident light). Thus, for example, if the diameter of the cluster is 0.1 μm or less, the clusters are also transparent with respect to visible light.

Note that, as described above, the medium A is not limited to the materials showing the Pockels effect or the Kerr effect. Therefore, the medium A may have an orderly molecular structure having a cubic symmetry in a scale (for example, nano scale) less than the light wavelength of the visible light, and thus may have a cubic phase that appears isotropic optically (see Non-Patent Literatures 3 and 4). The cubic phase is one of those liquid crystal phases of the liquid crystalline material which can be used as the medium A. Examples of the liquid crystalline materials showing the cubic phase include BABH8 and the like. BABH8 is represented by the following Structural Formula (5):

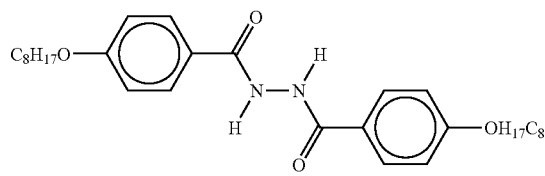

(5)

The application of electric field slightly distorts the structure of the liquid crystalline material, thereby inducing optical modulation.

At temperatures not less than 136.7° C. but not more than 161° C., BABH8 is in the cubic phase having an orderly structure having a cubic symmetry (a symmetric cubic system) and being smaller in scale than the wavelength of the visible light. The orderly structure (cubic symmetric orderly structure) of the cubic phase has a lattice constant about 6 nm, that is, smaller than the light wavelength by more than 1 digit. BABH8 allows good black display under crossed nicols because, as described above, BABH8 has the orderly structure smaller than the light wavelength within the aforementioned temperature range and shows optical isotropy (at least macroscopically isotropic) within the temperature range when no electric field is applied thereon.

On the other hand, when an electric field is applied between the interleave electrodes 4 and 5 while the temperature of BABH8 is controlled to be not less than 136.7° C. but not more than 161° C. by using, for example, the aforementioned heating means or the like, the structure (orderly structure) having the cubic symmetry is distorted. That is, within the temperature range, BABH 8 is isotropic when no electric field is applied thereon but becomes optically anisotropic when the electric field is applied. As a result, birefringence occurs in the medium 35. Therefore, the display panel can perform good white display. Note that the birefringence occurs in a certain direction but a magnitude of the birefringence is changeable by and according to the applied electric field. Moreover, a voltage-transmissivity curve (depicting a relationship between (a) transmissivity and (b) the voltage to be applied between the counter electrodes 32 and pixel electrodes 34) is a stable curve in the temperature of range not less 136.7° C. but not more than 161° C., that is, in such a wide temperature range of about 20K. Therefore, the use of BABH8 as the medium A allows very easy temperature control. That is, the medium layer 35 made of BABH8 is in a thermally stable phase and thus does not have such temperature dependency that its property is suddenly changed by thermal change. Therefore, temperature control for the medium layer 35 made of BABH8 is very easy. Moreover, the medium A may be a system that appears optically isotropic, the system filled with agglomerations of radically orientated liquid crystal molecules and of a size smaller than the wavelength of the visible light. Such system may be a liquid crystal micro emulsion as described in Non-Patent Literature 1, a liquid crystal-particle dispersion system (a mixture system in which particulates are dispersed in a solvent (liquid crystal) as described in Non-Patent Literatures 2 and 4, or the like. The agglomerations having the radical orientation is distorted by application of the electric field, thereby inducing the optical modulation.

Note that the liquid crystalline material may be a simple substance that solely shows its liquid crystalline property, or a mixture that shows its liquid crystalline property when a plurality of substance are mixed together. Further, the liquid crystalline material may be a mixture of (a) such liquid crystalline simple substance or such liquid crystalline mixture, and (b) a non-liquid crystalline material. Further, the liquid crystalline material may be a material in which a polymer and liquid crystal are dispersed (this material is described in Non-Patent Literature 4. Moreover, a hydrogen-bond compound as described in Non-Patent Literature 7 may be added therein. Hydrogen-bond compound (hydrogen bond network, hydrogen-bonding material) is a compound formed via hydrogen bond, but not chemical bond.

The hydrogen-bond compound is obtained, for example, by mixing a gelling agent (hydrogen-bonding material) into the medium that is to be sealed in the medium layer 35. As the gelling agent, a gelling agent having an amide group is preferable, and a gelling agent having at least two amide groups in one molecule, and a urine-based or ricin-based gelling agent is more preferable. For example, gelling agents (gelling agents A and B) represented by the following structural formulae (6) and (7) respectively:

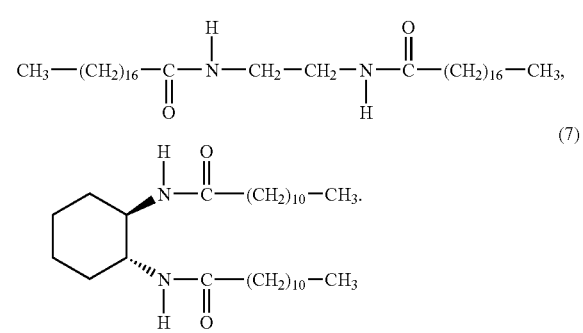

A little amount of any of these gelling agents can gelatinize a dielectric material such as liquid crystalline material.

Moreover, a hydrogen bond network exhibiting a gel state can be utilized as orientation auxiliary agent for facilitate the orientation when the change in the magnitude of the optical anisotropy by the electric field application, or as stabilizing means for stabilizing the optical isotropic phase. An example of the hydrogen bond network is a hydrogen bond network described in Non-Patent Literature 7 (p. 314, FIG. 1), which is attained by mixing Lys18, which is a gelling agent (hydrogen bonding material) described in Non-Patent Literature 7 (p. 314, FIG. 2) as represented by the following formula (8), into the medium by 0.15 mol %.

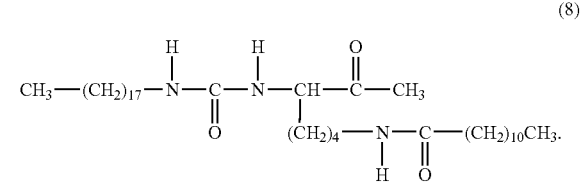

That is, a hydrogen bond network as described in Non-Patent Literature 7 (p. 314, FIG. 1), which is obtained by mixing Lys18 in the medium by 0.15 mol %, and which shows a gel state, can be used as an orientation auxiliary agent for facilitating the orientation in inducing, by the electric field application, the change in the magnitude of the optical anisotropy, or as stabilizing means for stabilizing the optical isotropic phase. Further, the gelling agents are free from various problems of a polymer network, such as need of UV irradiation process, degradation of material due to UV irradiation, decrease in reliability because of the groups left unreacted, etc.

Moreover, the medium A preferably contains a polar molecule. For example, nitrobenzene or the like is preferable as the medium A. Note that nitrobenzene is a medium showing the Kerr effect.

In the following, examples of the materials that can be used as the medium A, and an example of forms of the materials are provided. It should be noted that the present invention is not limited to the following examples.

[Smectic D Phase (SmD)]

Figure 22:
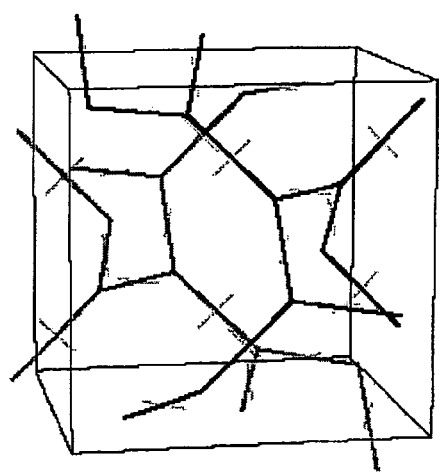
FIG. 22 is a view schematically illustrating a load network model of a cubic symmetric structure of smectic D phase.
Figure 23:
FIG. 23 is a view schematically illustrating the cubic symmetric structure of smectic D phase.

Smectic D phase (SmD) is one of liquid crystal phases of the liquid crystalline materials that can be used as the medium A. Smectic D phase has a 3-dimensional lattice structure and a lattice constant smaller than the wavelength of the visible light, as illustrated in FIGS. 22 and 23. Therefore, smectic D phase is optically isotropic.

Examples of liquid crystalline materials showing smectic D phase are ANBC16 and the like, which are described in Non-Patent Literature 3, for example. ANBC16 is represented by Formula (9):

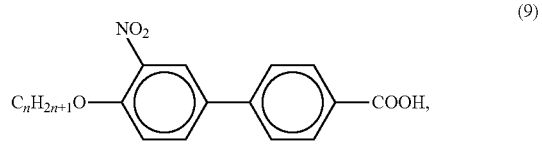

(9)

where n is an arbitral integer but specifically n=16.

ANBC16 shows smectic D phase in a temperature range of from 171.0° C. to 197.2° C. In the smectic D phase, a plurality of molecules form a 3-dimentional lattice like a jungle gym (Registered Trademark). The lattice has a lattice constant of several ten nm or less, which is less than the wavelength of visible light. That is, the smectic D phase has a cubic symmetry and orderly orientation (orderly structure) smaller than the wavelength of the visible light. Note that the lattice constant of ANBC16 described in the exemplary embodiment is about 6 nm. Because of this, the smectic D phase is optically isotropic. By applying the electric field on ANBC16 within the temperature range in which it shows smectic D phase, molecules of ANBC16 change their directions to be orientated along the electric field direction, thereby causing distortion in the lattice structure. That is, the optical anisotropy occurs in ANBC16. The present invention is not limited to ANBC16: any material showing smectic D phase is applicable as the medium A for the display panel according to the exemplary embodiment.

[Liquid Crystal Micro Emulsion]

Liquid crystal micro emulsion is a generic term for a system (mixture system) in which thermotropic liquid crystal molecules in a droplet form are dispersed in an oil continuous phase as in a O/W micro emulsion (water droplets are dispersed in an oil continuous phase by the aid of a surfactant) whose oil molecules are dispersed in lieu of the thermotropic liquid crystal molecules. Non-Patent Literature 1 proposes the liquid crystal micro emulsion.

Figure 24:
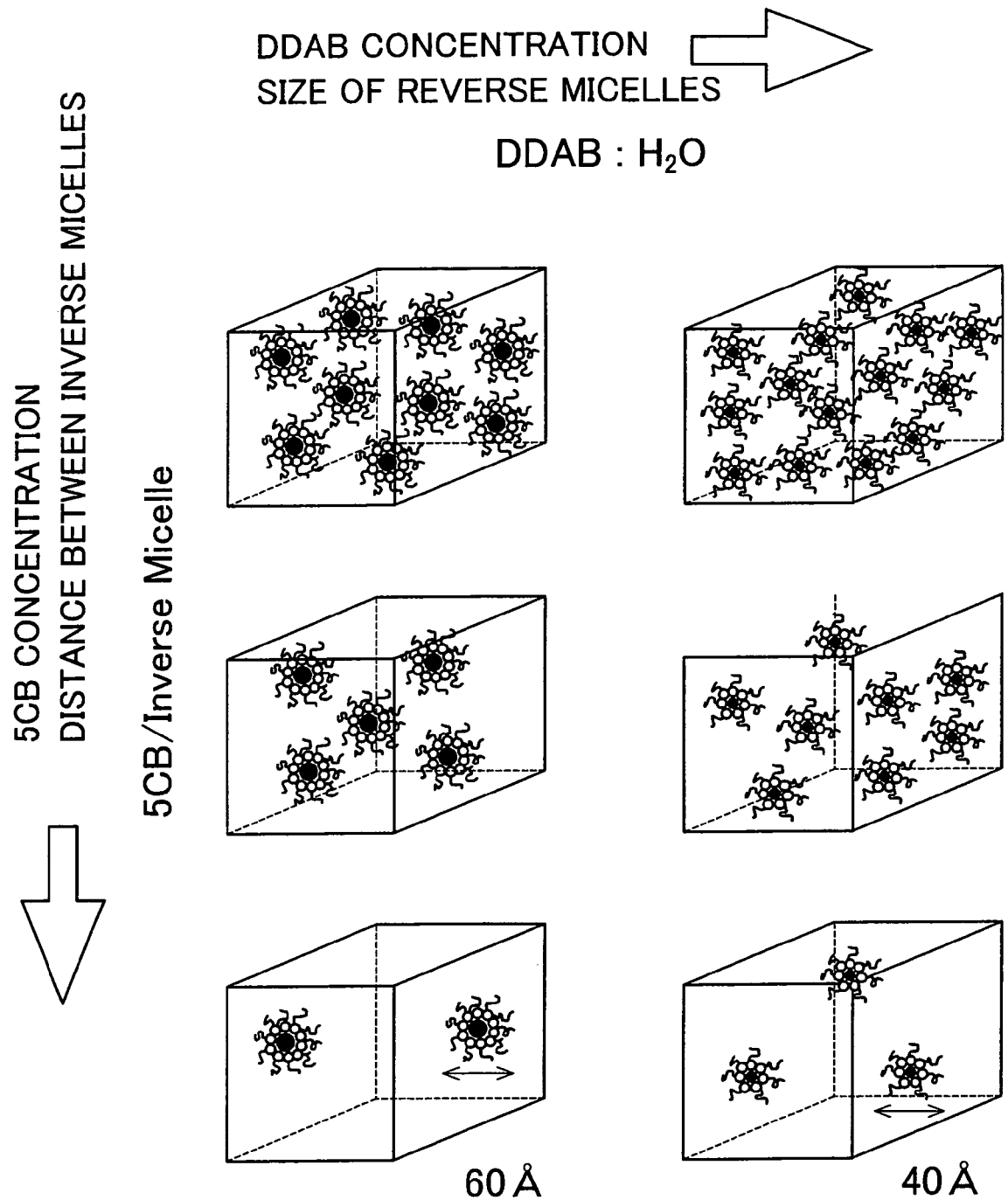
FIG. 24 is a view schematically illustrating an example of reverse micelle phase-mixture system of liquid crystal emulsion.
Figure 25:
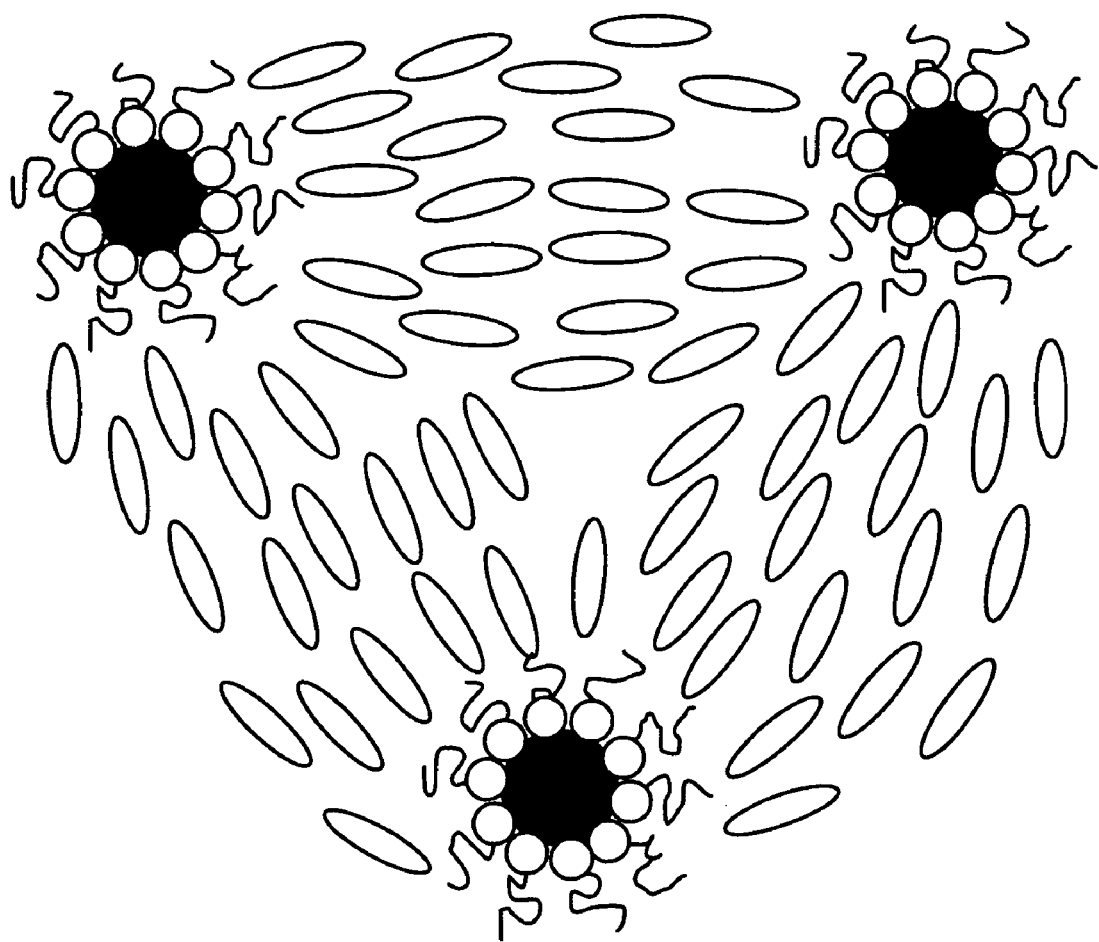
FIG. 25 is a view schematically illustrating another example of reverse micelle phase-mixture system of liquid crystal emulsion.

Specific examples of the liquid crystal micro emulsion include a mixture of pentylcyanobiphenyl (5CB) and an aqueous solution of didodecylammonium bromide (DDAB), described in Non-Patent Literature 1. Pentylcyanobiphenyl (5CB) is a thermotropic liquid crystal that shows nematic liquid phase. Didodecylammonium bromide (DDAB) is a lyotropic liquid crystal that shows reverse micelle phase. This mixture system has a structure as schematically depicted in FIGS. 24 and 25.

Moreover, the mixture system is typically such that its reverse micelles have a diameter of about 50 Å, and distances between the reverse micelles are about 200 Å. These scales are smaller than the wavelength of visible light roughly by one digit. That is, the mixture system (liquid crystal micro emulsion) has an orientational order (orderly structure) smaller than the wavelength of the visible light. Moreover, the reverse micelles are randomly dispersed 3-dimensionally. Centered with respect to each reverse micelle, 5CB are aligned in a radial manner. Accordingly, the mixture system is optically isotropic.

By applying the electric field onto a medium made of the mixture system, the molecules are orientated along the electric field direction because 5CB is dielectrically anisotropic. That is, orientational anisotropy occurs the system that has been optically isotropic due to the radial orientation centered with respect to the reverse micelles. This results in optical anisotropy. The present invention is not limited to the mixture system: the medium A of the display panel according to the exemplary embodiment may be any liquid crystal emulsion that is optically isotropic when no electric field is applied thereon but becomes optically anisotropic when the electric field is applied thereon.

Figure 26:
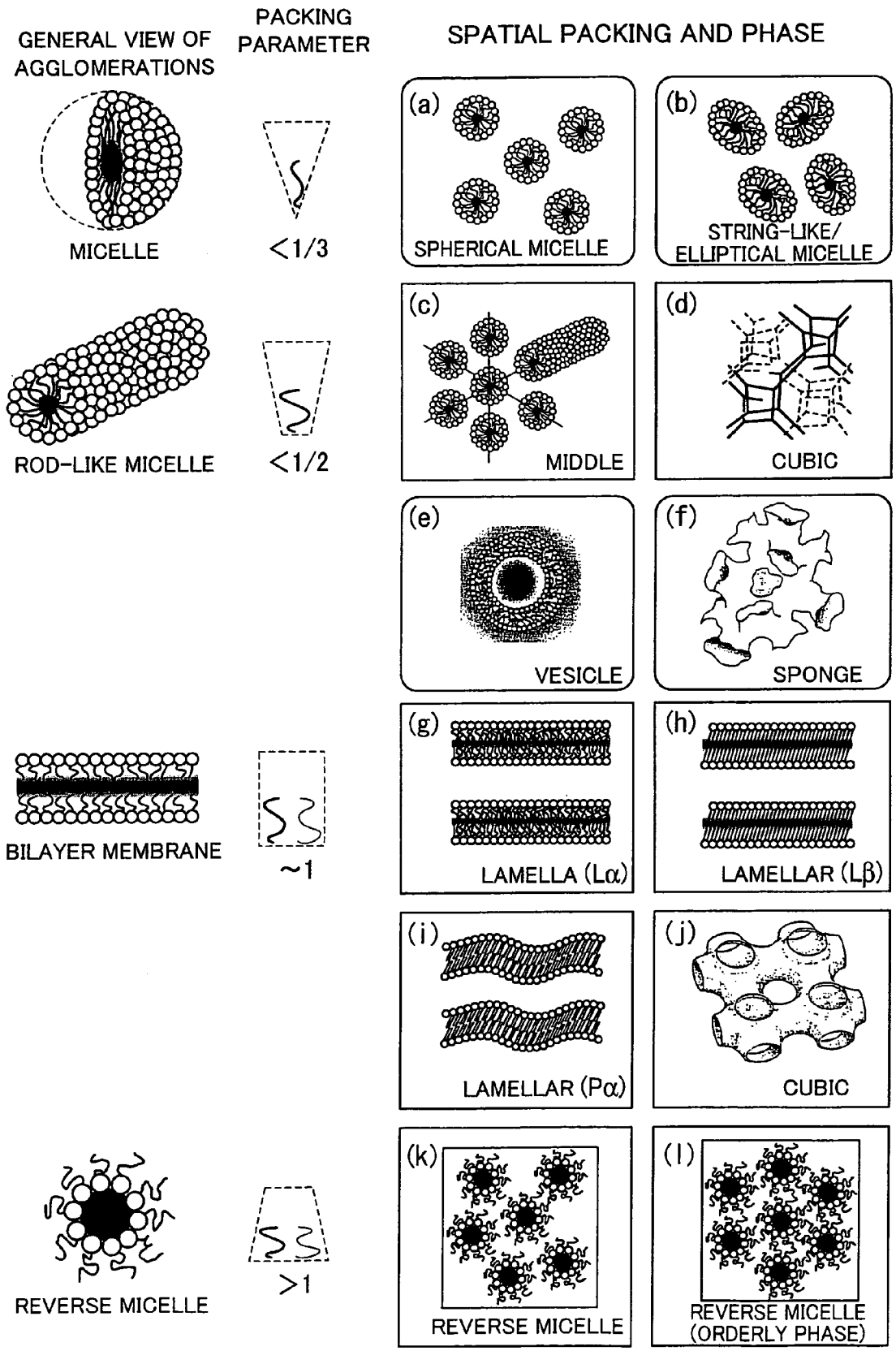
FIG. 26 is a view illustrating classification of lyotropic liquid phase.

Lyotropic liquid crystal is a liquid crystal that is a mixture in which liquid crystal molecules are dissolved in a solvent (water, an organic solvent or the like) that has other property. The particular phases are phases that are isotropic when no electric field is applied thereon. Examples of the particular phases include a micelle phase, a sponge phase, a cubic phase, and a reverse micelle phase, which are described in Non-Patent Literature 4. In FIG. 26, classification of the lyotropic liquid crystal phase is illustrated.

There is a surfactant (which is an amphiphile) that shows a micelle phase. For example, an aqueous solution of dodecyl sodium sulfate, an aqueous solution of potassium palmitate, or the like forms spherical micelles. Moreover, in a mixture solution of polyoxyethylenenonylphenylether (which is a non-ionic surfactant) and water, a nonylphenyl group acts as a hydrophobic group whereas oxyethylene chain acts as a hydrophilic group, thereby forming micelles. Besides these, micelles are formed in an aqueous solution of styrene-ethyleneoxide block copolymer.

For example, in the spherical micelles, the molecules are packed in such a manner that they are orientated respectively toward the all directions 3-dimensionally (thereby forming molecule agglomerations). In this way, the micelles are in the spherical shape. Moreover, the spherical micelles have a size smaller than the wavelength of the visible light. Thus, the spherical micelles show no optical anisotropy but appear isotropic. That is, the spherical micelle has an orderly structure (orientational order) not smaller than the wavelength of visible light. However, when an electric field is applied on the spherical micelles, the spherical micelles are distorted thereby showing the optical anisotropy. Therefore, the lyotropic liquid crystal having the spherical micelles phase is also applicable as the medium A of the display panel according to the exemplary embodiment. The exemplary embodiment is not limited to the spherical micelles. Micelle phases having other shapes, that is, string-like micelle phase, an elliptical micelle phase, rod-like micelle phase, and the like are similarly effective as the medium A.

Moreover, it is generally known that reverse micelles are formed depending on concentration, temperature, and surfactant. Compared with the micelles, the reverse micelles are such that the molecules are located upside down in such a manner that the hydrophilic group and the hydrophobic group exchanges their positions. Such reverse micelles show a similar optical effect as the micelles. Therefore, by using the reverse micelle phase as the medium A, an effect equivalent to that in the use of the micelle phase is attained. Note that the aforementioned liquid crystal micro emulsion is an example of a lyotropic liquid crystal having the reverse micelle phase (reverse micelle structure).

Moreover, an aqueous solution of pentaethylene glycol-dodecylether, which is a non-ionic surfactant, has concentration and temperature ranges in which it shows the sponge phase or cubic phase as shown in FIG. 26. Materials in the sponge phase and the cubic phase are transparent because the sponge phase and the cubic phase have an order (orientational order, orderly structure) smaller than the wavelength of the visible light. That is, media having these phases show optical isotropy, however, they show optical anisotropy when an electric field is applied thereon, because their orientational order (orderly structure) is changed by (and according to) the application of the electric field. Thus, the lyotropic liquid crystal having the sponge phase or the cubic phase is also applicable as the medium A of the display panel according to the exemplary embodiment.

[Liquid Crystal Particulate Dispersed System]

Moreover, the medium A may be a liquid crystal particulate dispersed system in which latex particulates are mixed in the aqueous solution of pentaethyleneglycol-dodecylether (C12E5; a non-ionic surfactant), the latex particulates having a surface modified with sulfate group and a diameter of about 100 Å. The liquid crystal particulate dispersed system has an orientational order (orderly structure) smaller than light wavelength. The aforementioned liquid crystal particulate dispersed system shows the sponge phase. However, the exemplary embodiment is not limited to this: liquid-crystal-particulate-dispersed systems that show micelle phase, cubic phase, reverse micelle phase or the like may be applicable as the medium A used in the exemplary embodiment. Note that it is possible to have an orientational structure similar to that of the liquid crystal emulsion by using aforementioned DDAB in lieu of the latex particulates.

One type of, or two or more types of particulates (liquid crystal particulates) may be preferably dispersed in the solvent.

Moreover, it is preferable that the particulates have an average particle diameter of 0.2 μm or less. The use of the fine particulates of an average particle diameter of 0.2 μm or less attains stable dispersion of the particulates in the medium layer 35, thereby preventing agglomeration of the particulates and phase separation, which would occur after a long time. Therefore, for example, it is possible to sufficiently prevent the display unevenness in the display panel, which is caused by local unevenness of particulates due to precipitation of the particulates.

Moreover, it is preferable that a particle-particle distance of the particulates is 200 nm or less, and it is more preferable that the particle-particle distance of the particulates is 190 nm or less.

Incident light to 3-dimensionally dispersed particles causes diffraction light at a certain wavelength. By preventing the occurrence of this diffraction light improves the optical isotropy, and gives the display panel higher contrast.

Even though it depends on the incident angle of the incident light, the wavelength λ of the diffraction light due to the 3-dimentioanlly dispersed particles is approximately obtained by λ=2d, where d is the particle-particle distance.

It is almost impossible for human eyes to detect diffraction light of 400 nm or less. Thus, it is preferable that λ≦400 nm. λ≦400 nm can be attained when the particle-particle distance d is 200 nm or less.

According to CIE (Commission Internationale de l'Eclairage), undetectable wavelength for human eyes is 380 nm or less. Thus, it is more preferable that λ≦380 nm. λ≦380 nm can be attained when the particle-particle distance d is 190nm or less.

A long particle-particle distance would result in insufficient interaction between the particulates, thereby making it more difficult to cause a micelle phase, a sponge phase, a cubic phase, and a reverse micelle phase. This is another reason why it is preferable that the particle-particle distance is 200 nm or less and it is more preferable that the particle-particle distance is 190 nm or less.

Moreover, as to the concentration (content) of the particulates in the medium layer 35, it is preferable that the concentration is in a range of 0.05 wt % to 20 wt % with respect to a total weight of the particulates and the medium to be sealed in the medium 35. When the concentration of the particulates in the medium layer 35 is in a range of 0.05 wt % to 20 wt %, it is possible to prevent the agglomeration of the particulates.

The particulates to be sealed in the medium layer 35 are not particularly limited, and may be transparent or not transparent. Moreover, the particulates may be organic particulates (such as polymer), inorganic particulates, or metallic particulates.

In case where the particulates are the organic particulates, it is preferable that the organic particulates be in the form of polymer beams such as polystyrene beads, polymethylmethacrylate beads, polyhydroxyacrylate beads, divinylbenzene beads, and the like. The particulates may be cross-linked or not cross-linked. In case where the particulates are inorganic particulates, it is preferable to use particulates such as glass beads, silica beads or the like.

As the metallic particulates, alkali metal, alkali earth metal, transition metal, rare earth metal are preferable. For example, particulates made of titania, alumina, palladium, silver, gold, copper, or an oxide of any of these metals can be preferably used as the metallic particulates. These metallic particulates may be made of sole metal or may be made of an alloy of two or more of them or a complex of two or more of them. For example, particulates prepared by covering silver particulates with a metal such a titania, palladium, or the like may be used. The silver particulates themselves would possibly change the properties of the display panel by oxidation of silver. By covering the surfaces of the silver particulates with a metal such as palladium, it is possible to prevent the oxidation of silver. Moreover, the metallic particulates in the beads form may be used as such, or may be used after subjected to heat treatment or adding an organic material to the surfaces of the beads. The organic material to be added to the surfaces of the beads is preferably such a material that shows a liquid crystallinity.

Moreover, it is preferable that the organic material to be added on the surfaces of the metallic particulates be not less than 1 mole but not more than 50 moles with respect to 1 mole of the metal.

For example, the metallic particulates to which the organic material is added may be prepared by mixing the organic material in a solvent in which metal ions are solved or dispersed, and then reducing the metal ions. The solvent may be water, an alcohol, an ether, or the like.

Further, the particulates to be dispersed may be in a form of fullerene, and/or in a carbon nano tube. The fullerene should be such that carbon atoms are arranged in a spherical shell configuration therein. For example, a preferable fullerene is such that has a stable structure having a carbon number n of 24 to 96. An example of such fullerene is, for example, a spherical closed-shell carbon molecular structure of C60 (comprising 60 carbon atoms). Moreover, as the carbon nano tube, for example, a tube-like shaped nano tube is preferable, in which carbon atoms arranged a graphite-like plane forms the tube like shape of thickness of several atoms. Moreover, the shape of the particulates is not particularly limited. For example, the shape may be a spherical shape, ellipsoidal shape, agglomeration-like shape, column-like shape, cone-like shape, any of these shapes with protrusion, or any of these shapes with a hole. Moreover, the particulates are not particularly limited in terms of their surface state. For example, the particulates may have a flat surface or a non-flat surface, or may have a hole or a groove.

Dendrimer is a 3-dimensionally highly-branched polymer in which every monomer unit is branched. Because it is highly branched, dendrimer has a spherical structure when it has a molecular weight larger than a certain molecular weight. The spherical structure is a transparent because it has an order (orderly structure, orientational order) smaller than the wavelength of the visible light. However, application of electric field changes an orientational order in dendrimer, thereby causing dendrimer to have an optical anisotropy (and/or thereby changing the magnitude of the optical anisotropy of the dendrimer). Therefore, dendrimer is also applicable as the medium A of the display panel according to the exemplary embodiment. Moreover, it is possible to attain an orientational structure similar to that of the liquid crystal micro emulsion by using dendrimer in lieu of DDAB in the liquid crystal micro emulsion. The medium thus obtained can be used as the medium A, too.

[Cholesteric Blue Phase]

Figure 27:
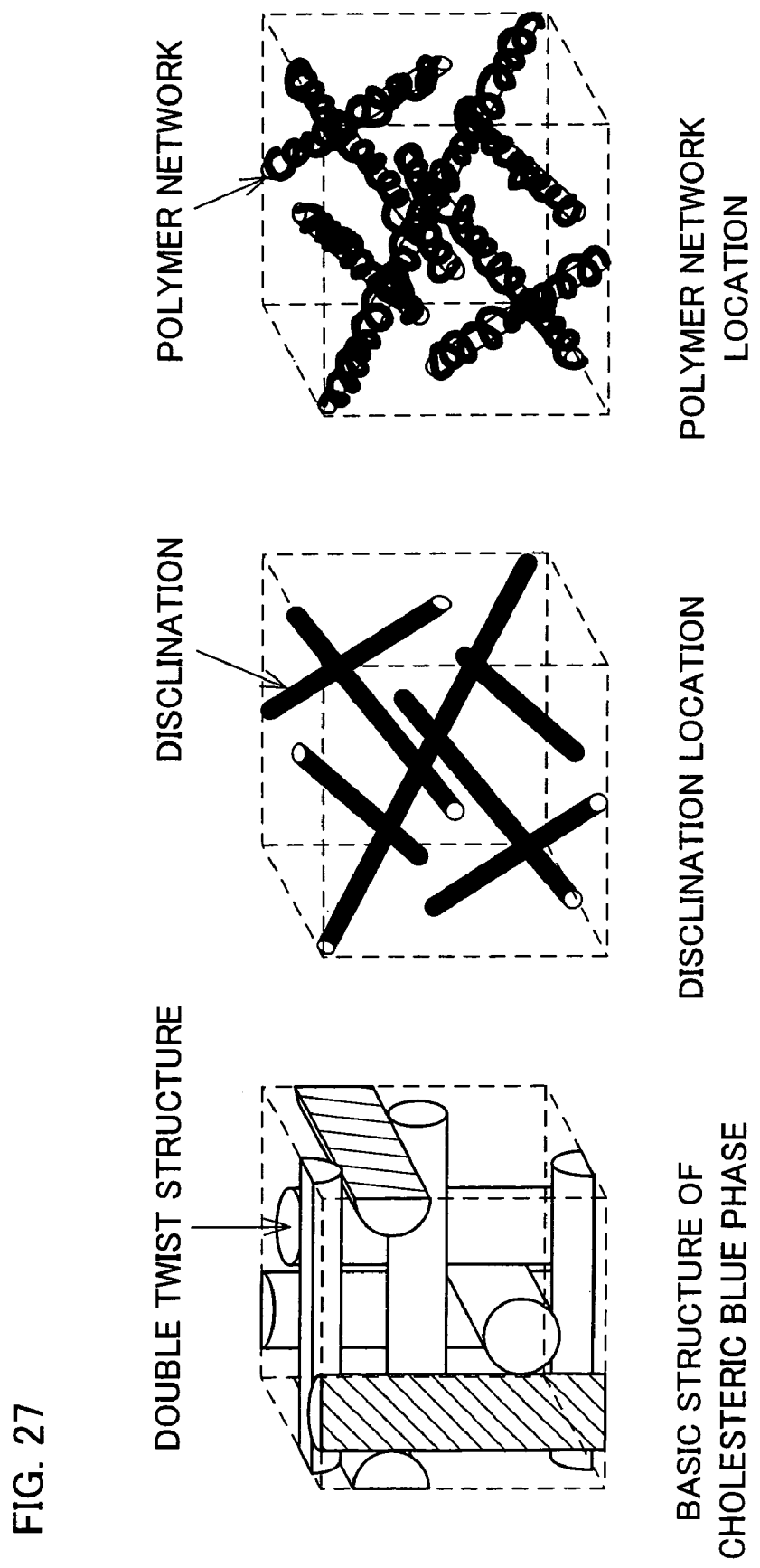
FIG. 27 is a view for explaining cholesteric blue phase and a mechanism of fixing according to the embodiment of the present invention.

Moreover, cholesteric blue phase is applicable as the medium A. In FIG. 27, schematic structures of the cholesteric blue phase are illustrated.

It is known that, as illustrated in FIG. 27, screw axes form 3-dimensional periodic structures in a cholesteric blue phase and the structure of the cholesteric blue phase is highly symmetric (for example, see Non-Patent Literatures 3 and 8). Materials in the cholesteric blue phase are substantially transparent because the cholesteric blue phase has an order (orderly structure, orientational order) smaller than the wavelength of the visible light. However, the application of electric field changes a magnitude of an orientational order in the cholesteric blue phase, thereby causing the cholesteric blue phase to show optical anisotropy. That is, the cholesteric blue phase, which is optically isotropic generally, shows optical anisotropy (and/or changes the magnitude of its optical anisotropy) when the electric field is applied, because the liquid crystal molecules are orientated along the electric field direction thereby distorting the lattice. Thus, a medium made of molecules that shows a cholesteric blue phase is applicable as the medium A of the display panel according to the exemplary embodiment. One of Examples of the materials showing the cholesteric blue phase is a compound prepared by mixing 48.2 molt % of "JC1041" (product name: a liquid crystal mixture made by Chisso Corporation), 47.4 mol % of "5CB" (4-ciano-4'-pentylbiphenyl; a nematic liquid crystal), and 4.4 mol % of "ZLI-4572" (product name: a chiral dopant made by Merck Ltd.). This compound shows a cholesteric blue phase in a temperature range of from 330.7K to 331.8K. Moreover, the cholesteric blue phase applicable to the present invention has a defective order smaller than light wave length, and thus is substantially optically isotropic in the light wavelength. To be "optically isotropic" means that the cholesteric blue phase is optically isotropic except that a color thereof that is caused due to the helical pitch of the liquid crystals. A phenomenon in which light of the wavelength of the same order as the helical pitch is selectively reflected is referred to as selective reflection. When the selective reflection wavelength band is out of the visible range, the color does not appear (the color is not detectable for human eyes). However, the color appears when the wavelength band of the selective reflection is within the visible range.

In case where the selective reflection wavelength band or the helical pitch is 400 nm or more, the cholesteric blue phase (blue phase) shows the color being caused due to the helical pitch. That is, visible light is reflected and the color caused by this is detected by human eyes. Therefore, for example, in application of the display panel of the present invention to television or the like in order to perform full color display, it is not preferable that reflection peak be within the visible range.

The selective reflection wavelength is also dependent on the incident angle of the light to the helical axis of the medium. The incident angle of the light to the helical axis has a distribution when the structure of the medium is not one-dimensional, that is, 3-dimensional as in the case of the cholesteric blue phase. Therefore, the width of the selective reflection wavelength has a distribution in this case.

Therefore, it is preferable that the selective reflection wavelength band or the helical pitch of the blue phase is not more than the visible range, that is 400 nm or less. As long as the selective reflection wavelength band or the helical pitch of the blue phase is 400 nm or less, the color will be almost undetectable for human eyes.

Moreover, according to CIE Commission Internationale de l'Eclairage, the wavelength undetectable to human eyes is 380 nm or less. Thus, it is preferable that the selective reflection wavelength band or the helical pitch of the blue phase be 380 nm or less. In this case, it is possible to surely prevent the color from being detectable for human eyes.

The color also relates to an average refractive index of the medium, in addition to the helical pitch and incident angle of the light. Light of the color is light having a width of wavelength $\Delta\lambda=P\Delta n$, the width of wavelength being centered at wavelength $\lambda=nP$, where n is the average refractive index, P is the helical pitch, and $\Delta n$ is anisotropy of the refractive index.

Every dielectric material has different $\Delta n$. For example, in case where a liquid crystalline material is used as the medium to be sealed in the medium layer 35, the liquid crystalline material has an average refractive index of the order of 1.5 and $\Delta n$ of the order of 0.1. In order not to let the color be within the visible range in this case, the helical pitch P should be 400/1.5=267 nm where $\lambda=400$ nm, while $\Delta\lambda=0.1\times267=26.7$. Therefore, the color can be almost undetectable for human eyes if the helical pitch of the medium is 253 nm or less, where 253 nm is a value obtained by deducting, from 267 nm, 13.4 nm that is approximately a half of 26.7 nm. Thus, it is preferable that the helical pitch of the medium be 253 nm or less, in order to prevent the color from being detectable.

In the above explanation, it is assumed that $\lambda=400$ nm in the relationship of $\lambda=nP$. In case where $\lambda=380$ nm, which is the wavelength undetectable for human eyes according to CIE, the helical pitch to let the color be out of the visible range is 240 nm or less. That is, when the helical pitch of the medium is 240 nm or less, the color can be surely prevented from being detectable.

The mixture of JC1041 (50.0 wt %), 5CB (38.5 wt %), and ZLI-4572 (11.5 wt %) showed phase transition from liquid isotropic phase to optically isotropic phase at a temperature of about 53° C. or less. However, the mixture had a helical pitch of about 220 nm, which was less than the visible range. Thus, the color did not appear in this mixture. Moreover, no orientational defect was observed in the vicinity of the electrode. It was deduced that the short correlation distance of the medium was shorter than the conventional liquid crystals.

As described, the cholesteric blue phase suitable for the present invention has a defective order smaller than the optical wavelength. The defective structure is caused by orienting molecules in largely twisted way, and therefore the medium exhibiting the cholesteric blue phase needs to have a chiral property to produce a greatly twisted structure. Then, to express a greatly twisted structure, it is preferable that a chiral agent be added to the medium as with the foregoing medium example.

The ideal concentration of the chiral agent depends on the twisting ability of the chiral agent, but a preferable concentration may be 8 wt % or 4 mol % or more. When a polymer network (obtained by photopolymerization of photosensitive monomer) is used to enlarge the temperature range exhibiting the cholesteric blue phase, the chiral agent in an amount of equal to or greater than 8 wt % or 4 mol % widened the temperature range of cholesteric blue phase by approximately 1° C. or more. On the other hand, the chiral agent less than 8 wt % or 4 mol % narrowed the temperature range of cholesteric blue phase.

Further, the concentration of the chiral agent is preferably at or greater than 11.5 wt %. With the chiral agent with a concentration equal to or more than 11.5 wt %, the helical pitch becomes approximately 220 nm, and the color was not displayed.

As described, a chiral agent with a higher concentration is preferred, as it eases expression of the cholesteric blue phase, and the helical pitch of the cholesteric blue phase is reduced.

However, when an excessive amount of chiral agent is added, the liquid crystal property of the entire material layer 35 decreases. Insufficient liquid crystal property brings about a decrease in degree of generation of the optical anisotropy upon field application, thereby decreasing function of the display element. Further, the decrease in the liquid crystal property also causes a decrease in stability of the cholesteric blue phase, which interferes the enlargement of temperature range of the cholesteric blue phase. The upper limit of the addition amount of the chiral agent can be decided according to the foregoing view, that was figured out as 80 wt % by the inventors of the present invention. More specifically, the concentration of the chiral agent is preferably not more than 80 wt %.

Moreover, the present invention is not limited to ZLI-4572 and MLC-6248 as the chiral agents, which are used in the present invention.

Note that, in the foregoing explanation, the effect of the addition of chiral agent to the cholesteric blue phase was explained; however, the effect of the addition of chiral agent in not limited only to the cholesteric blue phase, but also useful for a medium exhibiting other liquid crystal phases, such as a smectic blue phase or a Nematic phase etc.

[Smectic Blue Phase]

A smectic blue phase is also applicable as the medium A. A smectic blue (BPSm) phase has a highly symmetric structure (for example, see Non-Patent Literatures 3 and 5, similarly to the cholesteric blue phase. Because it has an order (orderly structure, orientational order) smaller than the wavelength of the visible light, a material in the smectic blue phase is transparent. However the application of electric field changes the magnitude of an orientational order in the smectic blue phase, thereby causing the smectic blue phase to show the optical anisotropy (and/or changing the magnitude of the optical anisotropy). That is, the smectic blue phase, which is optically isotropic generally, shows optical anisotropy when the electric field is applied, because the liquid crystal molecules are orientated along the electric field direction thereby distorting the lattice.

One of examples of the materials that show the smectic blue phase is FH/FH/HH-14BTMHC or the like. This material shows BPSm 3 phase at temperatures from 74.4° C. to 72.3° C., BPSm 2 phase at temperatures from 73.2° C. to 72.3° C., and BPSm 1 phase at temperatures from 72.3° C. to 72.1° C. The BPSm phase has a highly symmetric structure as described in Non-Patent Literature 5, thus being optically isotropic generally. Moreover, when the electric field is applied on the material FH/FH/HH-14BTMHC, the liquid crystal molecules are orientated along the electric field direction, thereby distorting the lattice. As a result the material shows optical anisotropy. Therefore, this material is applicable as the medium A of the display element according to the exemplary embodiment.

As described above, as long as their optical anisotropy (refraction index, magnitude of orientational order) is changed (changeable) when the electric field is applied, the medium A may be any material such as the materials showing the Pockels effect or the materials showing the Kerr effect; the materials made from molecules that show any one of the cubic phase, smectic D phase, cholesteric blue phase, and smectic blue phase; or the lyotropic liquid crystal or liquid crystal particulates dispersed system that show any one of the micelle phase, reverse phase, and cubic phase. Moreover, the medium A may be the liquid crystal micro emulsion, dendrimer (dendrimer molecules) amphiphilic molecules, copolymer, other polar molecules or the like material. Moreover, the medium A is not limited to the liquid crystalline material. It is preferable that the medium A have an orderly structure (orientational order) smaller than the wavelength of the visible light. If it has such orderly structure smaller than the light wavelength, the medium A is optically isotropic. Therefore, by using the medium which has the orderly structure smaller than the wavelength of the visible light when the electric field is applied or when no electric field is applied, it is possible to surely change the display state between when the electric field is applied on the medium and when no electric field is applied on the medium. Moreover, such a large orientation defect that would affect the display was not observed in the vicinity of the electrode in the configuration in which the above-described medium was used in the display panel according to the exemplary embodiment. It was deduced that, even if the orientation disturbance was caused due to local electric field in the vicinity of the electrode, the correlation distance, which was shorter than the conventional liquid crystal, of the medium did not allow the orientation disturbance to spread, unlike the conventional liquid crystal.

The present invention is not limited to the exemplary embodiment in which a transmissive type display panel is mainly discussed as an example. The present invention is also applicable to reflective display panel.

Moreover, the present invention is not limited to the materials and thickness of the members, size of the unit pixels, width of the electrodes, electrode-electrode distance, etc., which are merely examples. The present invention may be modified as appropriate.

As described above, the display panel of the present invention is configured such that the medium layer comprises a medium that is optically isotropic when no electric field is applied thereon, and whose optical anisotropy magnitude is changeable by and according to the electric field applied thereon; and the first and second electrodes are transparent electrodes, and a distance between the first and the second electrodes is shorter than a distance between the first substrate and second substrate.

This configuration is free from such a problem that inherent viscosity of the liquid crystal largely affects the response speed, unlike the conventional liquid crystal display elements. Thus, this configuration attains high-speed response. Moreover, with this configuration, wider viewing angle property and high-speed response property can be attained.

Moreover, it is possible to change the magnitude of the optical anisotropy of the medium in the regions above the electrodes by generating the fringe electric field between the first electrode and second electrode. This allows the regions above the electrodes to be utilized as the display regions and contribute to the transmissivity. This improves the transmissivity.

Moreover, the rubbing alignment process, which is performed in the conventional liquid crystal display elements, can be omitted in the present invention. Thus, it is possible to prevent the problems of dust and local discharge, which are caused by the rubbing alignment process. Further, the omission of the alignment process step such as rubbing leads to lower product cost.

A display device of the present invention includes the display panel as described above. Thus, high transmissivity property, high-speed response property, and wide viewing angle property are attained in the display device of the present invention.

Moreover, in the above configuration, too narrow or too wide width of the first and second electrodes in the direction parallel to the substrate plane lowers the intensity of the electric field applied on the regions above the electrodes. This makes it impossible to induce the change in the magnitude of the optical anisotropy of the medium in all the regions above the electrodes.

Thus, it is preferable that the first and second electrodes have such a width or widths in a direction parallel to the substrate plane that allows or allow the electric field being generated between the first and second electrodes to induce the change in the magnitude of the optical anisotropy of the medium at a position in a normal direction of the substrate plane within that region of the medium layer which overlaps at least one of the first and second electrodes when viewed in the normal direction of the substrate plane, the electric field being a parabolic electric field. For example, it is preferable that the first and second electrodes have a width not less than 1 μm but not more than 8 μm in the direction parallel to the substrate plane.

Moreover, the first and second electrodes may be configured to apply the electric field in two or more electric field application directions when viewed in a normal direction of the substrate plane.

With this configuration, two or more electric field application directions can be attained. This allows forming a plurality of domains (minute regions) in which the medium shows different optical anisotropy directions. This improves the viewing angle property of the display panel.

Moreover, in this case, it is preferable that two of the electric field application directions make an angle of 90 degrees±less than 20 degrees therebetween. With this configuration, it is possible to form two domains in which the medium shows optical anisotropy in directions that cross each other substantially orthogonally. This makes it possible to compensate for the coloring phenomenon at oblique viewing angle in one domain with that in the other domain. Thus, it is possible to improve the viewing angle property without scarifying the transmissivity.

Moreover, the display panel may include polarizers respectively provided to each of the first and second substrates, the polarizers having absorption axis directions that cross each other orthogonally, the first and second electrodes applying the electric field in an electric field application direction that makes an angle of 45 degrees±less than 10 degrees with each of the absorption axis directions. This configuration can attain significant improvement in the transmissivity of the display panel.

Furthermore, the display panel of the present invention may be configured such that at least either of the first and second electrodes is a comb-like shaped electrode having a comb-base portion and tooth portions, which are extended from the comb-base portion in a direction that makes a predetermined angle with respect to a longitudinal direction of the comb-base portion.

With this configuration, the distance between the first and second electrodes, that is, the distance between the tooth portions of the first electrodes and the tooth portion of the second electrodes can be short. This makes it possible to form a parabola fringe electric field with a large curvature and radius. This makes it possible to induce a change in the magnitude of the optical anisotropy of the medium in the regions above the electrodes. Thus, it is possible to attain better aperture ratio in the display panel.

Moreover, the display panel of the present invention may be configured such that the first and second electrodes are comb-like shaped electrodes having a comb-base portion and tooth portions, the tooth portions of the first and second electrodes interleaving each other by being extended from the corresponding comb-base portions in respective directions that make a predetermined angle with respect to longitudinal directions of the corresponding comb-base portions.

With this configuration, the distance between the first and second electrodes, that is, the distance between the tooth portions of the first electrodes and the tooth portion of the second electrodes can be short. This makes it possible to form a parabola fringe electric field with a large curvature and radius. This makes it possible to induce a change in the magnitude of the optical anisotropy of the medium in the regions above the electrodes. Thus, it is possible to attain better aperture ratio in the display panel.

The display panel of the present invention may be configured such that the tooth portions have a wedge-like shape that is bent at a predetermined angle. With this configuration, at least two electric field application directions are attained, thereby making it possible to form domains in which the medium shows optical anisotropy in different directions. Thus, it becomes possible to improve the viewing angle property of the display panel.

The display panel of the present invention may be configured such that the angle at which the wedge-like shape is bent is an angle of 90 degrees±less than 20 degrees. In this configuration, the angle at which the wedge-like shape is bent is an angle of 90 degrees±less than 20 degrees, that is, not less than 70 degrees but not more than 110 degrees. This allows forming domains in which the medium shows optical anisotropy in directions that cross each other substantially orthogonally (at the angle of 90 degrees±less than 20 degrees). This makes it possible to compensate for the coloring phenomenon at oblique viewing angle in one domain with that in the other domain. Thus, it is possible to improve the viewing angle property without scarifying the transmissivity.

The display panel of the present invention may be configured such that at least either of the first and second electrodes has a groove section in which no electrode material exists when viewed in the normal direction of the substrate plane.

The groove section in at least either of the first and second electrodes makes it possible to have a large charging capacitance between the electrodes. Moreover, this allows electric field application on the medium layer to be performed without causing DC electric field application onto the medium layer. This prevents the deterioration of the medium thereby attaining a display panel having high reliability and durability.

The display panel according to the present invention may include data signal lines and scanning signal lines, which cross each other, the first and second electrodes being provided in each pixel that are respectively provided in correspondence with each intersection of the data signal lines and scanning signal lines, at least one of the first and second electrodes having a wedge-like shape, at least either of the data signal lines and the scanning signal lines being shaped to be extended along the wedge-like shape of the at least one of the first and second electrodes.

With this configuration, it is possible to significantly reduce the non-display contributing region, which occurs between (i) at least either of the data signal lines and the scanning signal lines, and (ii) the electrodes having the wedge-like shape and facing the at least either of the data signal lines and the scanning signal lines. This gives larger display region.

The display panel according to the present invention may be configured such that at least either of the data signal lines and the scanning signal lines is made of one of, or an alloy of two or more of Al, Mo, Ti, W, Ta, Cr, Nd, and Cu.

With this configuration, the signal lines are made of a material that is highly conductive and has a low resistance. This prevents delays in signal transmission.

Moreover, the display panel according to the present invention may be configured such that the first or second electrodes are respectively connected to the corresponding data signal lines respectively via switching elements that are turned ON and OFF in accordance with a signal supplied to the corresponding scanning signal lines, the display panel including: common signal lines connected to the first or second electrodes that are not connected with the corresponding data signal line, the common signal lines being made of the same material as the scanning signal lines and/or the data signal lines. This configuration lowers the production cost.

Moreover, the display panel according to the present invention may be configured such that the first or second electrodes are respectively connected to the corresponding data signal lines respectively via switching elements that are turned ON and OFF in accordance with a signal supplied to the corresponding scanning signal lines, the display panel including: common signal lines connected to the first or second electrodes that are not connected with the corresponding data signal lines, the common signal lines being in parallel with the scanning signal lines.

Moreover, the display panel according to the present invention may be configured such that in the direction parallel with the substrate plane, the scanning signal lines have a width smaller than a distance between the common signal lines and the data signal lines. With this configuration, it is possible to prevent the scanning signal lines from being electrically connected with the common signal lines.

The display panel according to the present invention may be configured such that the first or second electrodes are respectively connected to the corresponding data signal lines respectively via switching elements that are turned ON and OFF in accordance with a signal supplied to the corresponding scanning signal lines, the display panel including: common signal lines connected to the first or second electrodes that are not connected with the corresponding data signal lines, the common signal lines being in parallel with the data signal lines.

Moreover, the display panel according to the present invention may be configured such that in the direction parallel with the substrate plane, the data signal lines have a width smaller than a distance between the common signal lines and the data signal lines. With this configuration, it is possible to prevent the data signal lines from being electrically connected with the common signal lines.

The display panel according to the present invention may include a third electrode or third electrodes provided to the second substrate. With this configuration makes it possible to provide shielding against external static electricity by using the third electrode. Therefore, it is possible to prevent fluctuation in brightness, which is caused by the change in the magnitude of the optical anisotropy of the medium due to the external static electricity. That is, it is possible to prevent display unevenness caused by the static electricity, thereby preventing the deterioration of the display quality.

Moreover, the display panel according to the present invention may be configured such that the third electrode or third electrodes have a potential that is fixed to a constant value. The constant potential of the third electrode provides more reliable shielding effect against the static electricity.

Furthermore, the display panel according to the present invention may be configured such that the third electrode or third electrodes have a shape that does not overlap the first and second electrodes when viewed in the normal direction of the substrate plane. With this configuration, it is possible to reduce the load capacitance that occurs between (i) the first and second electrodes and (ii) the third electrode(s). Thereby, it is possible to improve the charging property of the display panel.

Moreover, the third electrode or third electrodes may be transparent electrodes. The transparent third electrode(s) makes it possible to attain the shielding effect against the static electricity without scarifying the transmissivity.

The third electrode or third electrodes may function as heating means for heating the medium layer. That is, the third electrode(s) may function as the shielding means for providing shielding against the static electricity, and as the heating means for heating the medium layer. This configuration prevents or reduce display unevenness that is caused by the temperature unevenness.

Moreover, the medium may have an orientational order (orderly structure) smaller than a visible light wavelength when no electric field is applied thereon. With an orientational order smaller than the visible light wavelength, the medium shows optical isotropy. Therefore, the use of a medium whose orientational order becomes smaller than visible light wavelength when no electric field is applied thereon makes it possible to have transmissivity that changes more largely between when the electric field is applied and when no electric field is applied.

It is preferable that a selective reflection wavelength band or a helical pitch of the medium be not more than 400 nm.

When the helical pitch of the medium is greater than 400 nm, the medium would appear in a color that is caused by the helical pitch. That is, in the medium having the helical pitch of greater than 400 nm, the light of the wavelength of the same order as the helical pitch is selectively reflected (i.e., selective reflection). The display color of the display panel would be influenced by the color being caused by the helical pitch.

Such coloring can be prevented by arranging such that the selective reflection range or helical pitch of the medium is 400 nm or less. That is, it is possible to prevent the problem of the coloring, because the light of 400 nm or less is almost undetectable for human eyes. The selective reflection wavelength is also dependent on the incident angle of the light to the helical axis of the medium. The incident angle of the light to the helical axis has a distribution when the structure of the medium is not one-dimensional, that is, 3-dimensional as in the case of the cholesteric blue phase. Therefore, the width of the selective reflection wavelength has a distribution in this case. Therefore, it is preferable that the selective reflection wavelength band be 400 nm or less.

Moreover, the display device of the present invention includes any one of the display panel described above. Thus, the display device of the present invention has high transmissivity property, high-speed response property, and wide viewing angle property.

The display panel is applicable, for example, in image display apparatus (display device) such as televisions, monitors and the like; OA apparatus such as word processors, personal computers, and the like; and image display apparatus (display device) for use in video cameras, digital cameras, information terminals such as portable phones. Moreover, the display panel according to the present invention is applicable in display devices having a large screen or displaying moving pictures, because the display panel according to the present invention, as described above, has the wide viewing angle property and the fast responding property, and lower production cost than the conventional display panels. The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A display panel comprising:
(i) a first substrate and a second substrate, which face each other, (ii) a medium layer being sandwiched between the first and second substrate, and (iii) first electrodes and second electrodes being provided on that side of the first substrate which faces the second substrate, the display panel performing display operation by generating an electric field between the first and second electrodes, wherein:
the medium layer comprises a medium that is optically isotropic when no electric field is applied thereon, and whose optical anisotropy magnitude is changeable by and according to the electric field applied thereon;
the first and second electrodes are transparent electrodes, and a distance between the first and the second electrodes is shorter than a distance between the first substrate and second substrate, and wherein an insulating film is provided between the first and second electrodes;
wherein a width of the second electrode in its in-plane direction is narrower than a width of the first electrode in its in-plane direction;
wherein the second electrode comprises a comb-like shaped electrode including a comb-base portion and tooth portions extending from the comb-base portion in a direction that makes an angle with respect to a longitudinal direction of the comb-base portion;
wherein the first electrode comprises a plate-like shaped electrode whose plane parallel to a substrate plane comprises an area wider than that of the second electrode; and
wherein at least part of at least one of the tooth portions of the second electrode and at least part of a plate-like shaped portion of the first electrode overlap each other when viewing the first electrode and the second electrode in a direction normal to the substrate plane.

2. The display panel as set forth in claim 1, wherein: the first and second electrodes have such a width or widths in a direction parallel to the substrate plane that allows or allow the electric field being generated between the first and second electrodes to induce the change in the magnitude of the optical anisotropy of the medium at a position in a normal direction of the substrate plane within that region of the medium layer which overlaps at least one of the first and second electrodes when viewed in the normal direction of the substrate plane, the electric field being a parabolic electric field.

3. The display panel as set forth in claim 1, wherein: the first and second electrodes are configured to apply the electric field in two or more electric field application directions when viewed in a normal direction of the substrate plane.

4. The display panel as set forth in claim 3, wherein: two of the electric field application directions make an angle of 90 degrees±less than 20 degrees therebetween.

5. The display panel as set forth in claim 1, comprising: polarizers respectively provided to each of the first and second substrates, the polarizers having absorption axis directions that cross each other orthogonally, the first and second electrodes applying the electric field in an electric field application direction that makes an angle of 45 degrees±less than 10 degrees with each of the absorption axis directions.

6. The display panel as set forth in claim 1, wherein: at least either of the first and second electrodes is a comb-like shaped electrode having a comb-base portion and tooth portions, which are extended from the comb-base portion in a direction that makes a predetermined angle with respect to a longitudinal direction of the comb-base portion.

7. The display panel as set forth in claim 6, wherein: the tooth portions have a wedge-like shape that is bent at a predetermined angle.

8. The display panel as set forth in claim 7, wherein: the angle at which the wedge-like shape is bent is an angle of 90 degrees±less than 20 degrees.

9. The display panel as set forth in claim 1, wherein: at least either of the first and second electrodes has a groove section in which no electrode material exists when viewed in the normal direction of the substrate plane.

10. The display panel as set forth in claim 7, comprising: data signal lines and scanning signal lines, which cross each other, the first and second electrodes being provided in each pixel that are respectively provided in correspondence with each intersection of the data signal lines and scanning signal lines, at least either of the data signal lines and the scanning signal lines being shaped to be extended along the wedge-like shape of the at least one of the first and second electrodes.

11. The display panel as set forth in claim 10, wherein: at least either of the data signal lines and the scanning signal lines is made of one of, or an alloy of two or more of Al, Mo, Ti, W, Ta, Cr, Nd, and Cu.

12. The display panel as set forth in claim 10, wherein:
the first or second electrodes are respectively connected to the corresponding data signal lines respectively via switching elements that are turned ON and OFF in accordance with a signal supplied to the corresponding scanning signal lines,
the display panel comprising:
common signal lines connected to the first or second electrodes that are not connected with the corresponding data signal line,
the common signal lines being made of the same material as the scanning signal lines and/or the data signal lines.

13. The display panel as set forth in claim 10, wherein: the first or second electrodes are respectively connected to the corresponding data signal lines respectively via switching elements that are turned ON and OFF in accordance with a signal supplied to the corresponding scanning signal lines,
the display panel comprising:
common signal lines connected to the first or second electrodes that are not connected with the corresponding data signal lines,
the common signal lines being in parallel with the scanning signal lines.

14. The display panel as set forth in claim 13, wherein: in the direction parallel with the substrate plane, the scanning signal lines have a width smaller than a distance between the common signal lines and the scanning signal lines.

15. The display panel as set forth in claim 10, wherein: the first or second electrodes are respectively connected to the corresponding data signal lines respectively via switching elements that are turned ON and OFF in accordance with a signal supplied to the corresponding scanning signal lines,
the display panel comprising:
common signal lines connected to the first or second electrodes that are not connected with the corresponding data signal lines,
the common signal lines being in parallel with the data signal lines.

16. The display panel as set forth in claim 15, wherein: in the direction parallel with the substrate plane, the data signal lines have a width smaller than a distance between the common signal lines and the data signal lines.

17. The display panel as set forth in claim 1, comprising: a third electrode or third electrodes provided to the second substrate.

18. The display panel as set forth in claim 17, wherein: the third electrode or third electrodes have a potential that is fixed to a constant value.

19. The display panel as set forth in claim 17, wherein: the third electrode or third electrodes have a shape that does not overlap the first and second electrodes when viewed in the normal direction of the substrate plane.

20. The display panel as set forth in claim 17, wherein: the third electrode or third electrodes are transparent electrodes.

21. The display panel as set forth in claim 17, wherein: the third electrode or third electrodes function as heating means for heating the medium layer.

22. The display panel as set forth in claim 1, wherein: the medium has an orientational order smaller than a visible light wavelength when no electric field is applied thereon.

23. The display panel as set forth in claim 1, wherein: a selective reflection wavelength band or a helical pitch of the medium is not more than 400 nm.

24. The display panel of claim 1, further comprising a shielding electrode, wherein di >L1, where di is a distance between the second electrode and the shield electrode and L1 is a distance between the second electrode and the first electrode.

25. The display panel of claim 1, wherein when viewing the first electrode in the direction normal to the substrate plane, said at least a part of the plate-like shaped portion of the first electrode which is overlapped by said at least a part of the tooth portion of the second electrode comprises a groove section in which no electrode material is provided.

26. The display panel of claim 1, wherein when viewing the first electrode in the direction normal to the substrate plane, at least part of said plate-like shaped portion of the first electrode which part is positioned between adjacent ones of tooth portions of the second electrode and which part is not overlapped by the second electrode comprises a groove section in which no electrode material is provided.

\* \* \* \* \*